US006758291B1

(12) United States Patent
Koch

(10) Patent No.: US 6,758,291 B1
(45) Date of Patent: Jul. 6, 2004

(54) COMPACT MULTIPURPOSE TRAILER TUG

(76) Inventor: Richard Karl Koch, 322 Temple Ave., Long Beach, CA (US) 90814

( * ) Notice: Subject to any disclaimer, the term of this patent is extended or adjusted under 35 U.S.C. 154(b) by 0 days.

(21) Appl. No.: 10/190,225

(22) Filed: Jul. 5, 2002

(51) Int. Cl.[7] ............................................... B62D 51/04
(52) U.S. Cl. .......................... 180/11; 180/19.1; 180/218
(58) Field of Search .............................. 180/11, 12, 15, 180/16, 19.1, 19.2, 19.3, 218

(56) References Cited

U.S. PATENT DOCUMENTS

| D137,181 S | 2/1944 | Benzel |
| D209,580 S | 12/1967 | Reapsummer |
| D212,800 S | 11/1968 | Kimball |
| 3,439,764 A | 4/1969 | Kimball |
| 3,865,204 A | * 2/1975 | Bueckner, Sr. ............... 180/12 |
| 4,527,651 A | * 7/1985 | Thiermann, Sr. .......... 180/19.2 |
| 5,139,102 A | * 8/1992 | Pocapalia .................. 180/19.2 |
| 5,259,471 A | * 11/1993 | Taylor et al. ................. 180/12 |
| 5,325,934 A | * 7/1994 | Larson ......................... 180/13 |
| 5,343,969 A | * 9/1994 | Taylor ....................... 180/19.1 |
| 6,276,469 B1 | * 8/2001 | Smith ........................ 180/19.1 |
| 6,604,707 B2 | * 8/2003 | McVaugh .................... 244/50 |

FOREIGN PATENT DOCUMENTS

| DE | 4021586 | * 4/1991 | ............ B60K/1/04 |
| GB | 2274443 A | * 7/1994 | ........... B65D/77/04 |

OTHER PUBLICATIONS

"Ultra–Fab Power Mover—PM 5500," as shown on the ULTRA–FAB website, http://thomasregister.com/Catalog.aspx?az=21509203&net=http://www.ultra.fab.com . . . , 1 page, printed on Sep. 16, 2003.
"PowerMover: The Ultimate in Moving Almost Anything on Wheels," as shown on the ULTRA–FAB website, http://thomasregister.com/Catalog.aspx?az=21509203&net=http://www.ultra.fab.com . . . , 2 pages, printed on Sep. 16, 2003.
Power Caster Inc., "," Park it With Power Caster, OPM Design Group (Burbank, California USA), p. 1–2, (Apr. 9, 1998).
Power Caster Inc., "Advertisement in the RV Marketplace for the Power Caster, bottom right of page," Trailer Life, p. 85, (Aug. 11, 2001).
Power Caster Inc., "Advertisement in the RV Marketplace for the Power Caster, center of page," Trailer Life, (Jul. 11, 1996).
Electric Mobility Corporation, "," Rascal Choices, p. 1–16, (Apr. 11, 2001).
A.G.S. INC, "Advertisement in the RV Marketplace for Manual Trailer Movers, bottom center," Trailer Life, p. 100, (Jul. 11, 2001).
Power Movers, Inc., "," Welcome to Powermovers, p. 1–3, (Jun. 19, 2001).
Tim Stewart, "," The Fab Shop Price List, p. 1–2, (Apr. 2, 2001).
The Fab Shop, "," Loadmaster—"Makes Life Easier!", (Jan. 4, 2002).
The Fab Shop, "Advertisement in the RV Marketplace for "Loadmaster—Power Dolly", bottom center of page," Trailer Life, p. 104, (Jul. 11, 2001).
Jason Wuest, "," Scooterville Price List, p. 1–4, (Jun. 26, 2001).
Power Wheel USA, LLC, "Power Wheel USA Is Your Easy Answer To Trailer Moving," web page, p. 1–2, (Mar. 31, 2003).
Powermovers, "The Easy One To Use", web pages 1–4, (Mar. 31, 2003).

* cited by examiner

Primary Examiner—Kevin Hurley

(57) ABSTRACT

A light portable tug including reversible wheels, a direct current motor device for driving the wheels and a drive train between such motor and wheels and including a control device for selectively rotating such wheels for controlling the direction of such Tug.

32 Claims, 55 Drawing Sheets

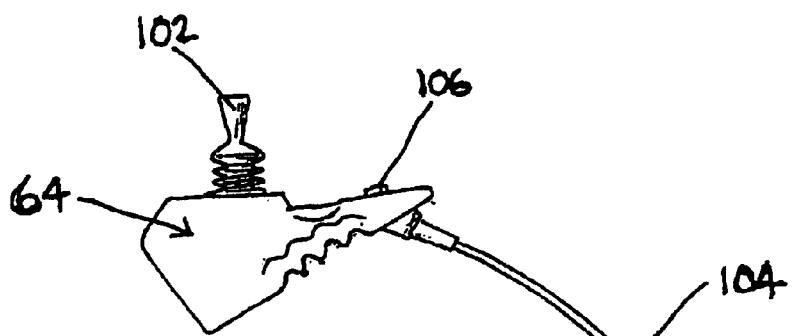
FIG. 8₁
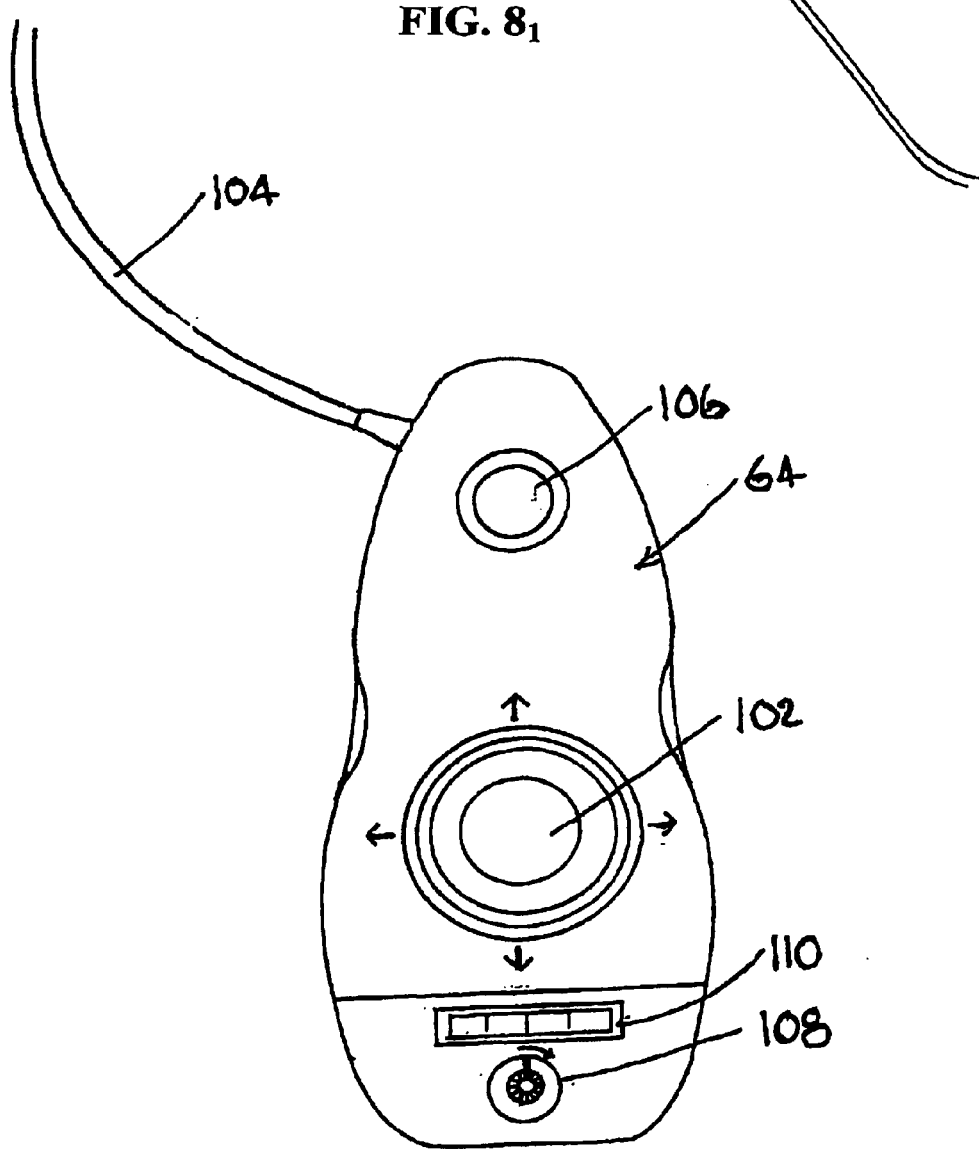
FIG. 8

FIG. 12₁

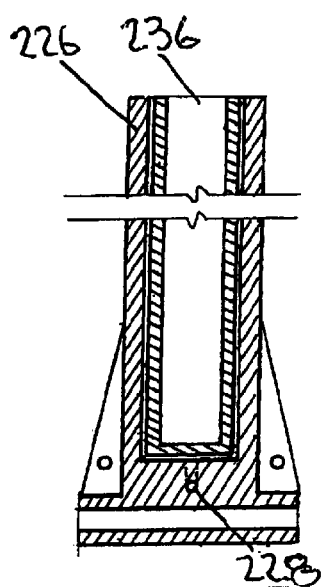
FIG. 14₁
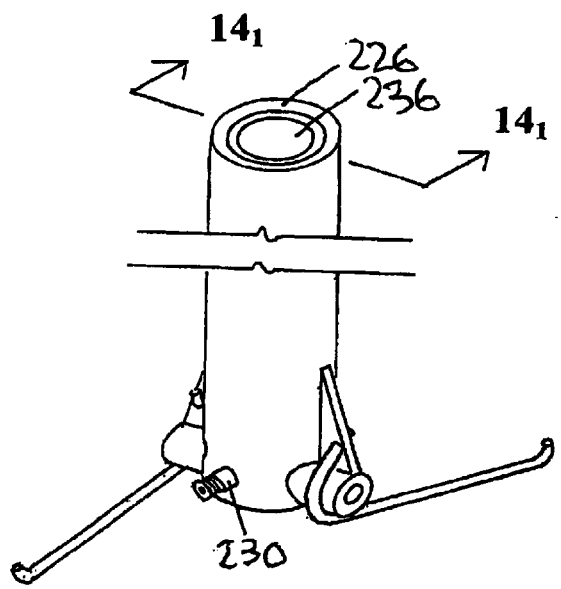
FIG. 14
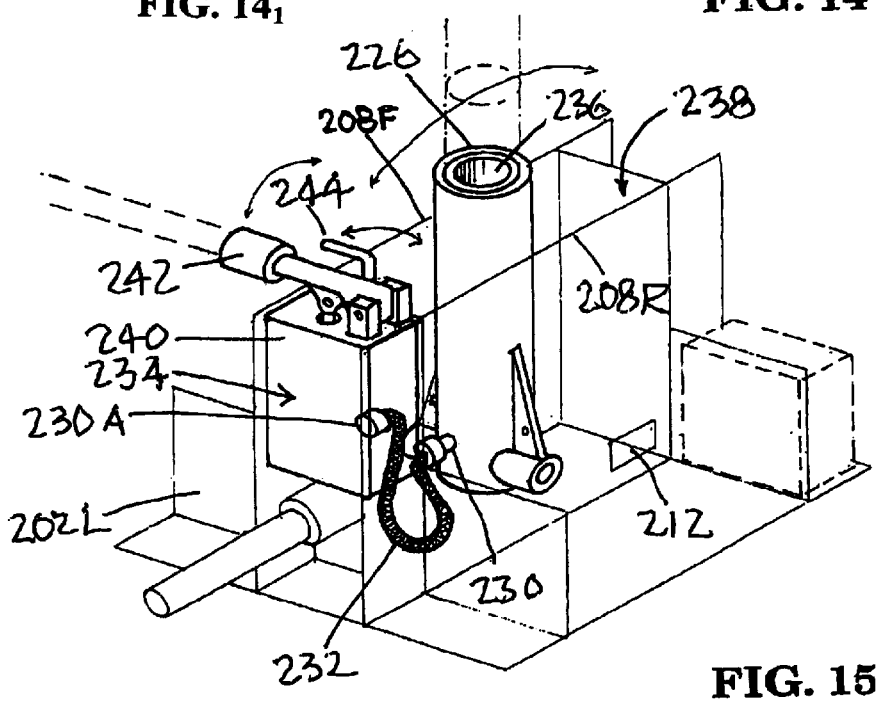
FIG. 15

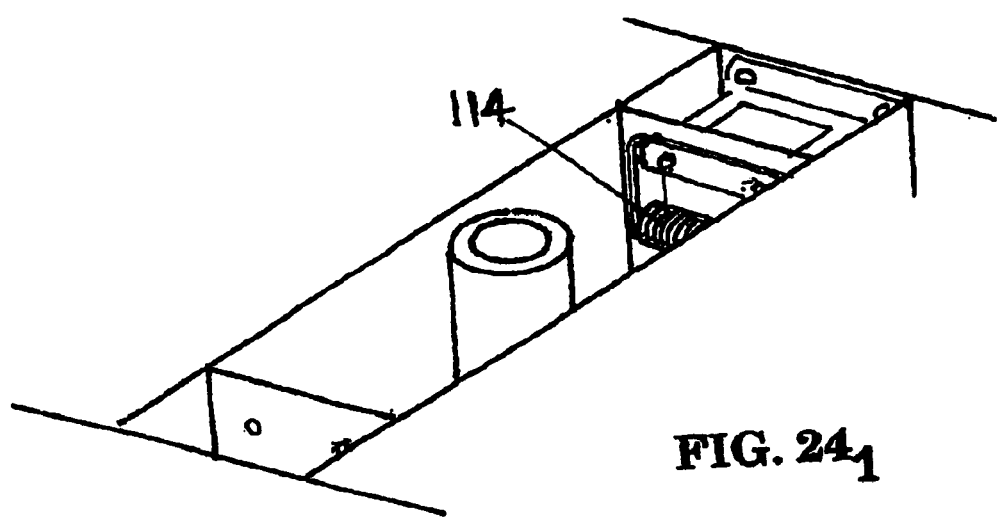

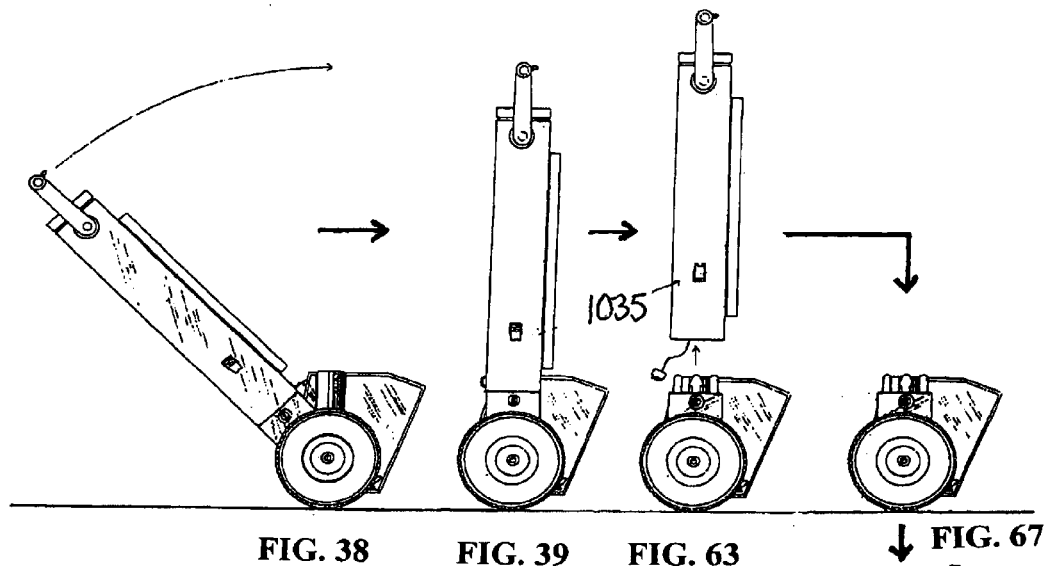
FIG. 38   FIG. 39   FIG. 63   FIG. 67
FIG. 71
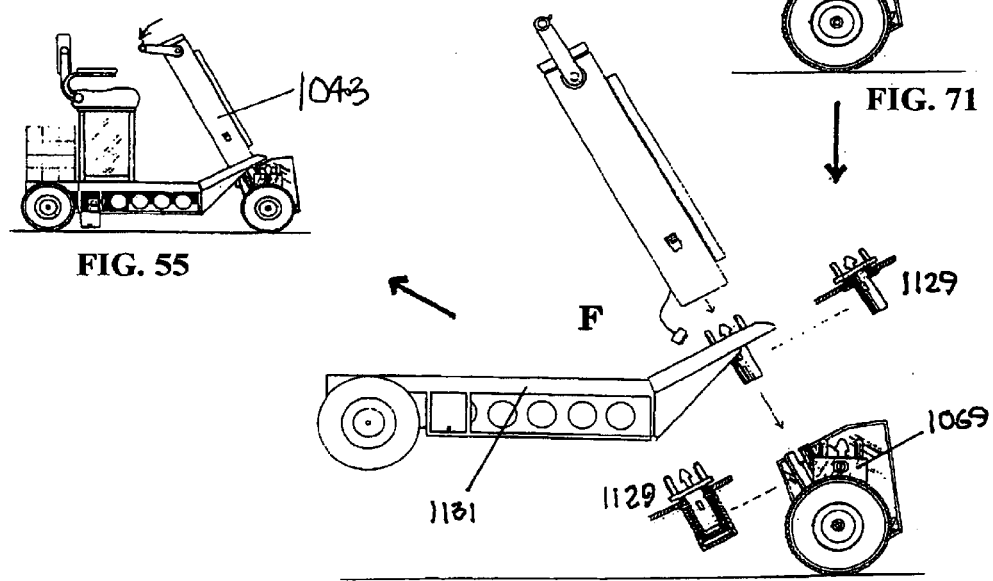
FIG. 55
FIG. 54

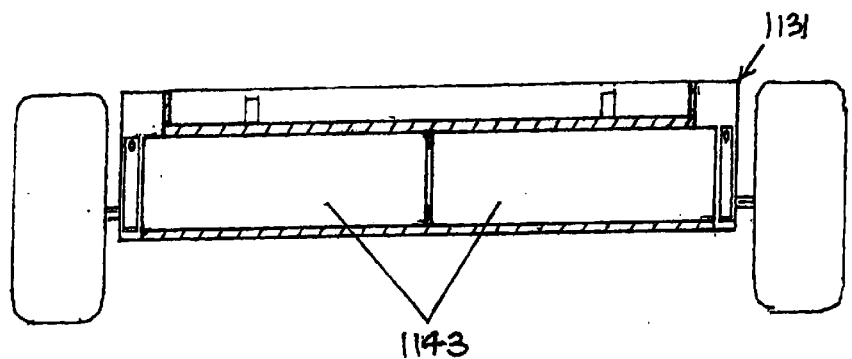
FIG. 58₁
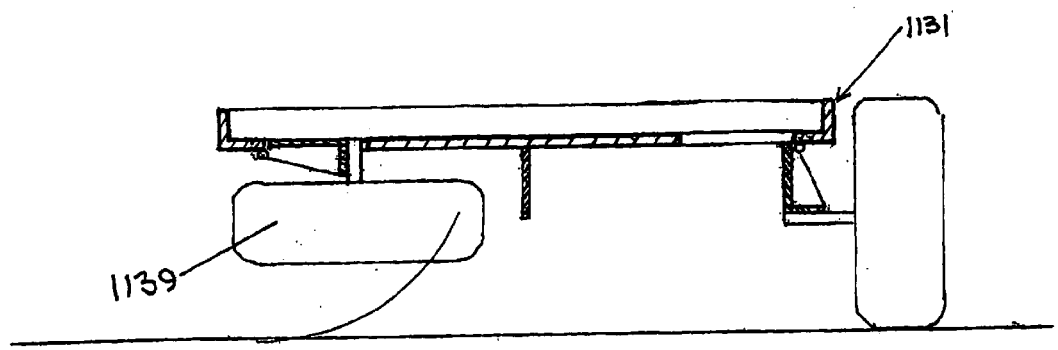
FIG. 58

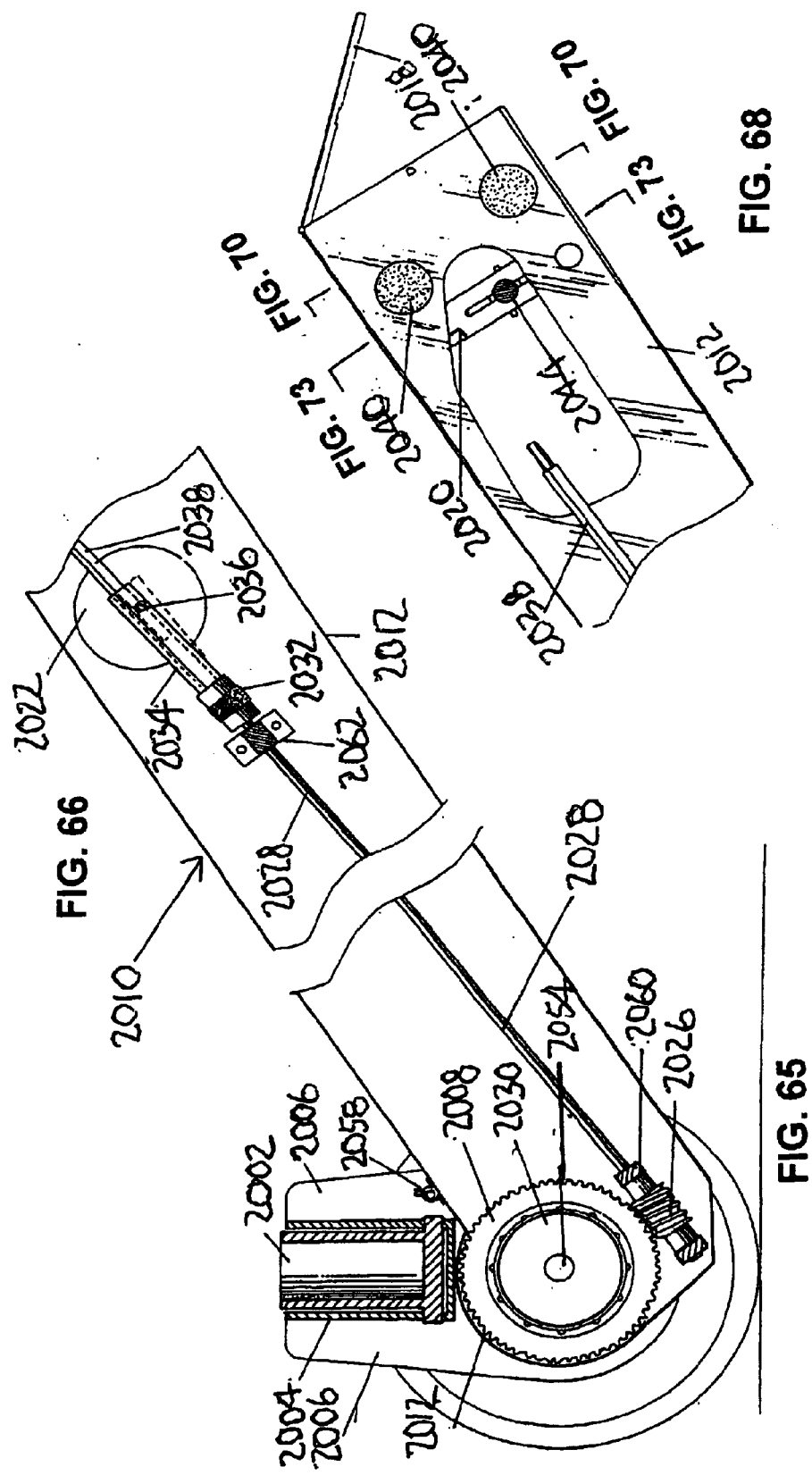

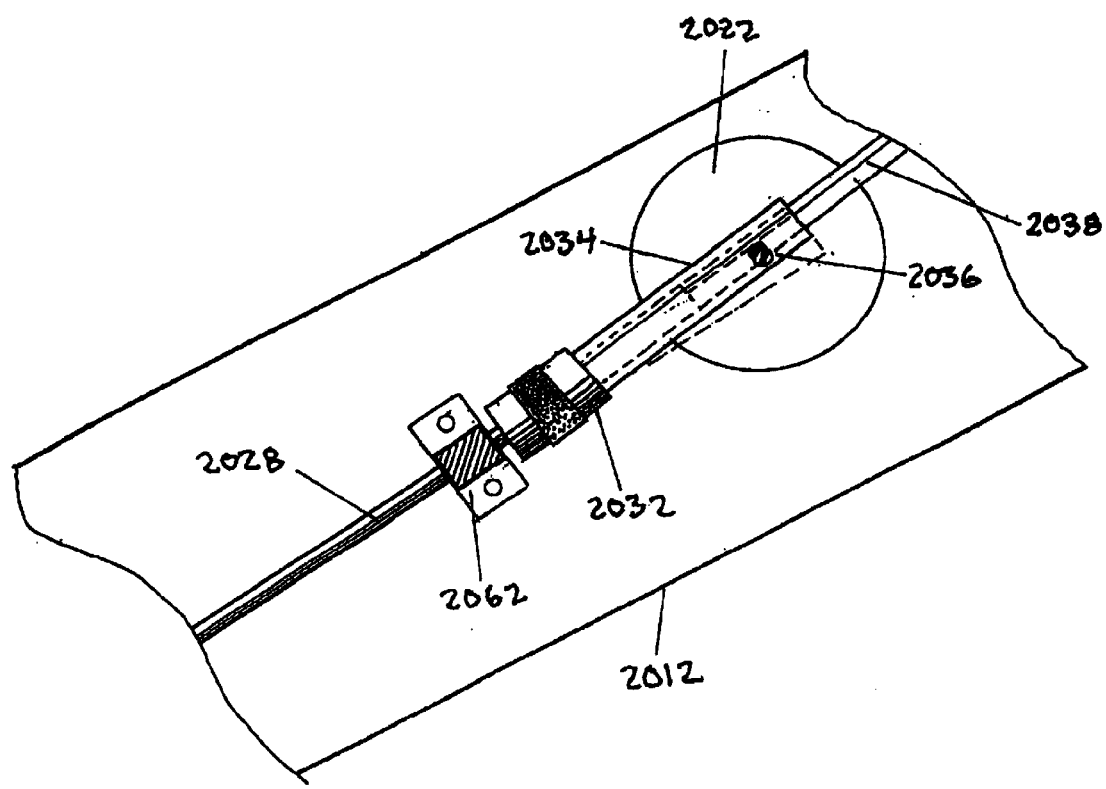
FIG 66₁

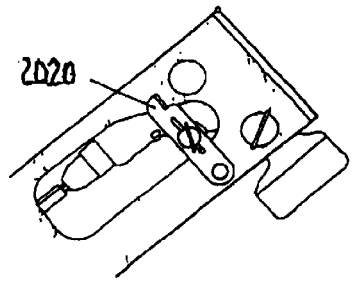
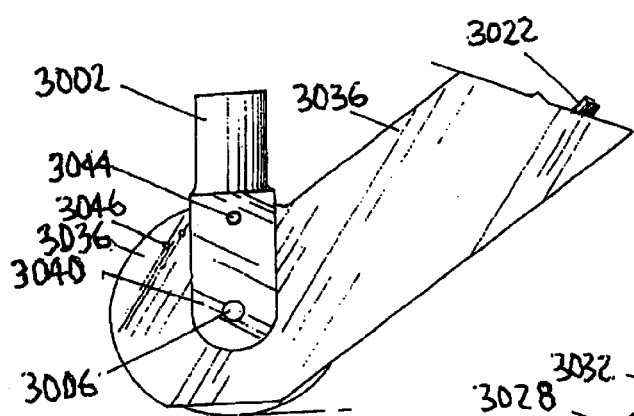
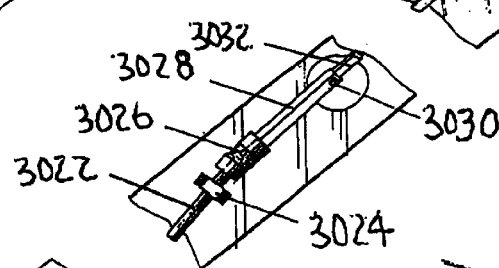
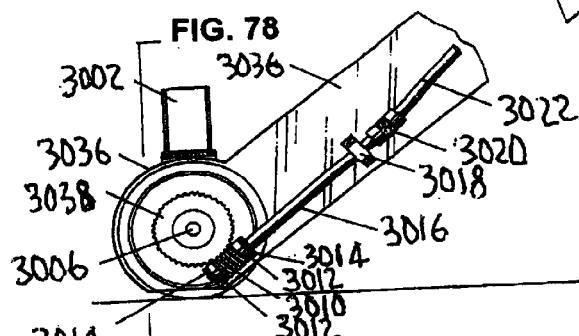
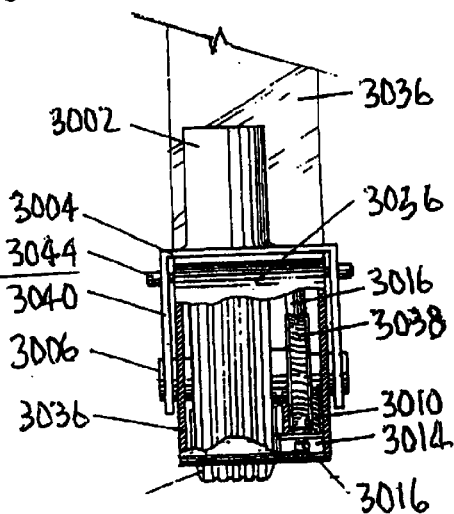

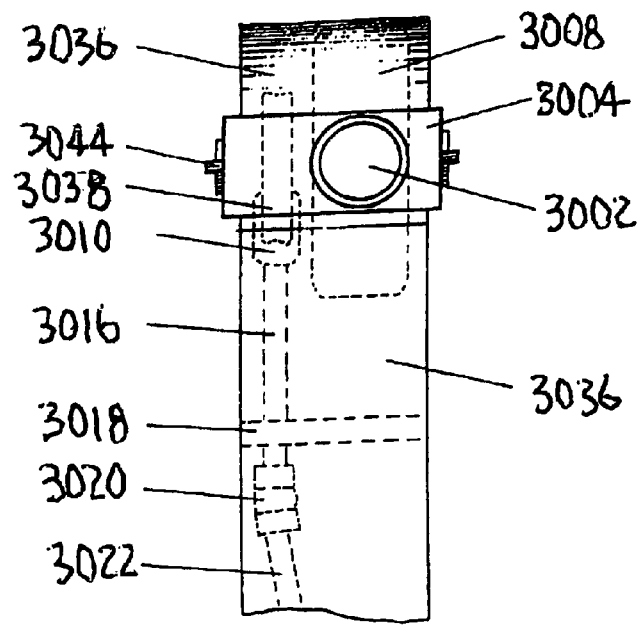
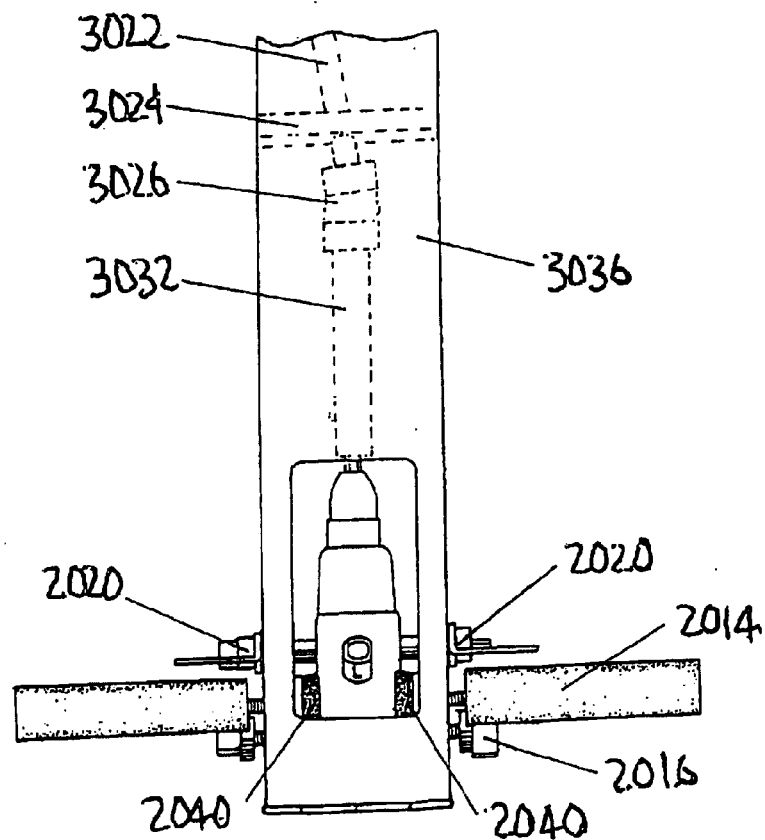
FIG 79

COMPACT MULTIPURPOSE TRAILER TUG

BACKGROUND OF THE INVENTION

1. Field of the Invention

This invention relates to devices used to move trailers about when they are not attached to a towing vehicle. Specifically, it relates to small lightweight portable trailer moving devices operated by an individual.

2. Discussion of Prior Art

Unless they can be driven to the desired spot and simply dropped from the trailer hitch, trailers usually need to be moved after being separated from their towing vehicle. Sometimes the task might be as simple as moving the trailer from the street to the far end of the driveway because the driver lacks the ability to skillfully back a trailer up. Another example: where municipal ordinances allow continuous parking of unattached trailers on the public streets, it is usually necessary to move the trailer at least once a week and sometimes more. One cannot always find a spot near the house, and backing a trailer into a parallel parking space is difficult at best and more often than not, impossible.

Aside from the need for a device for moving trailers in the above situations, it is often necessary to move a trailer, any kind of trailer, around in various situations such as a utility trailer or a horse trailer around the premises, or a construction trailer on a job site. This often is done in cramped areas such as driveways, parking spaces, parking lots, stables, and the like. Bringing a horse trailer to a fair for a show or a rodeo can often be a problem as is bringing a trailer loaded with the owner's wares to a swap meet or other kind of outdoor sales event, at which spaces are very tight and many other vehicles and people are around. When such situations exist, it is frequently found that a trailer must be squeezed into a space. The inventor witnessed such a problem while writing this application: His neighbor across the street was having his house upgraded. One of the small contractors he hired had a box trailer about 12 feet long and packed with tools and gear. Each day he had difficulty in positioning this portable workshop. One day the only way he could do so was to drive into the driveway and he could not pull any further than just even with the sidewalk. As a result, his rear door, which doubled as a ramp, totally blocked the sidewalk all day long, making pedestrians noticeably unhappy. With this Tug, he could have left his truck in the street and put the trailer anywhere, including the lawn.

Disabled persons will appreciate having a trailer mover that can be used anywhere.

Outside of the city there are many times a trailer must be moved, such as backing a large boat into a spot at a motel with cars on either side, and with travel trailers at campgrounds that do not have drive-through sites, but require backing in. Many natural campground sites have hills, trees, etc. that must be circumvented. There is where the moving is most difficult. It is rare to see a person drive into a campground and leave their trailer connected to the towing vehicle for any length of time. Even going into town to get groceries is reason enough to leave the trailer parked if it is a large one and the terrain is difficult.

Such tasks and many others require some other means of moving the trailer.

At present, there are but three kinds of devices suitable for the tasks. Most trailers are equipped with a front swivel or caster wheel which is mounted on the lower telescoping tube of a screw jack attached to the tongue of the trailer just behind the hitch coupler. When the trailer is being towed, this front caster wheel is either elevated out of contact with the ground or it is removed from the jack, or both. When parking the trailer, the jack is lowered to bring the caster wheel into supporting contact with the ground. To move the trailer by hand without the aid of its towing vehicle, the trailer jack is lowered by means of its crank, thus raising the tongue to release the trailer from the vehicle. The trailer is then supported entirely by its main wheels and the front caster wheel. The trailer may then be maneuvered into a desired parking position by pushing and/or pulling on the trailer in such a way as to roll the trailer on its main wheels and caster wheel. This method is laborious, difficult and time consuming and could pose serious consequences for persons in poor physical health or persons who are simply weak. Many travel trailer users are seniors to whom employing such means as above is, in many cases, out of the question.

One inconvenience, or aggravation of such built in trailer jacks is the fact that they are made with a screw that has a large mechanical advantage. As a result, it takes a great many turns to raise or lower it only a short amount. Often there is a differential in heights between the location of the trailer tongue when it is on the towing vehicle and where it needs to be when it is parked or when it is hooked up to a device to move it. It can be an arduous task to crank that distance when one is trying to move the trailer or secure the campsite. It can take 100 revolutions or more to get it where it is wanted, which can be strenuous for many people.

Another means of moving a trailer independently of its towing vehicle is a hand-powered dolly. Such dollies generally have a pair of wheels mounted on a frame with a long handle. A cross bar or beam rises up and terminates in a trailer hitch ball. To use such a device, it is tipped forward, lowering the ball, rocked under the trailer coupler, and then rocked back to raise the tongue, and the latch on the coupler is tripped to secure it to the ball. It is then possible to roll the trailer around by pushing and pulling on the handle and turning it. These are an improvement over the crank-up trailer jack with a caster wheel, but still requite great exertion in many situations and again, pose a health threat to certain persons, this inventor included. They are also generally too large to be easily stored in a trailer or a car trunk without some disassembly. And there is always the possibility with these types of devices that the user might forget to lock the tongue to the ball so that if the dolly rocks forward, under the right conditions, the trailer could break loose and cause great damage or injury.

The sole other kind known to the inventor is taught in U.S. Pat. No. 3,439,764 to Kimball (1969) commercially known as the "Power Caster." It is a dolly powered by a 120-volt AC motor and requires a 100' extension cord. Both the hand powered variety of dollies above and the "Power Caster" by Kimball have significant limitations. Depending on the weight of the trailer, the hand-powered dolly requires a level of strength that not every person has. And using a hand-powered dolly on hilly or rough terrain is generally out of the question.

Among its other limitations, the Kimball device and its clone, the "Powermover" precludes such operations as moving a trailer on a public street in all but the most narrowly defined circumstances, and is significantly limited in most other situations as well, including but not limited-to the 100-foot restriction of the power cord, the dangers of a publicly exposed electrical cord—particularly on the street, and the tasks of finding an AC receptacle or of using a portable generator if one is traveling.

My Tug is the answer in all situations, including at wilderness campgrounds or, for that matter, in the wilderness itself. It is completely independent from a power cord and therefore can be used anywhere a trailer can go, significantly increasing both the number and the nature of places the trailer owner can bring his trailer, and also increases the activities the user can engage in when he gets there if he uses the accessory cart that is a part of this invention.

It is uniquely different in almost every way from prior art powered by AC motors with all of their limitations. This is because it operates on small lightweight, fast-charging batteries with specialized power curves, uses high RPM motors with large gear reduction assemblies, is guided by a Joystick controller at the end of an electronics cable that need not be any longer than four feet, or alternatively by wireless radio frequency control that allows the operator to stand at the side of the trailer several feet away from it or even at the far end and observe just where and how the rear of the trailer is moving. The operator could actually stand on the trailer's roof and operate the Tug if desired.

The invention is extremely maneuverable, being able to rotate 360 degrees within its own length and not requiring a bulky, motion-limiting, hard-to-store handle to use in operation and steering. Additionally, it has a gimbaled feature that allows its use on irregular terrain without traction loss and potential damage to the trailer or itself. Some of its other features are a unique Free-wheeling clutch design and a self-parking D-ring on a component pin in the clutch design. It incorporates circuitry to allow charging of the batteries by AC or DC from other sources, including solar panels. Charging is done with batteries installed, but its twin battery packs can be removed in just seconds to lighten it if needed for lifting or carrying by handles incorporated therein. The invention includes an assembly that uses an attachment post to be used in lieu of a trailer's built-in crank jack, and the post can be raised or lowered rapidly without arduous cranking.

In the preferred embodiment shown here, the Tug's overall size is approximately 24 inches wide, 13 inches high and 14 inches front to back, making it small enough to be stored in many places. It can also be made smaller with only slight variations. It could be reduced in overall size by use of smaller components. It could retain the components envisioned here but omit the side cavities outside the Motor Mounting Plates 246L&R making it about six inches narrower, and add space to the front and rear for the components displaced. Its overall weight, depending on the weight of the battery packs, is less than 100 pounds and can be lightened by approximately 37 pounds by completely removing the battery packs. In some instances, such as where the Tug will not be used for purposes other than parking a trailer, it may be lightened even further by utilizing even lighter, lower capacity battery packs. And importantly, it is able to move medium sized trailers up inclines of 10 percent. Heavier trailers can be moved simply by increasing some of the component sizes, strengths, and ratios.

A fixed handle, such as the one in Kimball, is required on that art because there is no other way to make the device turn. It has a rigidly attached handle which is used to steer the device and to roll it back and forth from its storage area to where it will be used. A handle that is fixed to the dolly as in Kimball has several notable limitations. Moving a trailer either forward or backward in a straight line using a device that has a handle fixed to it requires that the operator stand or walk on the trailer's longitudinal axis because these devices attach to the trailer at the trailer's crank jack, which is on that axis. Moving the trailer forward, that is, hitch end first, requires the operator to be walking backward and looking over his shoulder. Moreover, since he must be on the longitudinal axis for maneuverability, he can only move the coupler (the part that attaches to the ball hitch) as close to a wall or fence as the length of the handle and then must step out of the way to get the handle against the wall or other object. In order to get the coupler right up to the fence, it is necessary to engage in some arduous "back-and-forthing" which still cannot totally accomplish the task. In fact, without the user backing up, the trailer cannot be moved in a forward direction at all with a dolly with a handle because the dolly is sitting directly under the trailer tongue and the tongue prevents swinging the dolly handle under it. Even just moving the trailer away from the towing vehicle without first moving the towing vehicle away, requires first moving the trailer tongue backwards at an angle to one side until the handle can be swung into alignment with the longitudinal axis. This maneuvering could be described as "tacking" away from the spot, to use a sailor's term. Thus it can be seen that with a dolly that must be attached to the trailer's own built-in jack post, and with a rigidly attached handle, the possible movements are not only considerably limited by obstructions such as walls or fences but also by the obstruction of the trailer tongue itself and such a device cannot perform certain maneuvering operations at all. With a long handle slanting upward to the user, it is impossible to swing it anywhere inside the edge of the trailer tongue. This removes from its operational compass an arc of between 45 and 90 degrees, depending on the trailer. This disadvantage can be overcome by using the dolly in reverse, but not without extra effort and time and the problems already mentioned.

In its primary embodiment, my invention does not require the use of a handle to steer it and does not have a handle at all, yet it can rotate 360 degrees around the trailer jack post or around the Post that is part of this invention. With the control being achieved through the use of a Joystick control device on a short cord, or one with R/F wireless connection, totally unlimited maneuverability is achieved. In an extreme example of its maneuverability, the trailer could be moved tongue-first into an enclosed storage space only two or three inches wider than itself. Storing a trailer tongue-first in a garage is not a common activity, but there can be occasions in which such kind of maneuvering would be necessary.

With this Tug I have invented, which uses battery power, a user can pull into a campground late at night, and rather than going through the laborious, difficult, and noisy routine of backing the trailer into a tight space while his assistant shouts directions at him, sometimes hysterically, or rousing the campground manager to secure access to AC current for the prior art device, or starting up a sufficiently high output and generally noisy generator, (Power Caster and Power Mover require 8.3 amps) he can simply hook it up to this invention in less than five minutes and then move it quickly and silently into the desired spot with little or no help from another person.

Additionally, with one embodiment of the controlling device of this invention, the user can actually stand at the back of the trailer where he or she can make sure it does not hit anything while operating the invention with the use of wireless technology while it is attached to the front of the trailer. This and other uses to be shown in this application illustrate that new and unexpected results are achieved with this invention, particularly as a result of the use of batteries as the power source, but also as a result of other new features which make this invention operable in situations when the prior art would not be operable.

SUMMARY OF THE INVENTION

In only a few of the above cases, a motorized dolly connected by an extension cord to 120-V AC could be the answer to moving a trailer around when needed without the use of a large motor vehicle. But it is definitely not an answer for moving the trailer about on the street unless the spot is right in front of the house, and it is definitely a very limited answer at camp grounds that do not have electricity and at wilderness areas unless the owner has a high output gasoline-powered generator that can generate the kind of amperage needed. And generators become problematic if there are other people about who are sleeping, plus the sound from such a generator in such a wilderness area would be greatly frowned upon.

The use of small, high output rechargeable batteries, high rpm motors with large reduction ratios, and other features described herein, produce new and unexpected results, and greatly expand the possibilities of trailer ownership. Additionally, by virtue of these features, this invention has uses beyond the movement of trailers that are towed by motor vehicles as will be revealed herein.

BRIEF DESCRIPTION OF THE DRAWINGS

FIG. 8 is a side and top plan view, in enlarged scale, showing the joystick control depicted in FIG. 2;

FIG. $8_1$ is a side view, in reduced scale of the control shown in FIG. 8.

Figure 1:
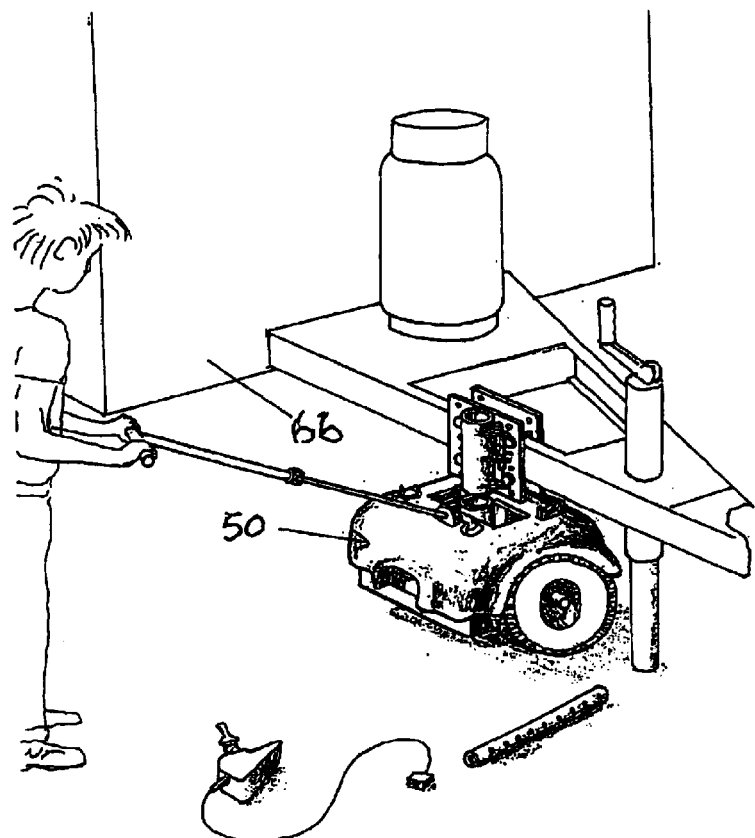
FIG. 1 is a perspective view of a Tug embodying my invention being steered under a trailer tongue using the Transport Handle as the motive force.
Figure 2:
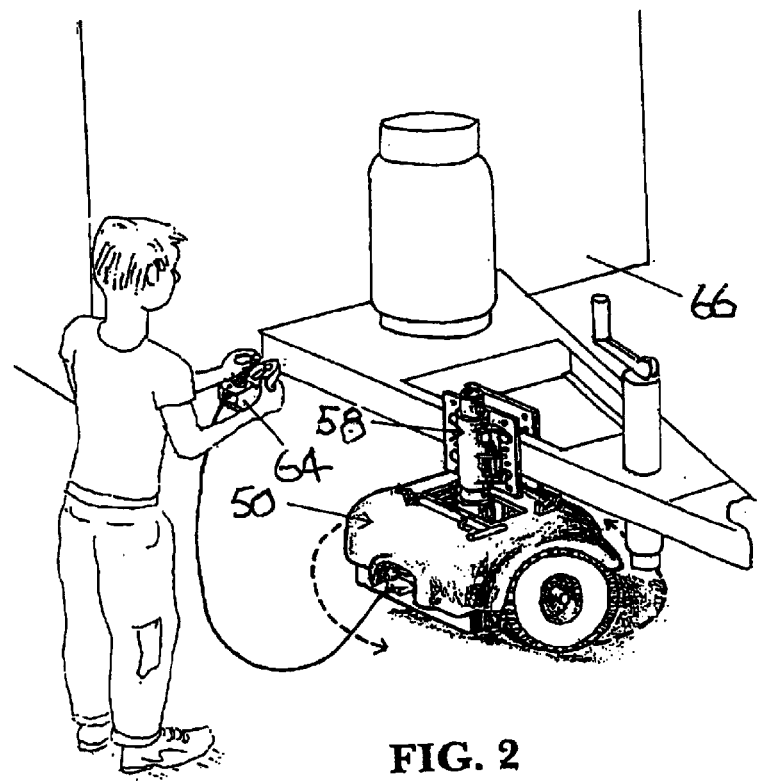
FIG. 2 is a perspective view similar to FIG. 1 but showing the Tug steered by the Joystick controlling rotation of the powered wheels.
Figure 4:
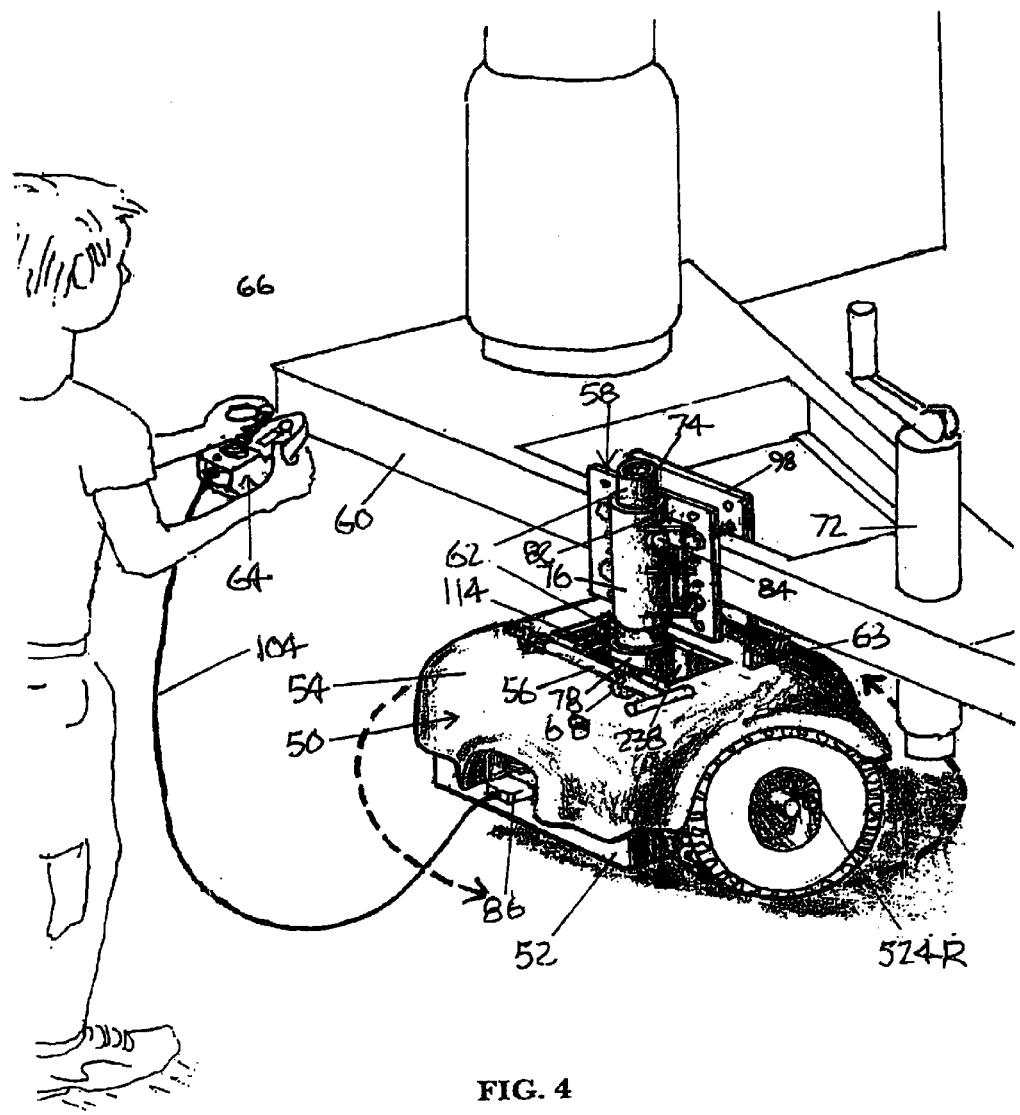
FIG. 4 is a perspective view similar to FIG. 2, but in enlarged scale.
Figure 9:
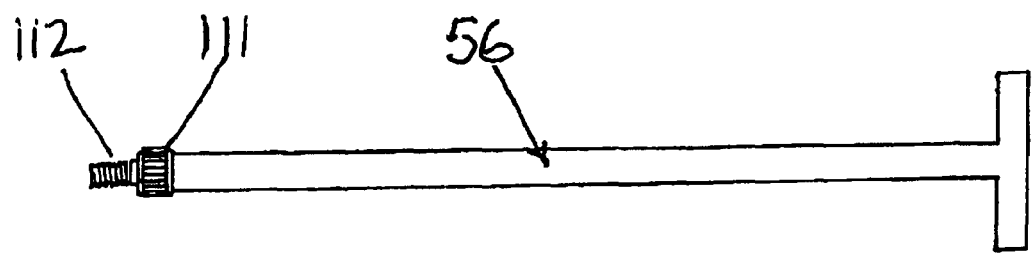
Figure 10:
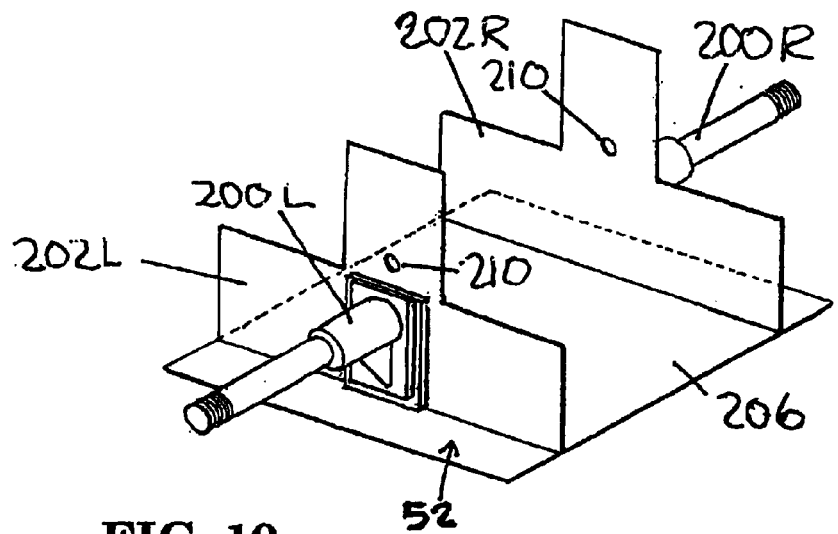
Figure 11:
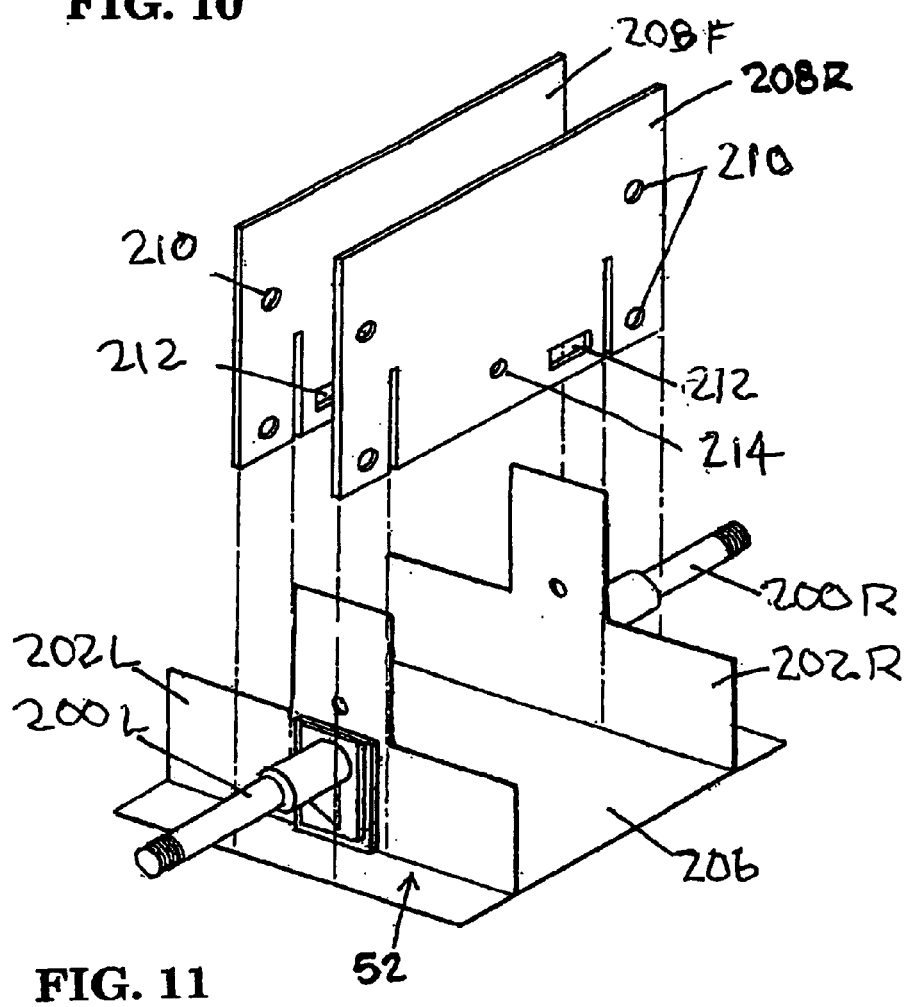
Figure 12:
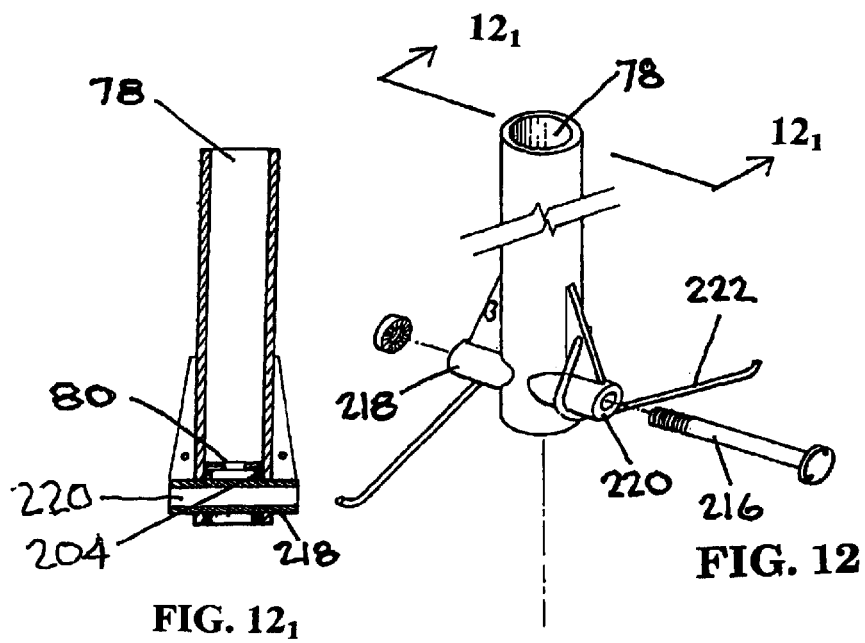
Figure 13:
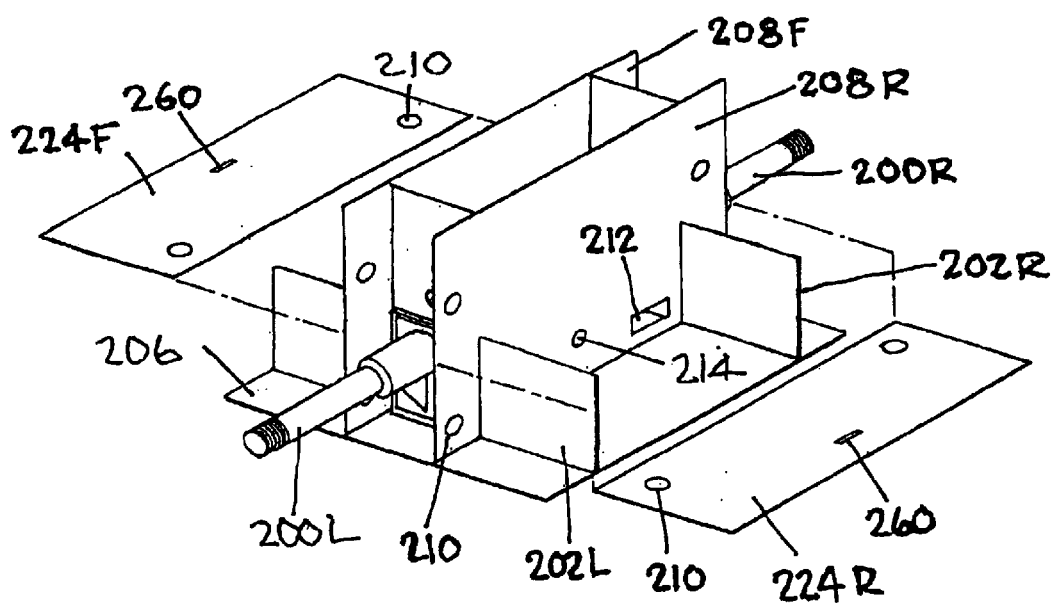
Figure 16:
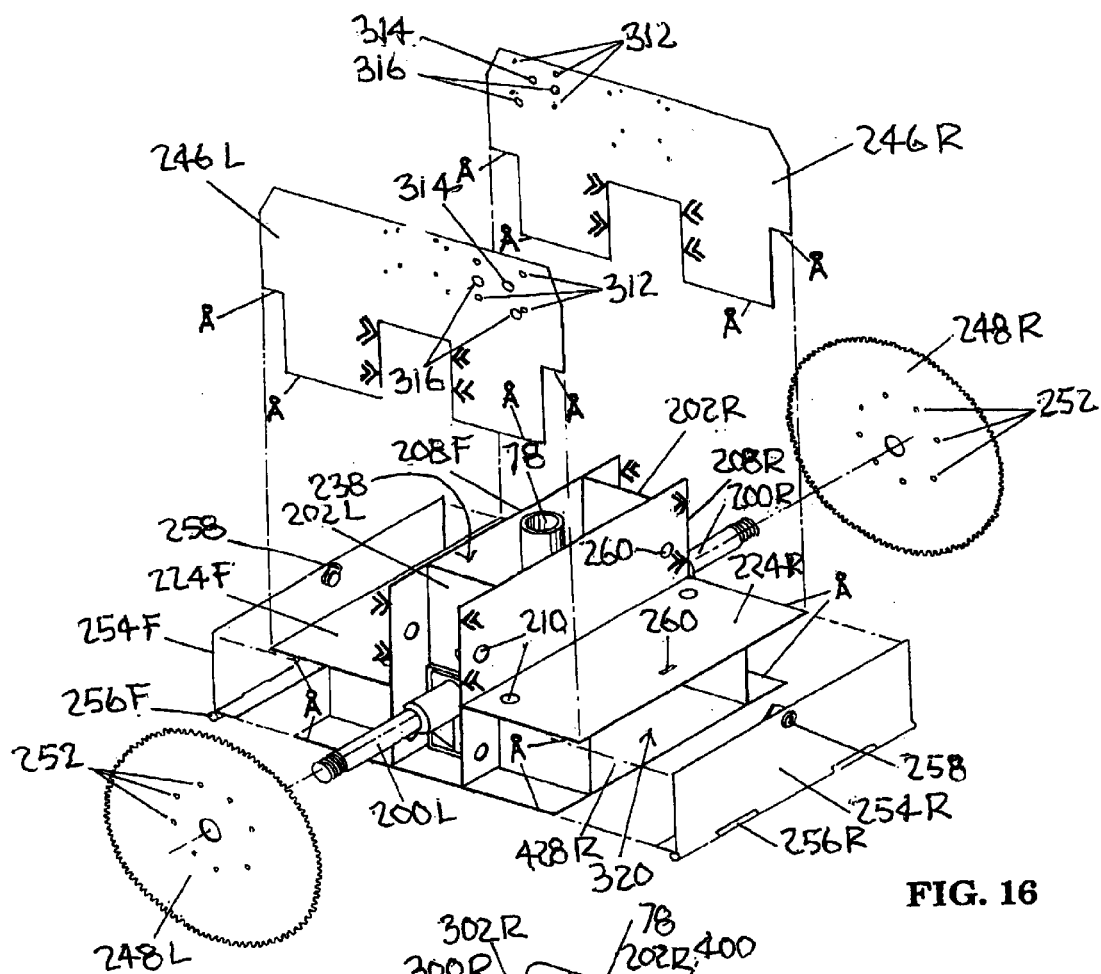
Figure 17:
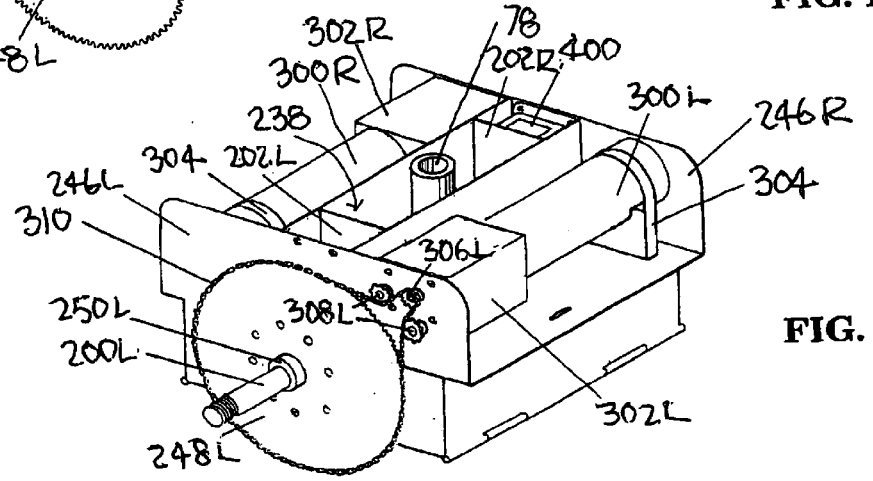
Figure 18:
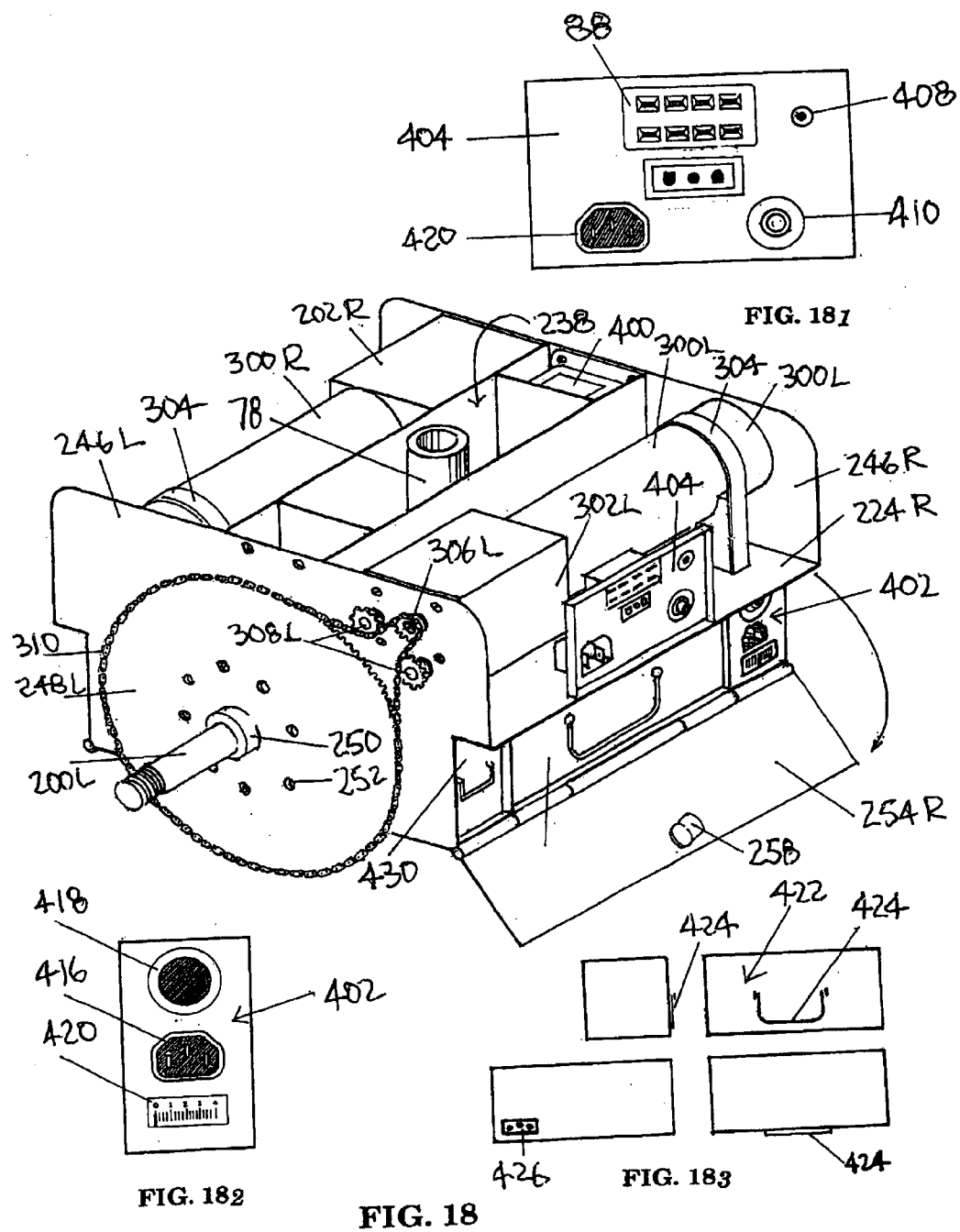
Figure 19:
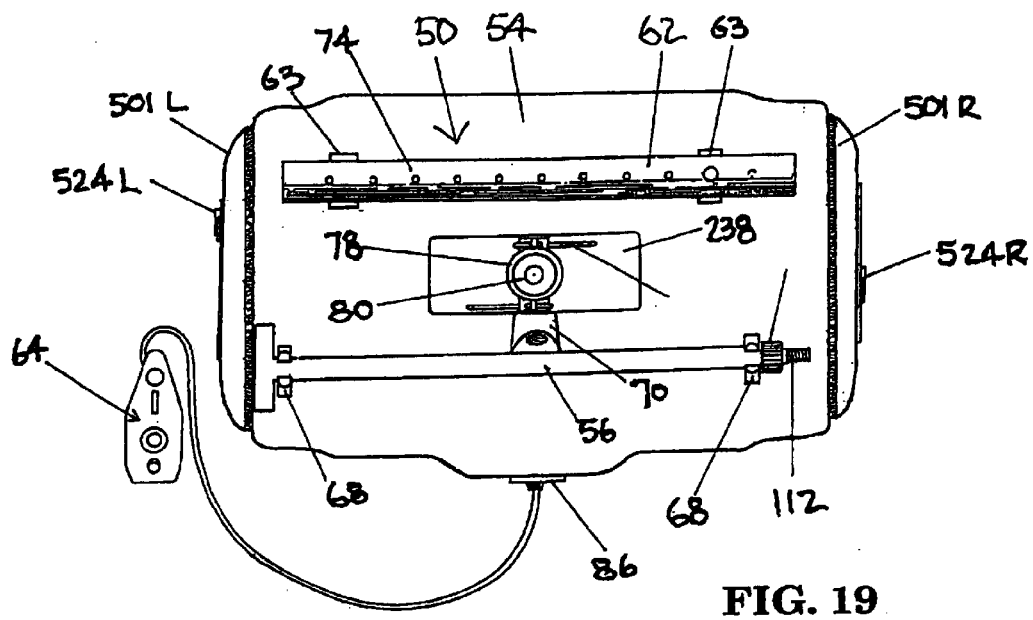
Figure 20:
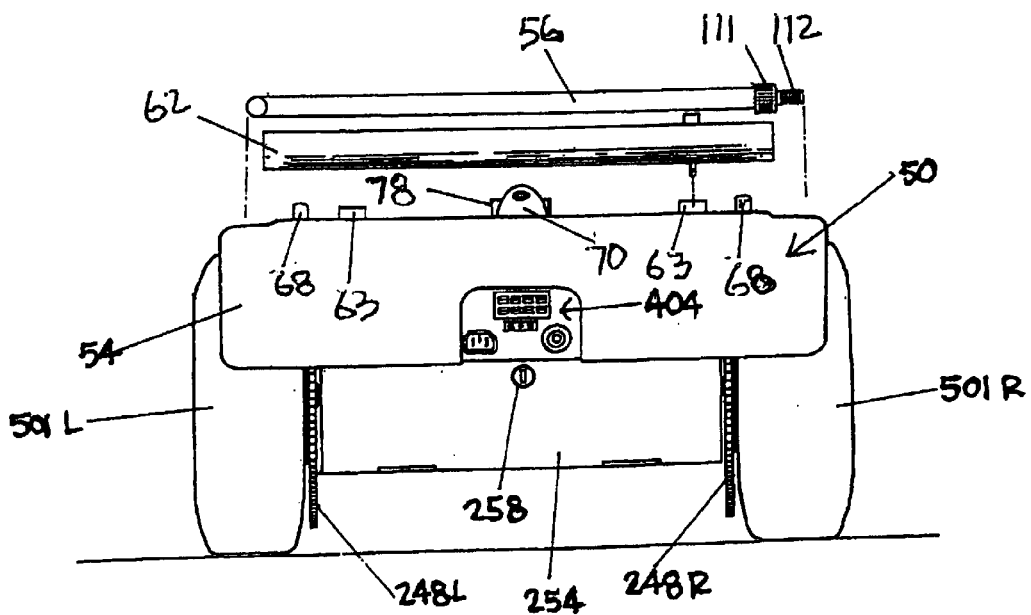
Figure 21:
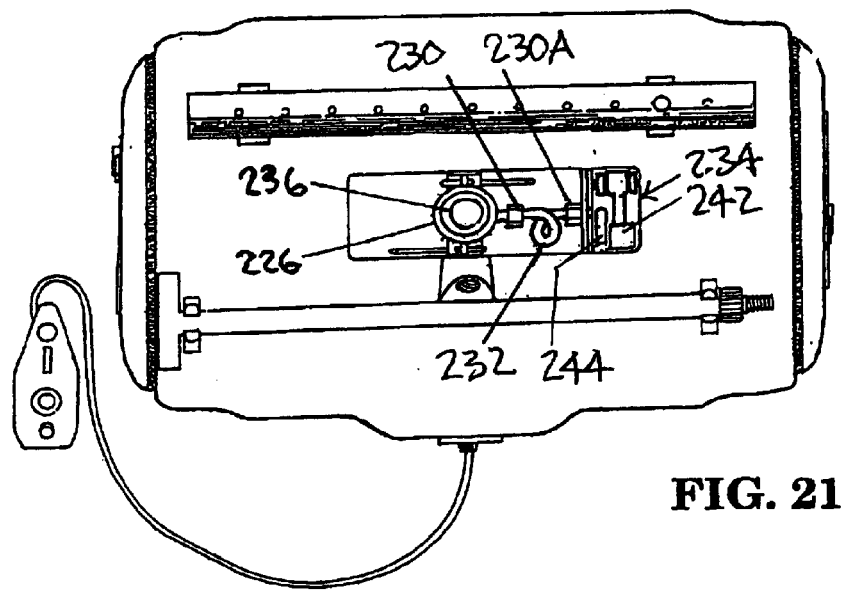
Figure 22:
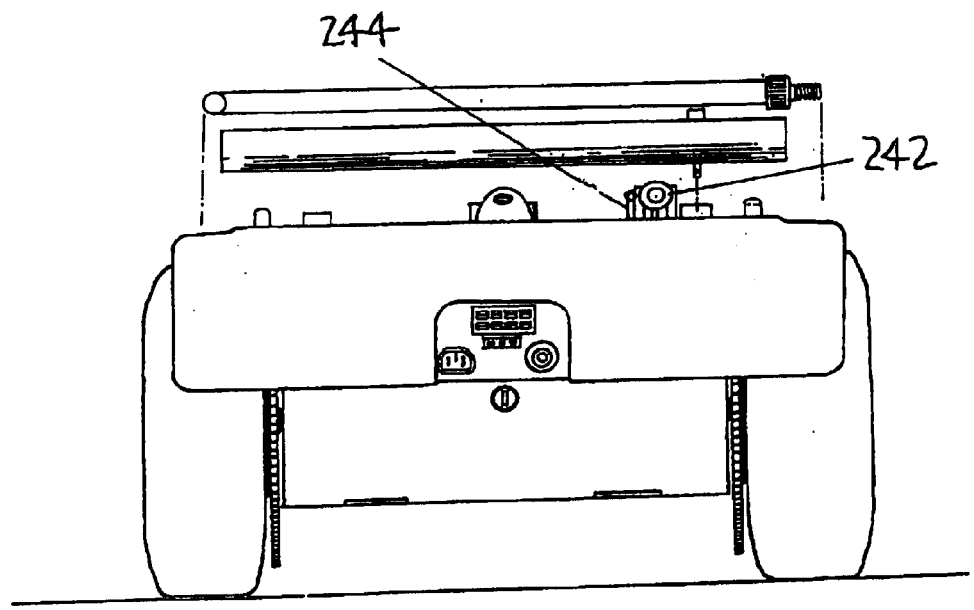
Figure 23:
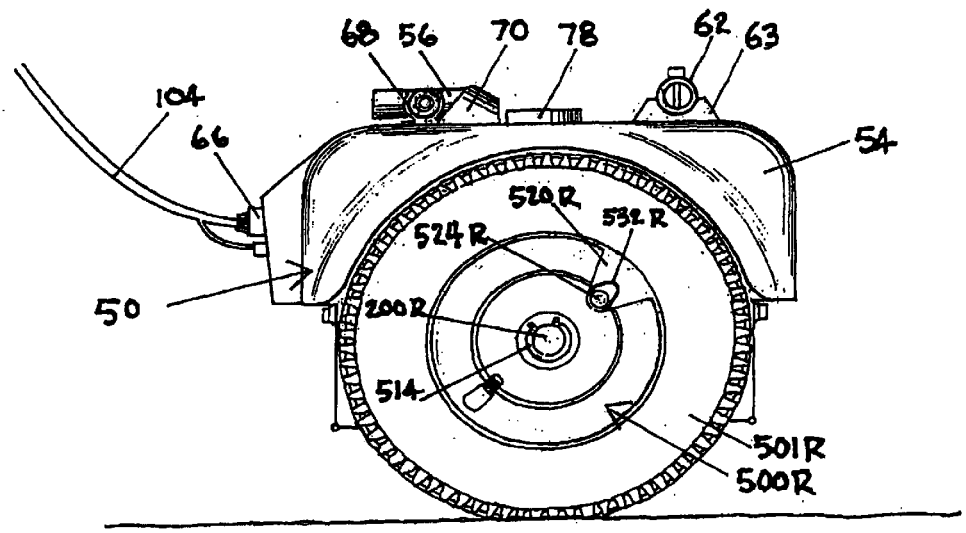
Figure 24:
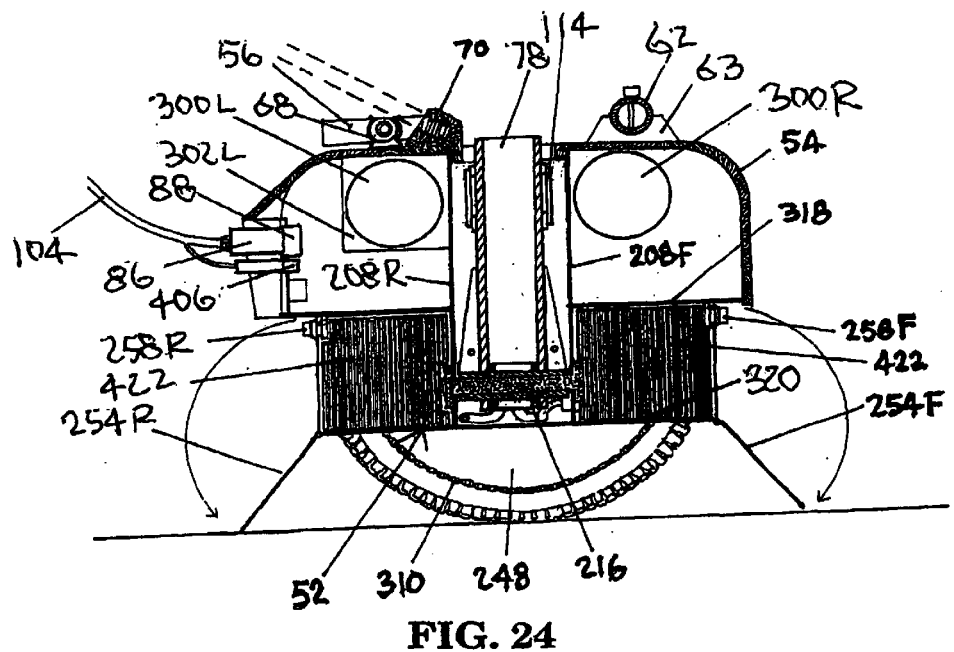
Figure 29:
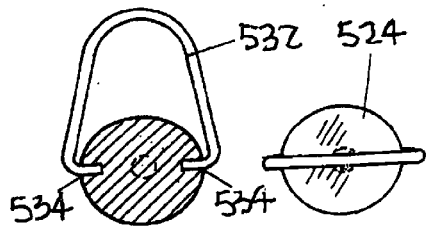
Figure 30:
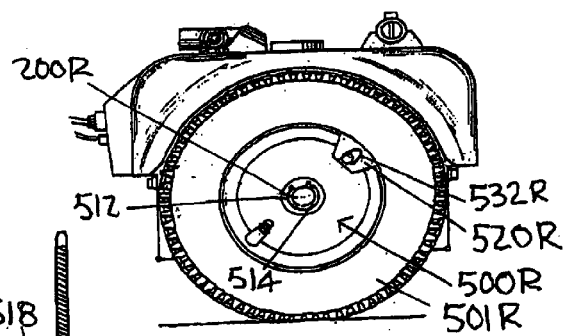
Figure 25:
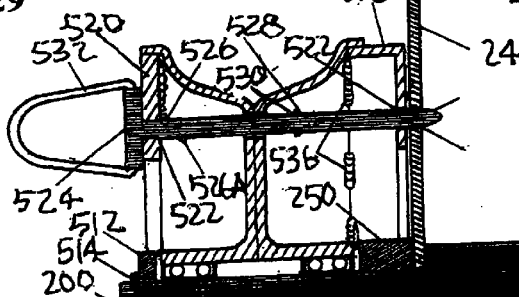
Figure 31:
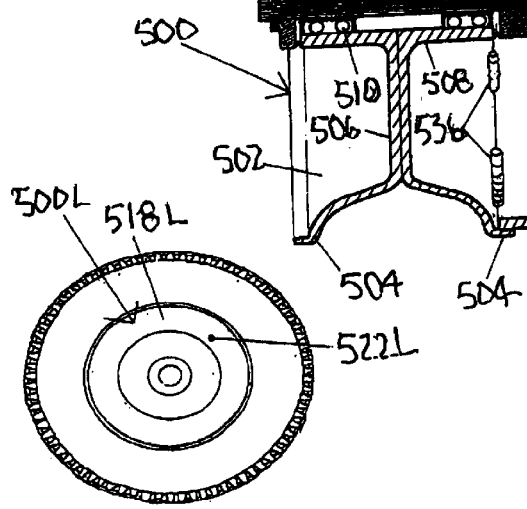
Figure 32:
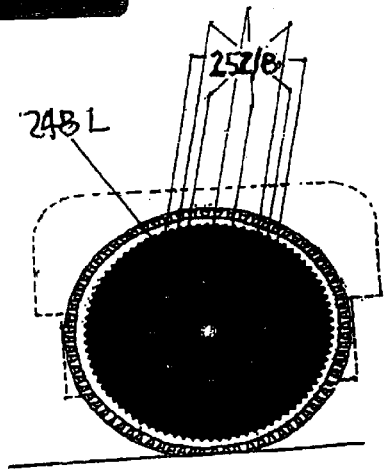
Figure 28:
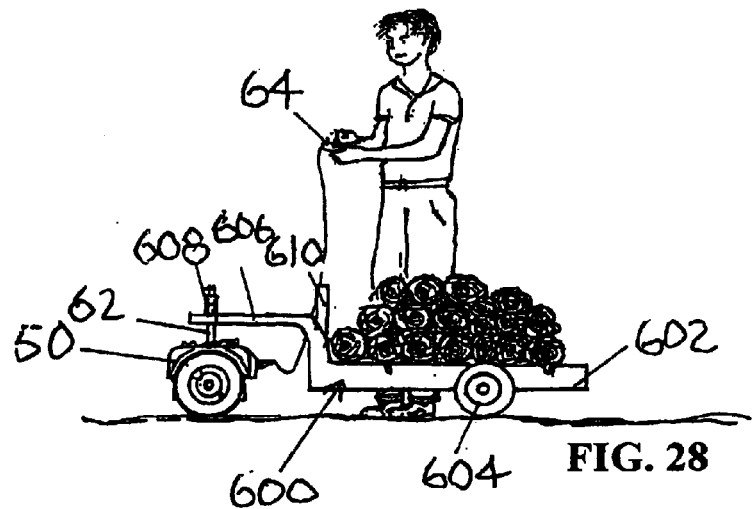
Figure 27:
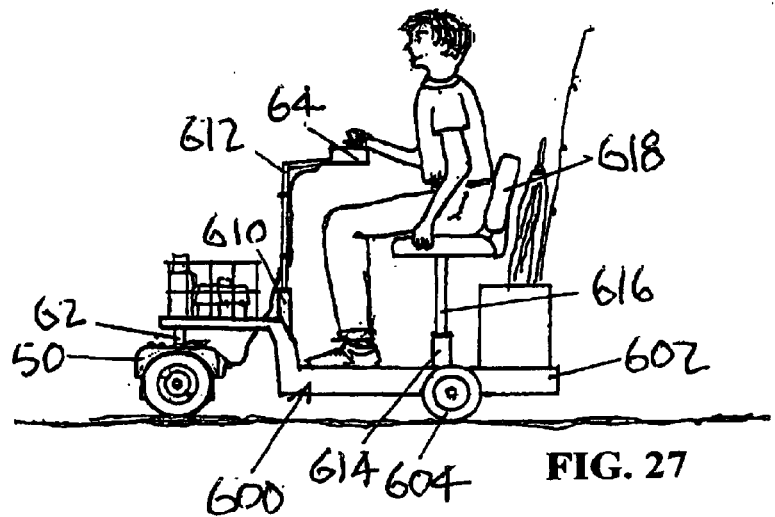
Figure 26:
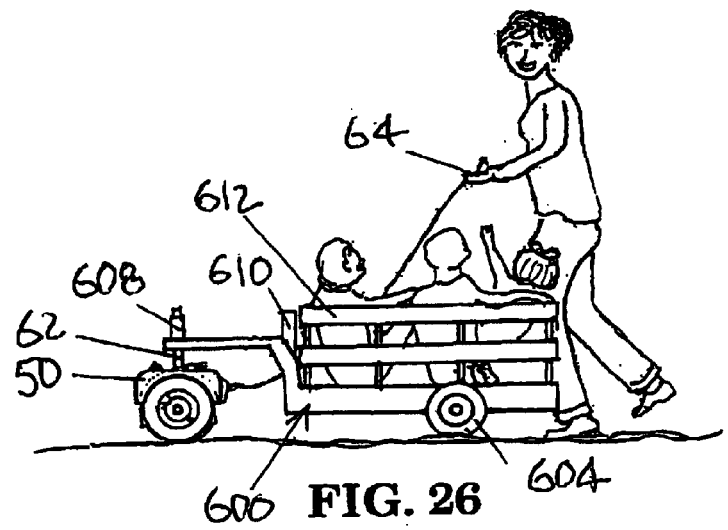
Figure 35:
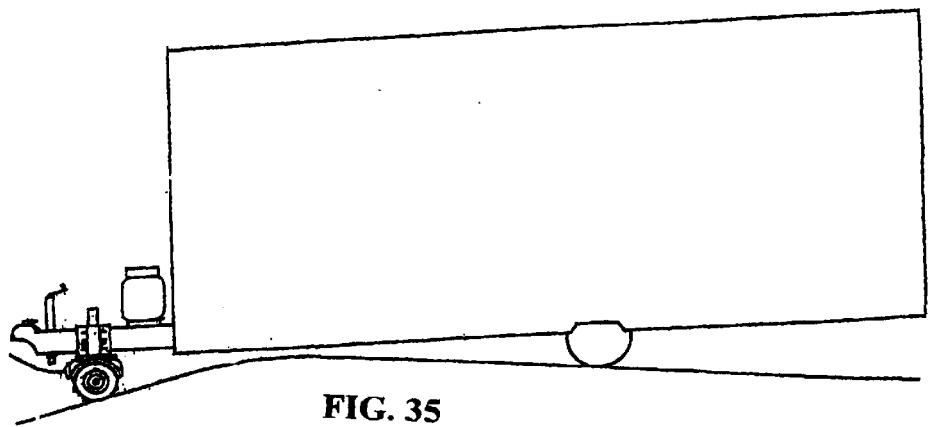
Figure 34:
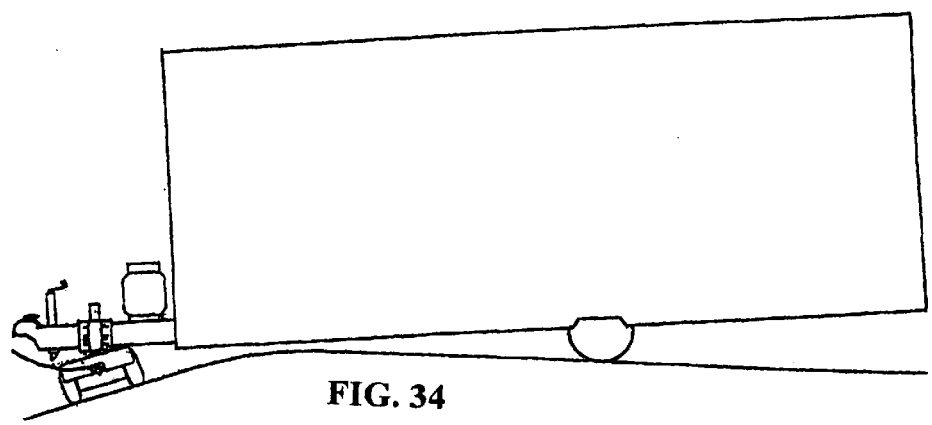
Figure 33:
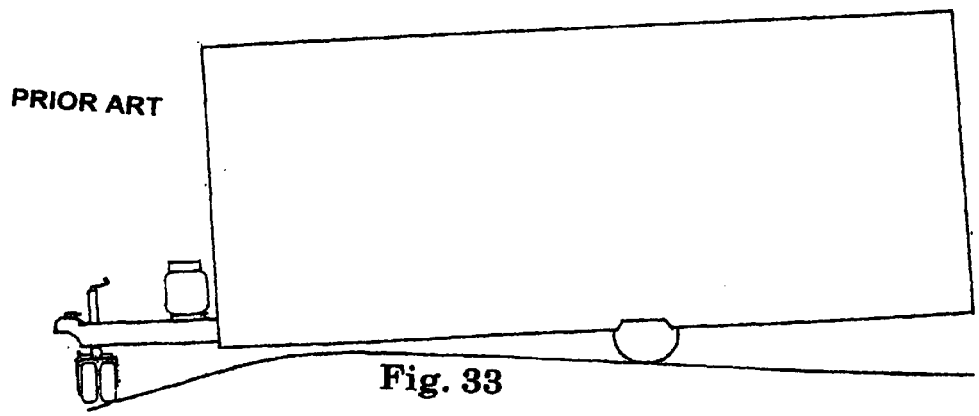
Figure 36:
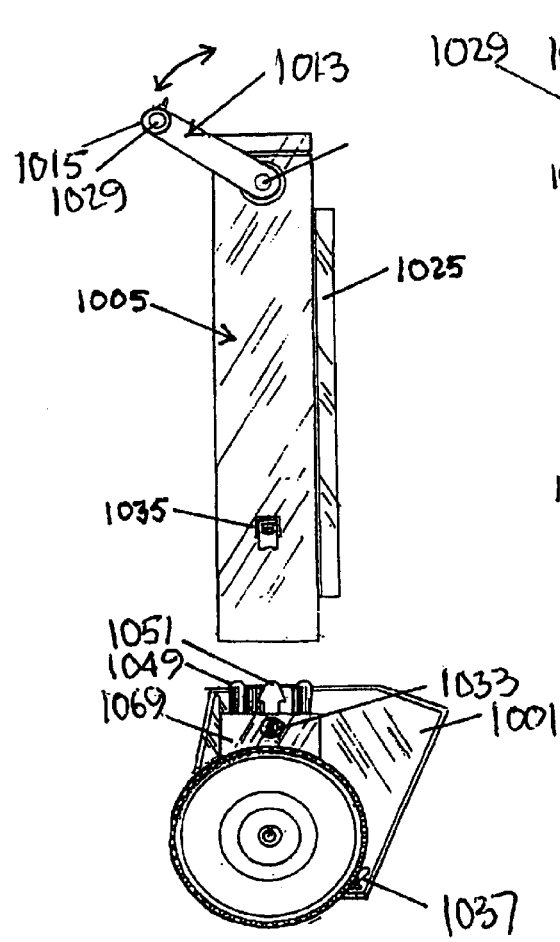
Figure 37:
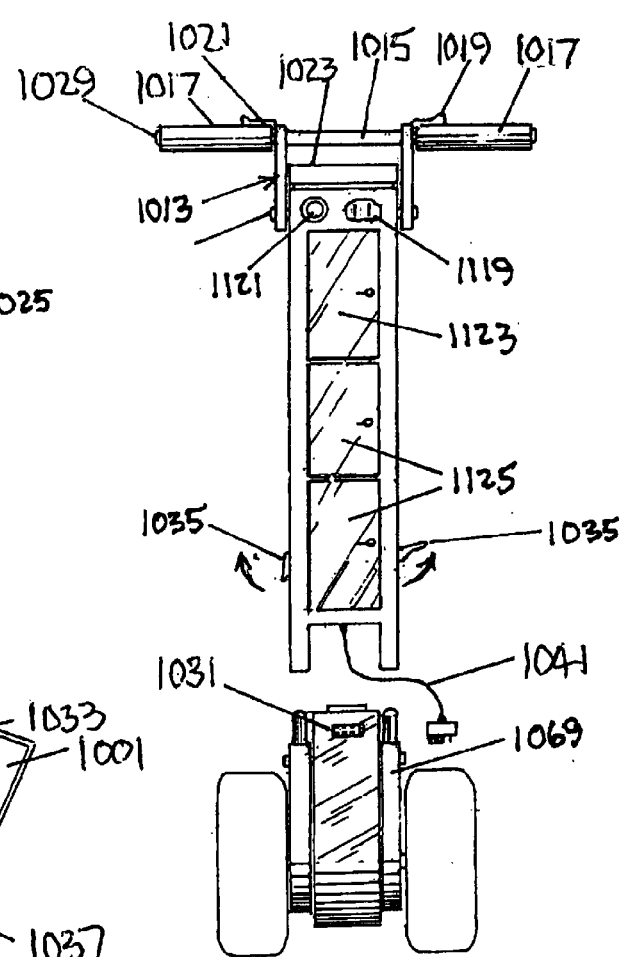
Figure 40:
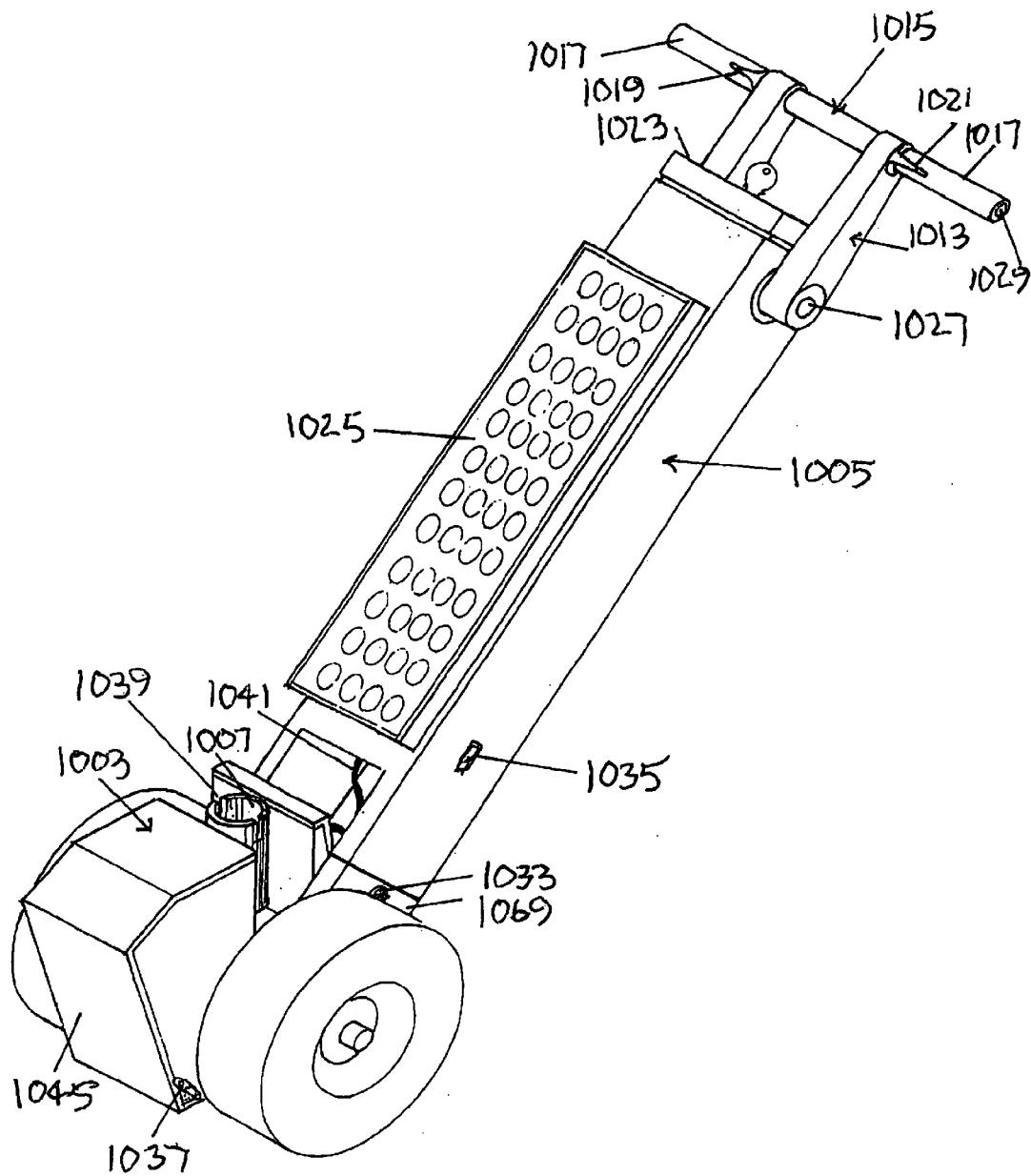
Figure 41:
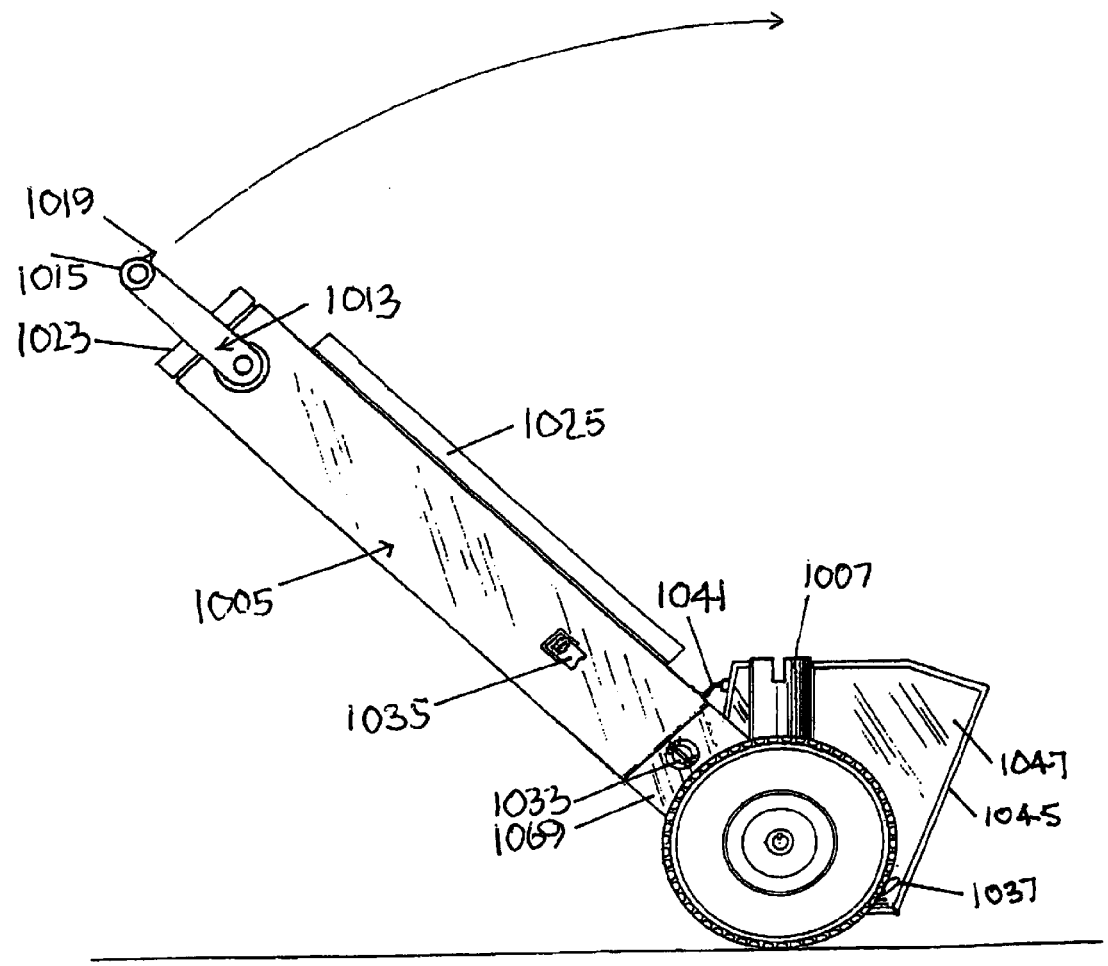
Figure 42:
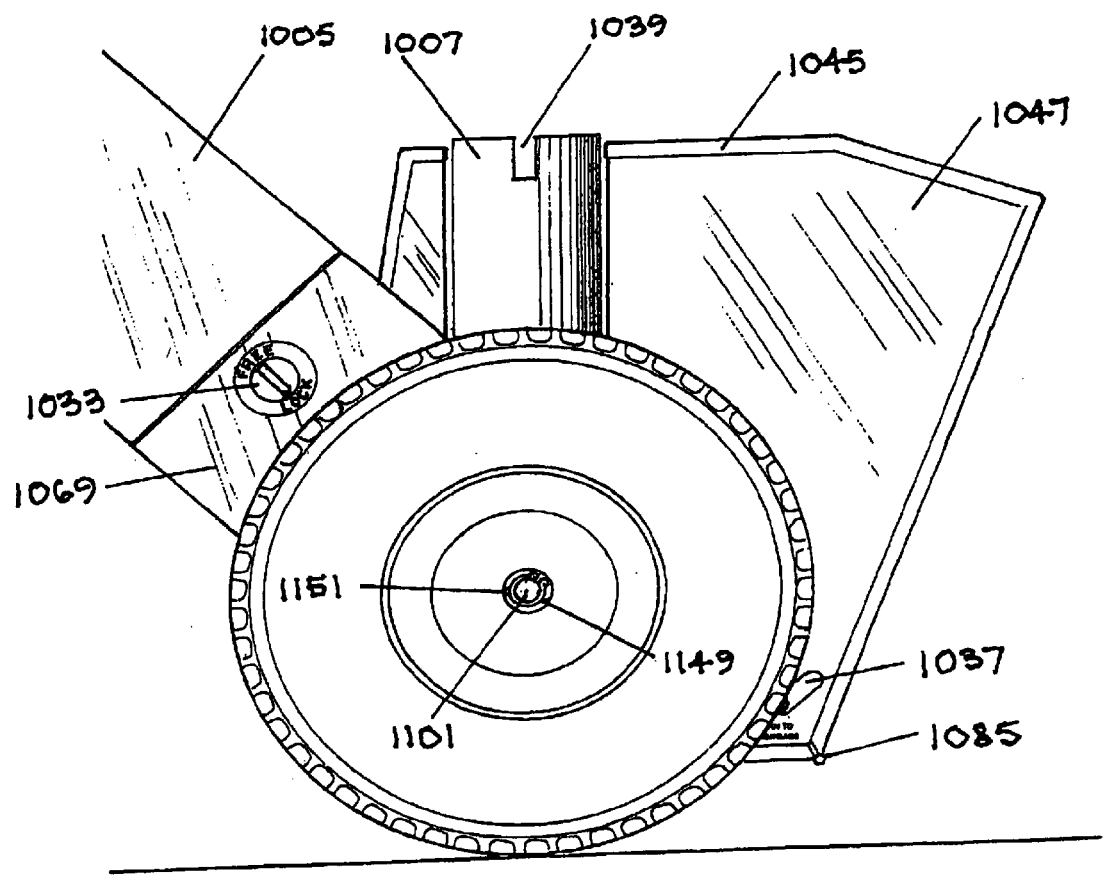
Figure 43:
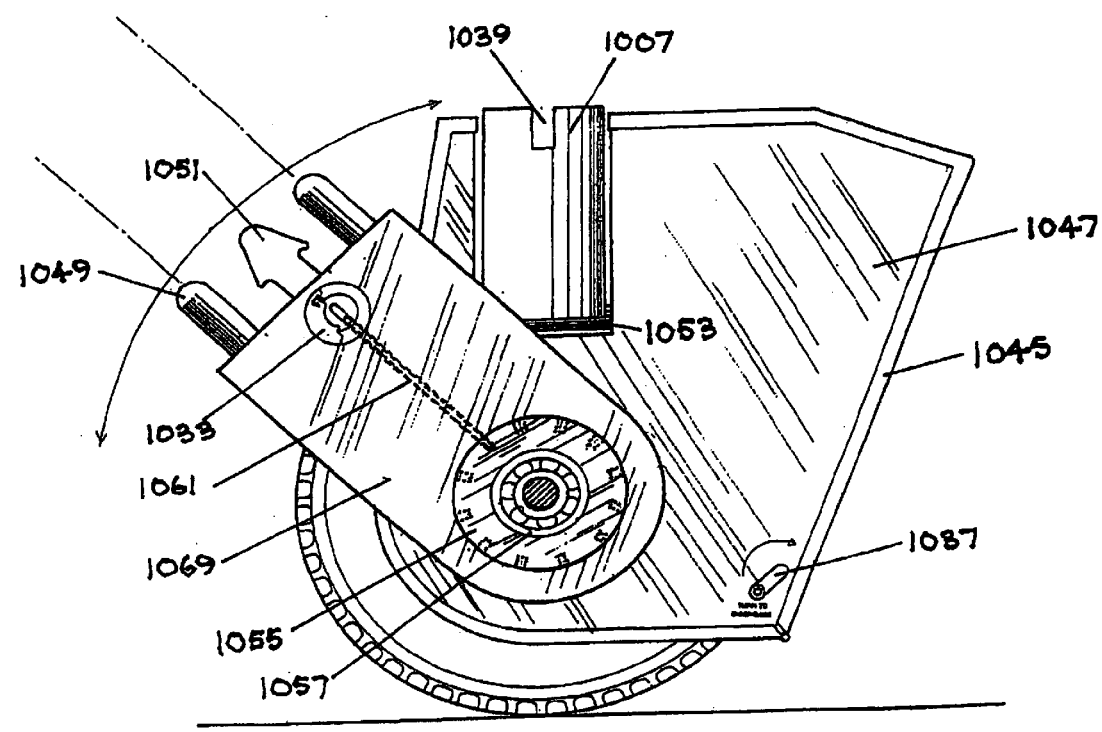
Figures 44, 44A:
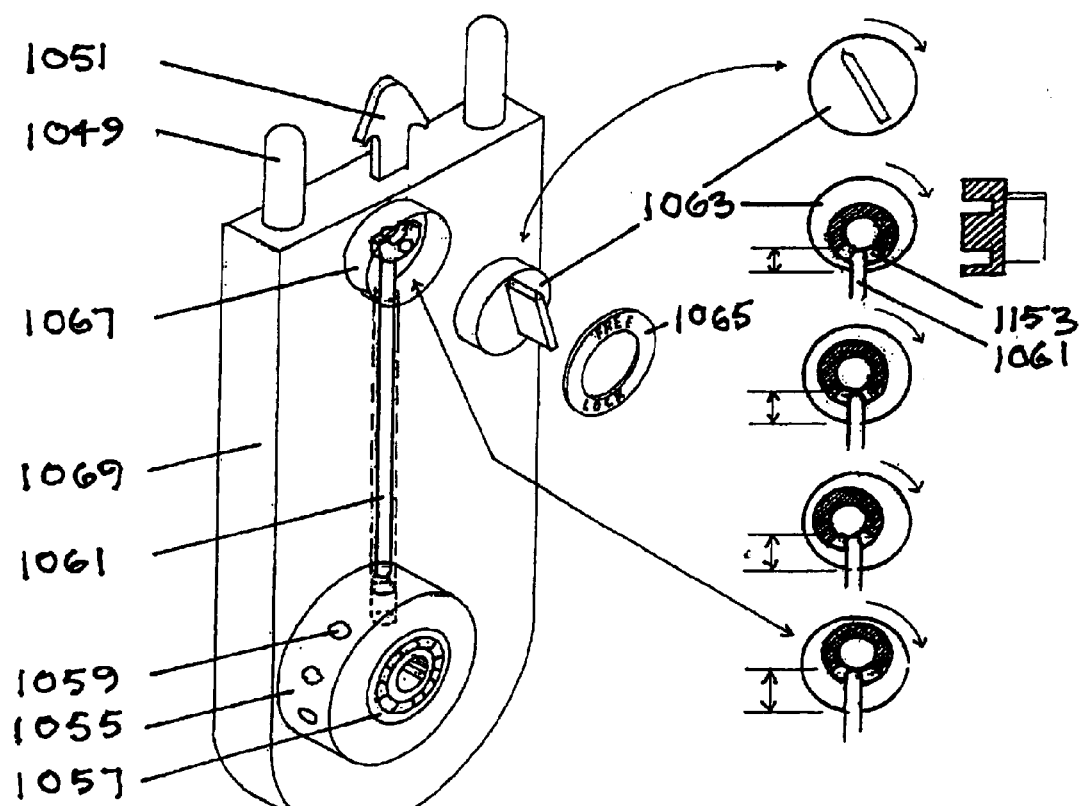
Figure 45:
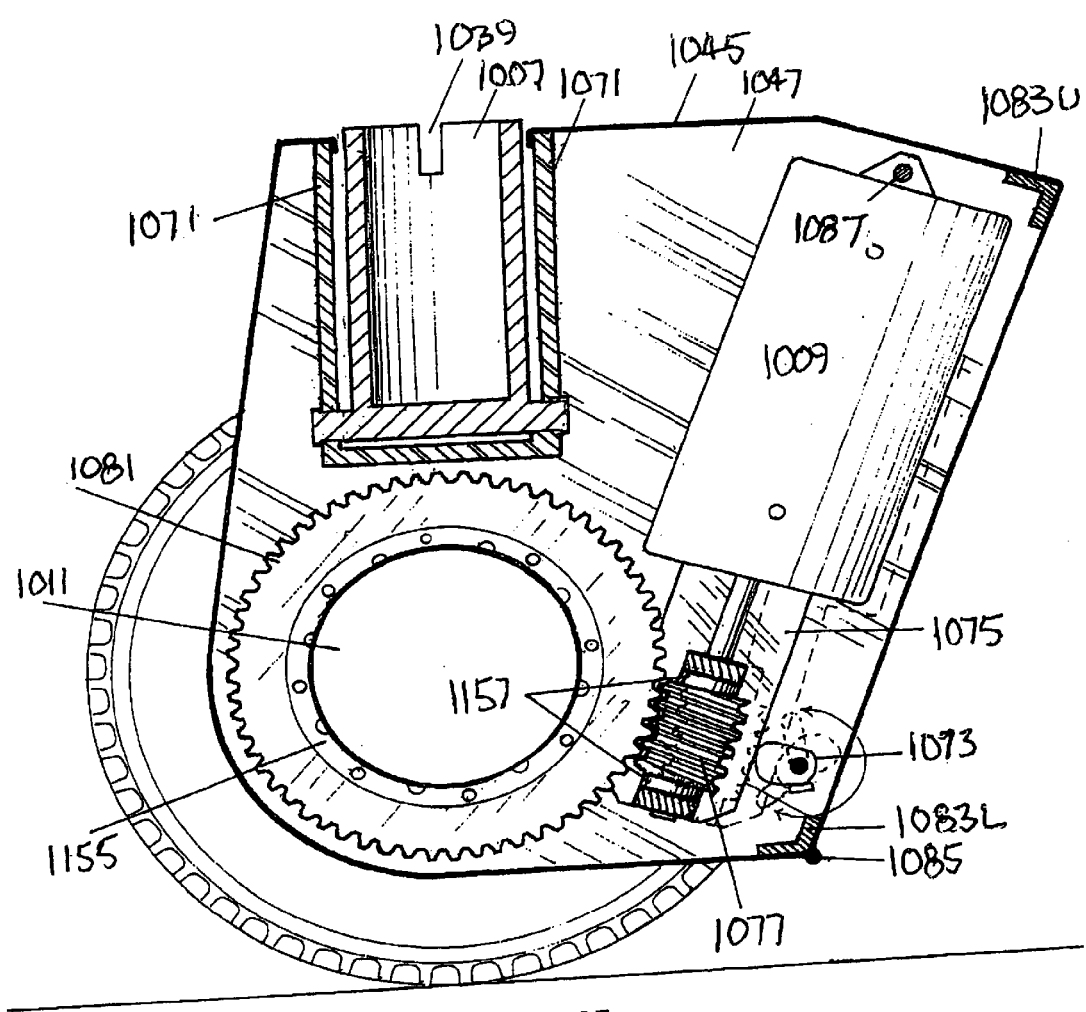
Figure 46:
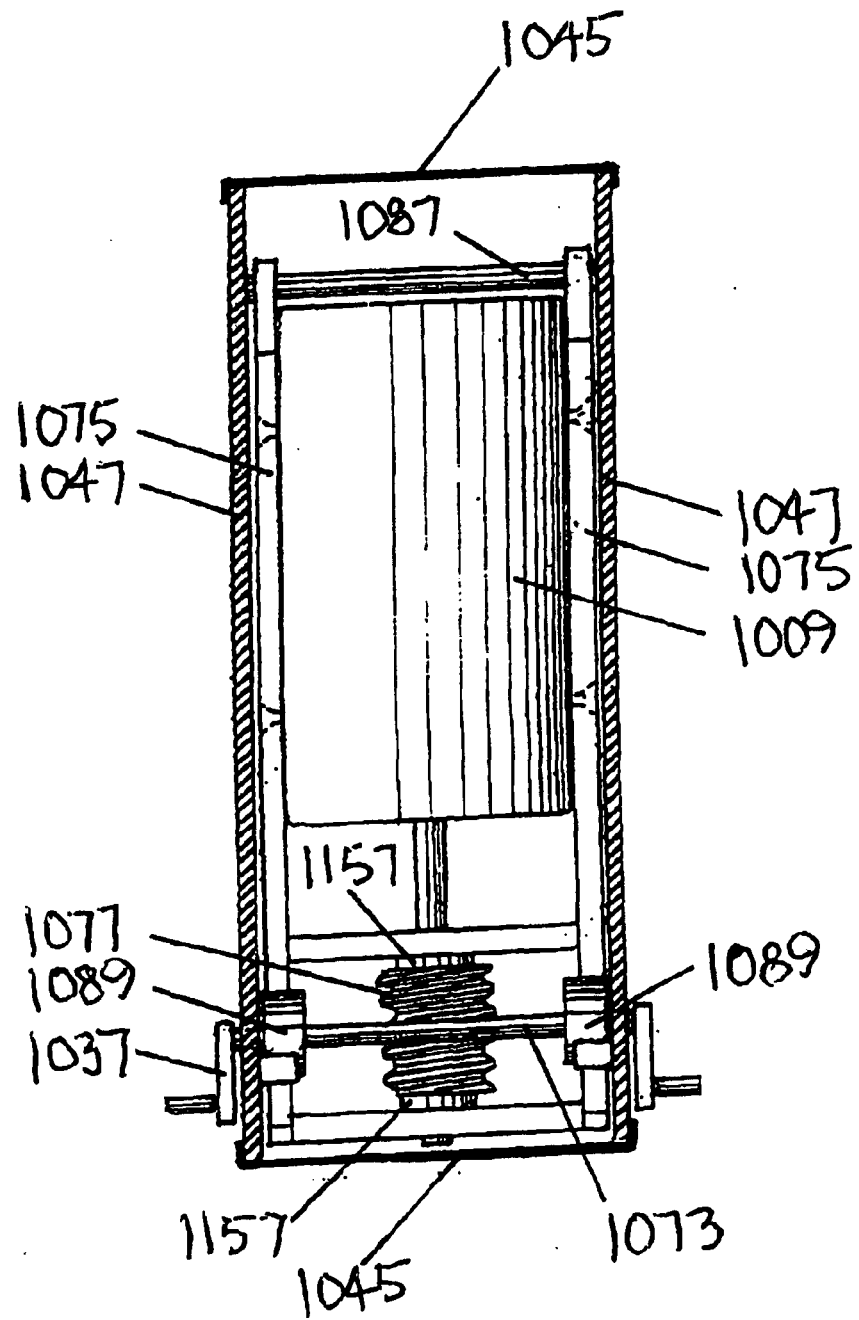
Figure 47:
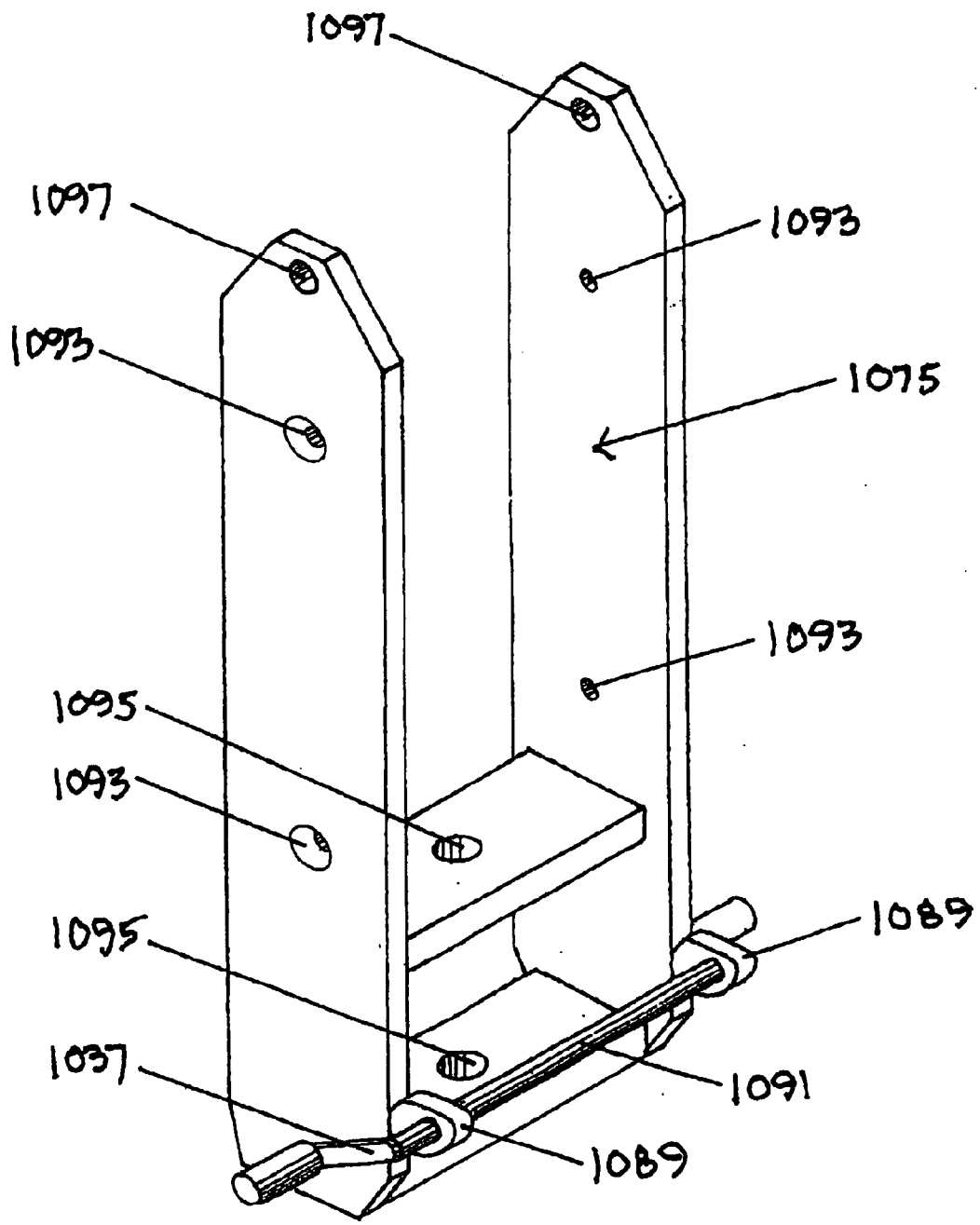
Figure 48:
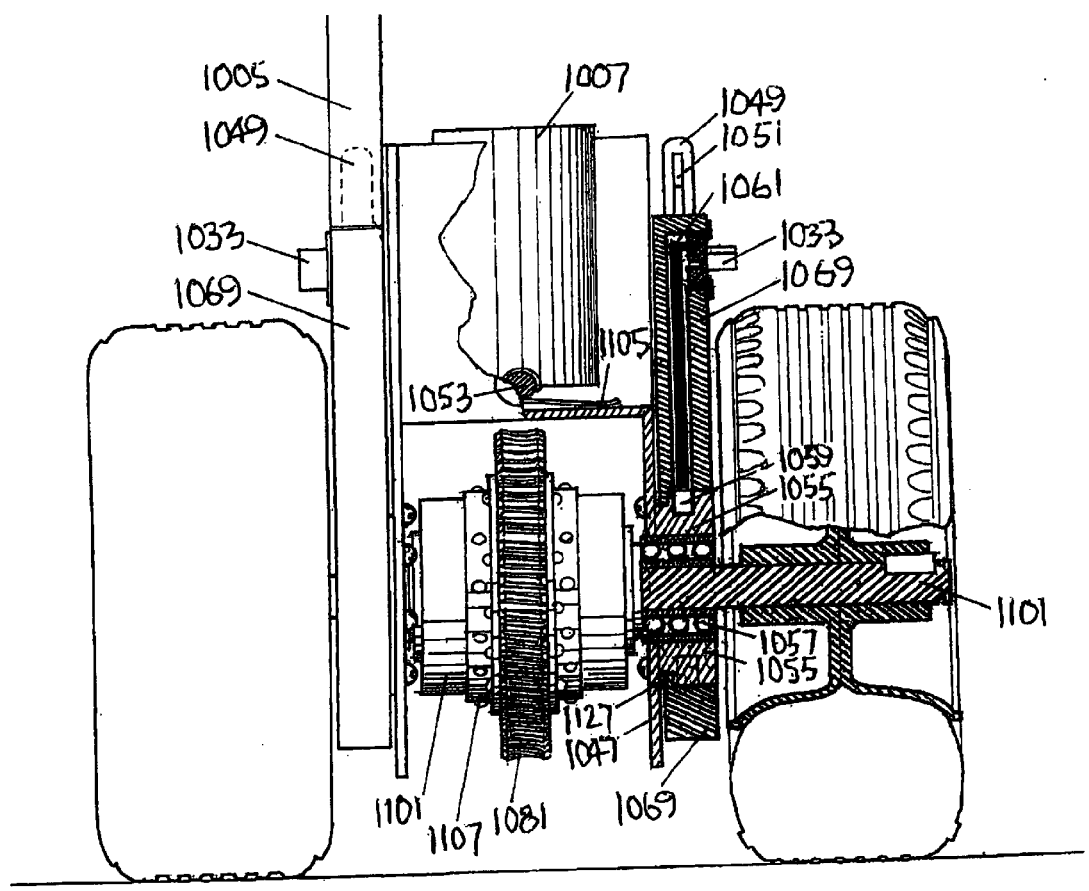
Figure 49:
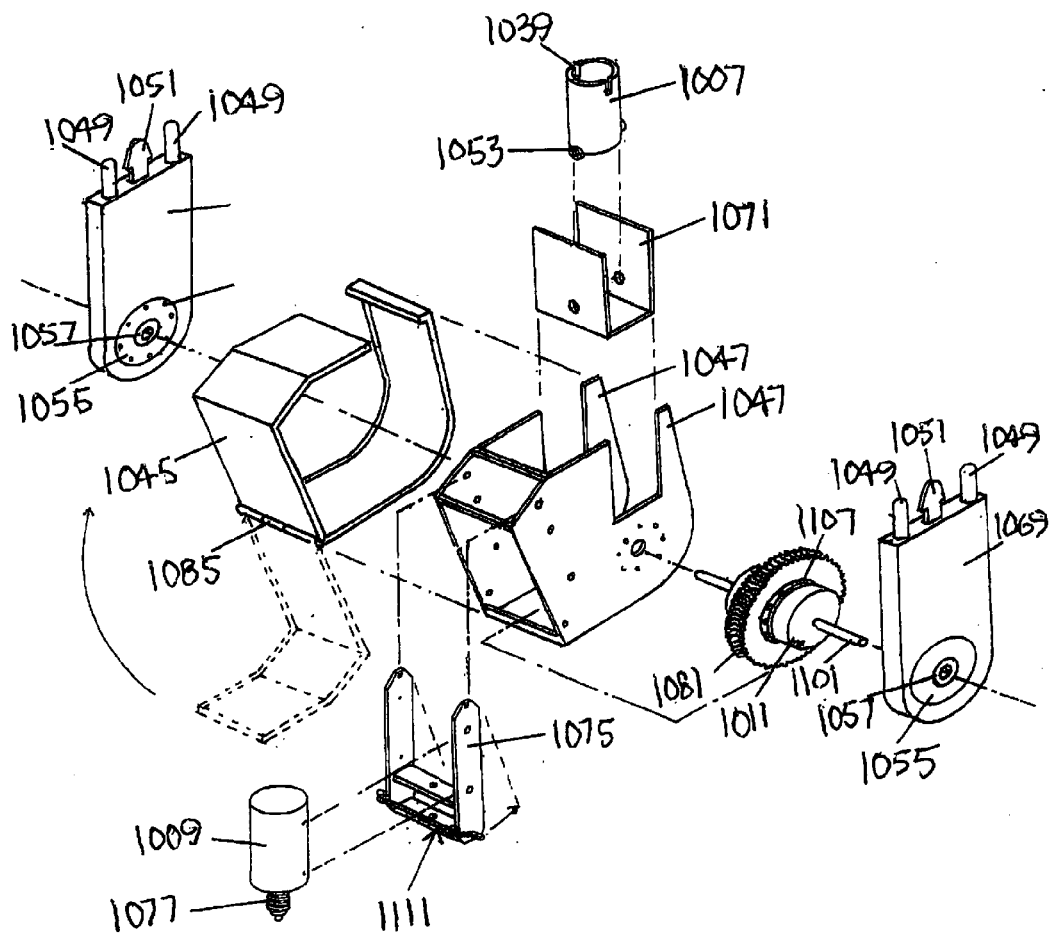
Figure 50:
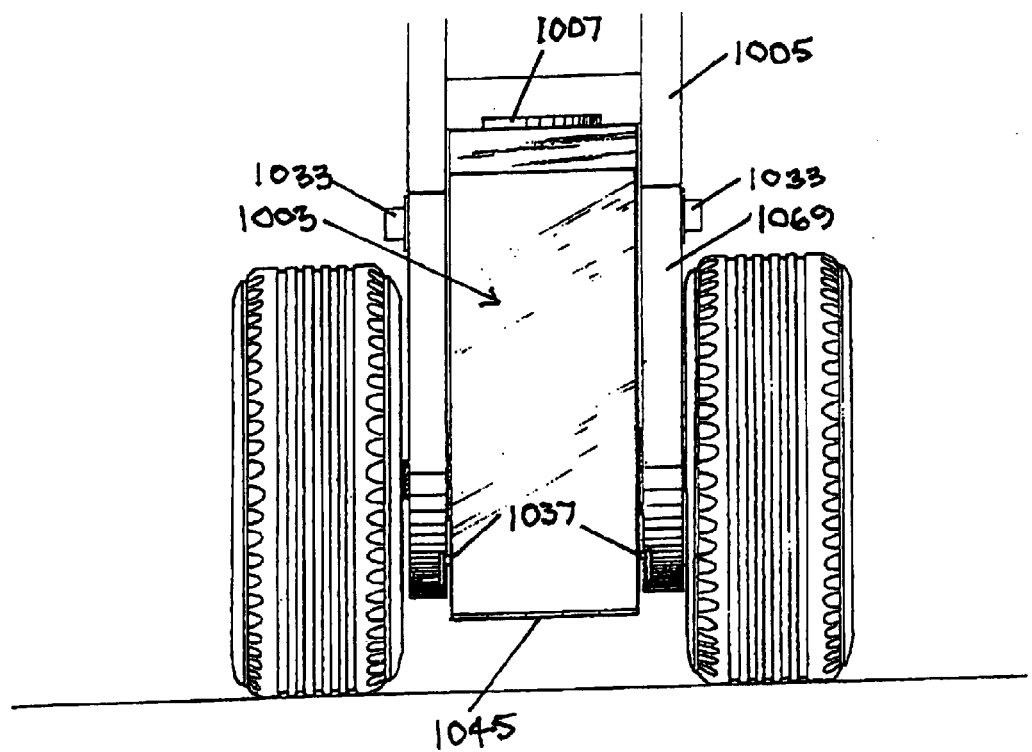
Figure 51:
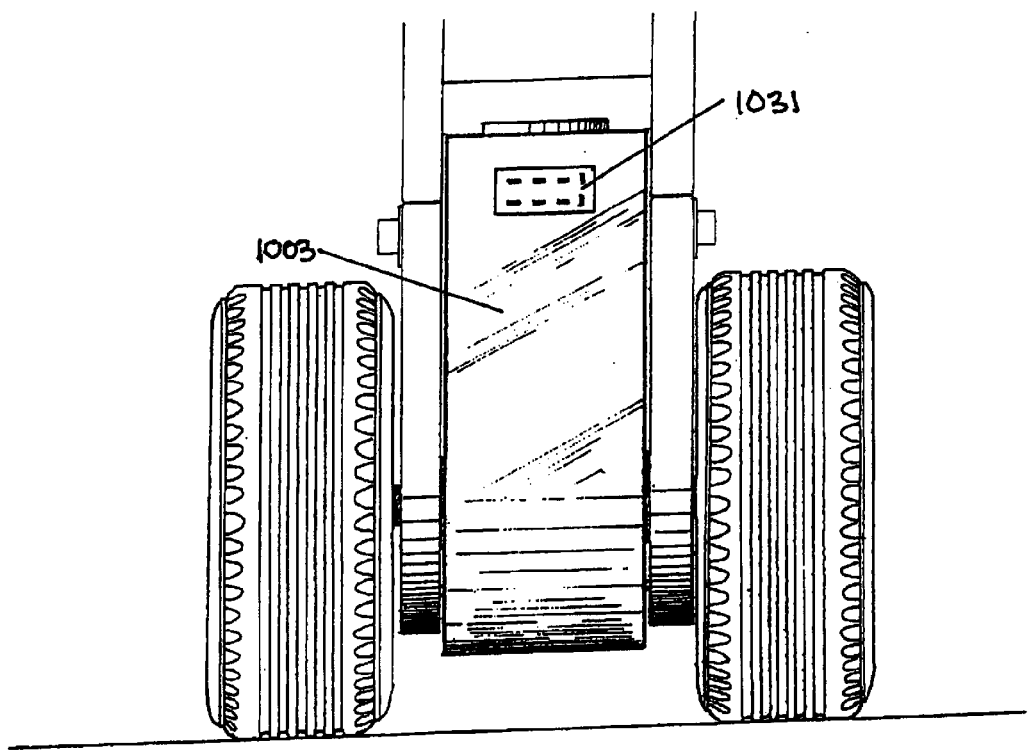
Figure 52:
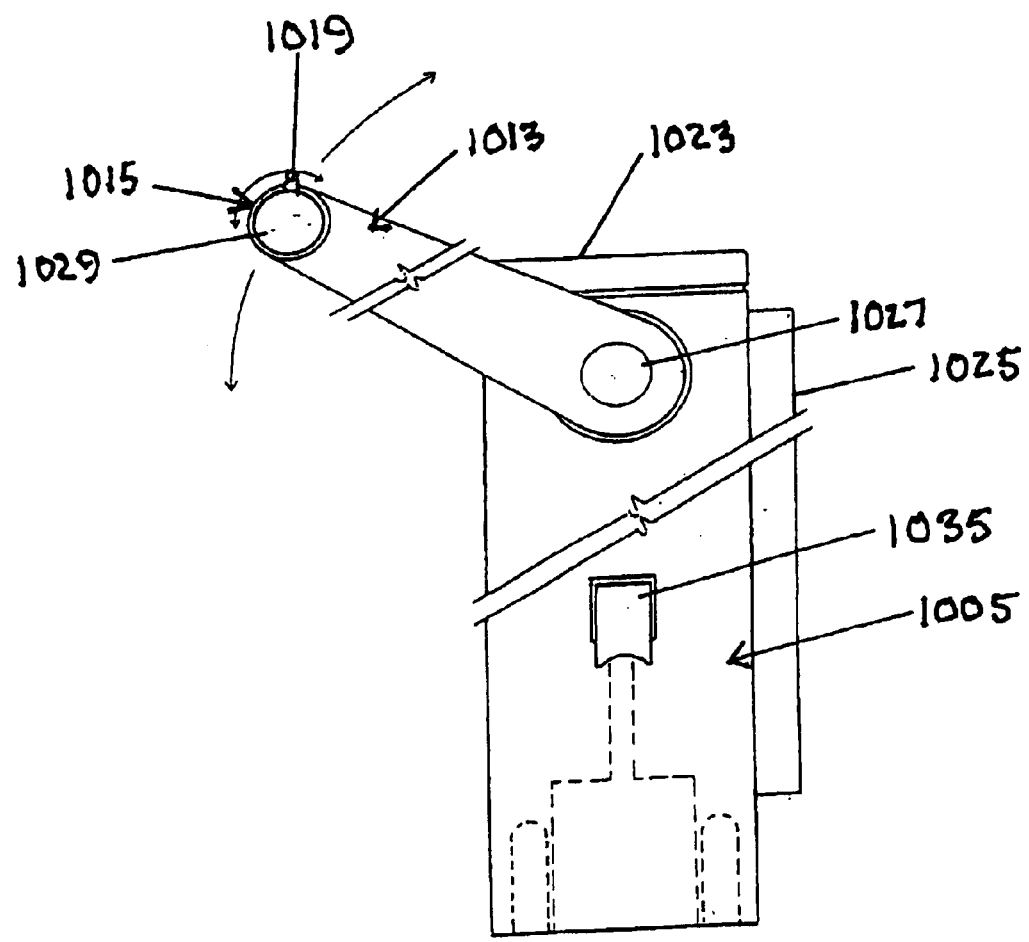
Figure 53:
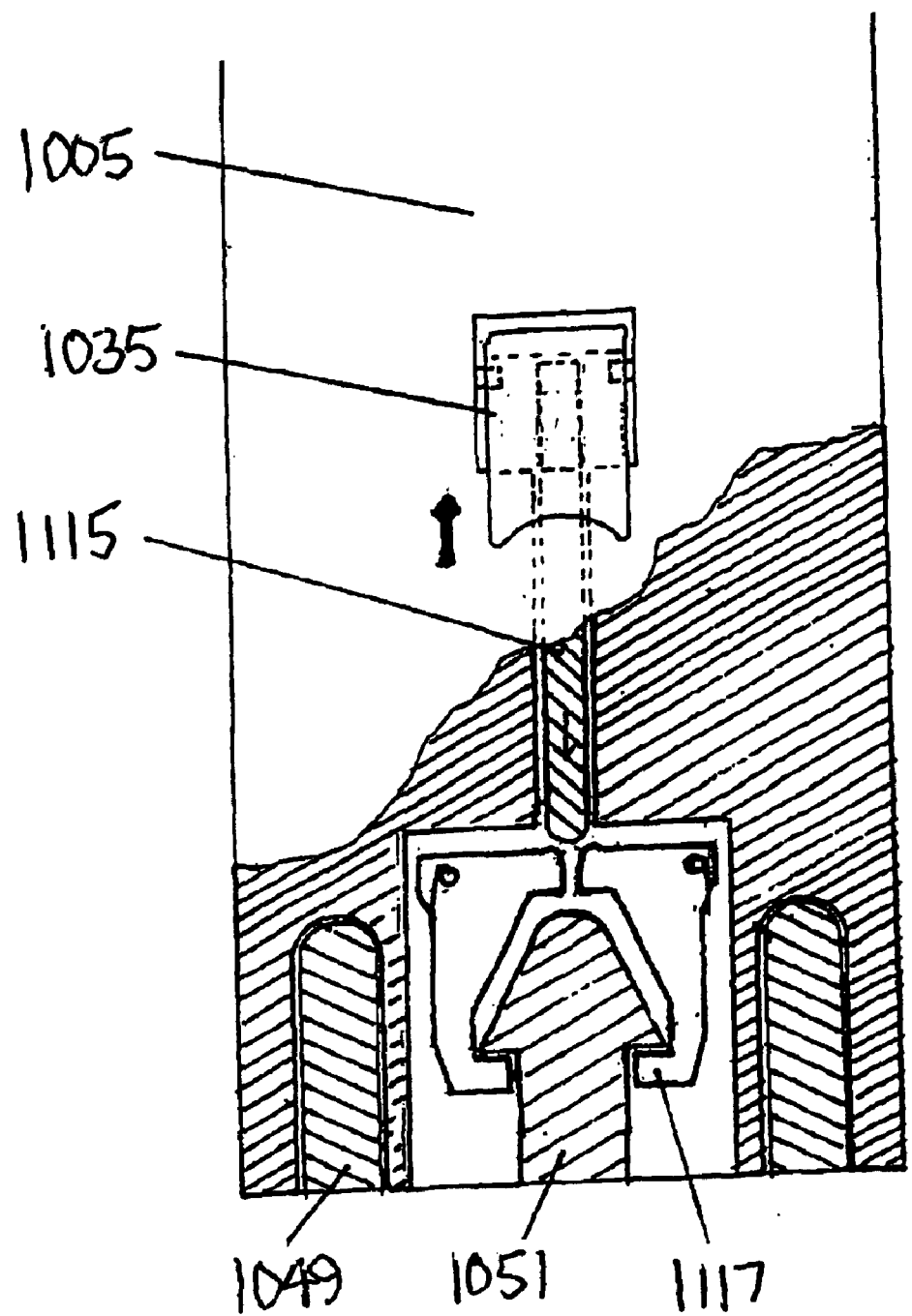
Figure 56:
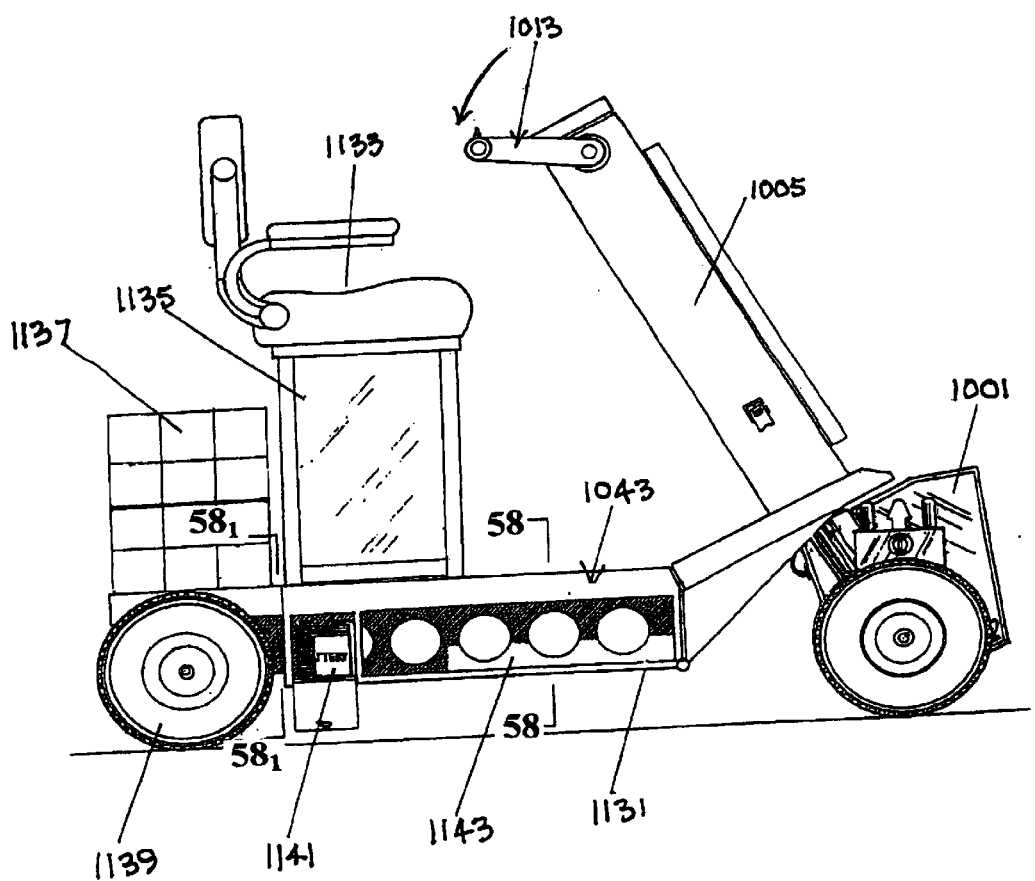
Figure 57:
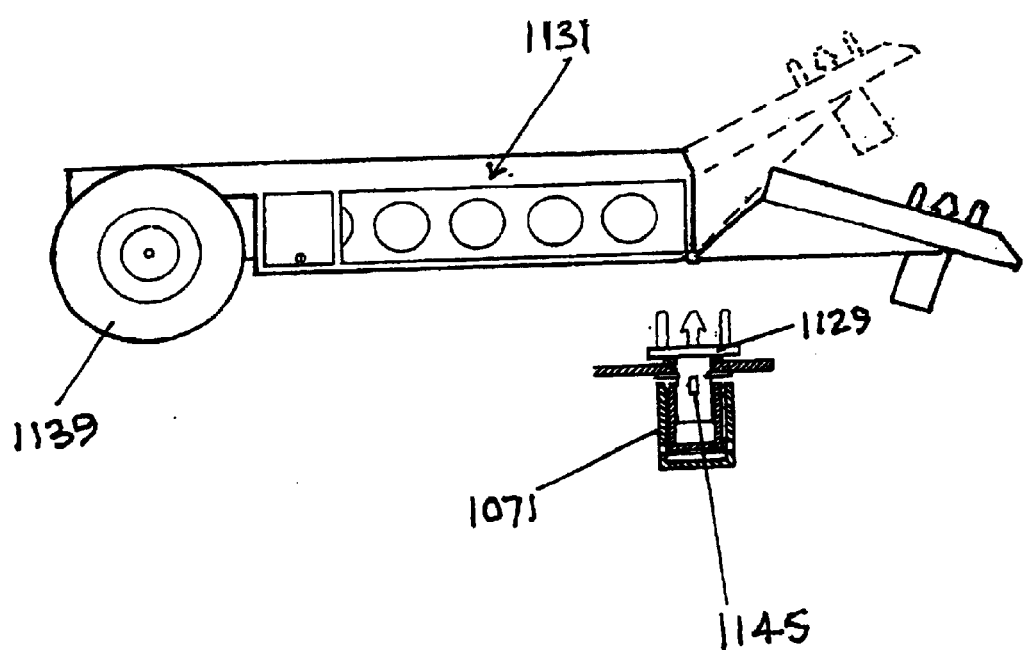

FIG. 9 is a view of the Transport Handle used for moving the Tug to and from the trailer under hand power in the Free-wheeling mode;

FIG. 10 is an isometric view of the Tug Chassis in a first stage of assembly;

FIG. 11 is an exploded perspective view, in enlarged scale, of a Tug chassis shown in the Tug shown in FIGS. 1 and 2 in a second stage of assembly;

FIG. 12 is a perspective view, in enlarged scale, of the standard socket included in the Tug shown in FIG. 1;

FIG. $12_1$ is a sectional view taken along the line $12_1$—$12_1$ of FIG. 12;

FIG. 13 is an exploded isometric view of the Tug Chassis included in the Tug shown in FIGS. 1 and 2 in a third stage of assembly;

FIG. 14 is a broken isometric view of a Post Socket similar to the socket shown in FIG. 12 but enlarged scale and incorporating a hydraulic jack;

FIG. 15 is an isometric view of an alternative embodiment of my Tug showing a hydraulic jack;

FIG. 16 is an exploded isometric view, in enlarged scale, of the chassis included in the Tug shown in FIG. 1 in a $4^{th}$ stage of assembly;

FIG. 17 is an isometric view similar to FIG. 16 but with the components added and assembled;

FIG. $18_1$ is a rear view, in enlarged scale, showing the face of the control panel shown in FIG. 18;

FIG. $18_2$ is a rear view, in enlarged scale, showing the face of a charging control panel included in the Tug shown in FIGS. 1 and 18;

FIG. $18_3$ are diagrammatic views in reduced scale, showing the top plan, front, side and rear views of one of the battery packs included in the Tug shown in FIG. 18;

FIG. 19 is a top plan view, in enlarged scale, of the Tug shown in FIG. 1 but with the handle and post stored;

FIG. 20 is an exploded rear view, in enlarged scale, of the Tug shown in FIG. 1 and showing the handle and post about to be stored thereon;

FIG. 21 is a top plan view of a modification of the Tug shown in FIG. 1 including a built-in hydraulic jack Post Socket as shown in FIG. 15;

FIG. 22 is a rear view of the Tug shown in FIG. 21 with some components shown exploded;

FIG. 23 is a side view, in enlarged scale, of the Tug shown in FIG. 1;

FIG. 24 is a longitudinal sectional view of the Tug shown in FIG. 23;

FIG. $24_1$ is an isometric view, in reduced scale, of a portion of the Tug chassis shown in FIG. 13 and showing the location of a lifting handle;

FIG. 25 is a diametrical sectional view, in enlarged scale, of a Free-wheeling clutch assembly included in the Tug shown in FIG. 4;

FIG. 29 shows on the right side the axial end view of a "Clutch Pin" included in the Free-wheeling clutch shown in FIG. 25 and shows on the left a horizontal section of that head;

FIG. 30 is a side view of the Tug shown in FIG. 25 with the clutch pin in place;

FIG. 31 is a cross-sectional view, in reduced scale, of the clutch shown in FIG. 25 depicting the main sprocket and clutch pin holes with clutch pin inserted in one hole;

FIGS. 26–28 are side elevational views, in reduced scale, of the Tug shown in FIG. 1 incorporated in devices;

FIG. 32 is a cross sectional view, in reduced scale, of the clutch shown in FIG. 25;

FIG. 33 is a side elevational view depicting how a prior art tug might operate in manuvering a prior art trailer up or down an incline;

FIGS. 34 and 35 are side elevational views, in reduced scale, of the Tug shown in FIG. 1 gimballing relative to the tongue of a trailer being maneuvered relative to an incline similar to that shown in FIG. 33;

FIGS. 36 and 37 are respective side and rear views, in a large scale, of the Tug shown in FIG. 40 with the Tiller disconnected;

FIGS. 38 and 39 are side views, in reduced scale, of the Tug shown in FIGS. 36 and 37 depicting representative stages as being converted to a scooter;

FIG. 40 is a perspective view of a second embodiment of my Tug of the present invention;

FIG. 41 is a side view, in reduced scale, of the Tug shown in FIG. 40;

FIG. 42 is a side view, in enlarged scale, of the Tug shown in FIG. 40;

FIG. 43 is a sectional view of the Tug shown in FIG. 40 but with the Tiller disconnected;

FIG. 44 is an enlarged isometric view of a component of the Tug shown in FIG. 40;

FIG. 44A is an exploded isometric sequenced view of components shown in FIG. 44;

FIG. 45 is a transverse sectional view, in enlarged scale, of the Tug shown in FIG. 40;

FIG. 46 is a vertical sectional view, in enlarged scale, of a part of the drive train incorporated in the Tug shown in FIG. 45;

FIG. 47 is an isometric view of a frame for the motor of the Tug shown in FIGS. 40 and 46;

FIG. 48 is a front view, partially in section and, in enlarged scale, of the Tug shown in FIG. 40;

FIG. 49 is an exploded view of components included in the Tug shown in FIG. 40;

FIG. 50 is a front view, in reduced scale, of the Tug shown in FIG. 40;

FIG. 51 is a rear view, in enlarged scale, of the Tug shown in FIG. 40;

FIG. 52 is a broken side view of the Tiller included in the Tug shown in FIG. 40;

FIG. 53 is a side view, in enlarged scale, and partially broken away of a portion of the Tiller of the Tug shown in FIG. 52;

FIG. 54 is an exploded side view, in reduced scale, of the Tug shown in FIGS. 36 and 37 depicting it being converted to a scooter;

FIG. 55 is a side view, in reduced scale, depicting the Tug shown in FIGS. 36 and 37 fully converted to a scooter;

FIG. 56 is a side elevational view of the Tug shown in FIGS. 55 and 40 assembled to tow a passenger seated on the scooter;

FIG. 57 is a side elevational view and a partial section of the scooter shown in FIG. 56 showing how the scooter fits into the socket on the Tug;

FIG. 58 is a transverse sectional view, in enlarged scale, of the towed implement shown in FIG. 57 but with one wheel collapsed;

FIG. $58_1$ is a transverse sectional view similar to FIG. 58 but with both wheels extended.

Figure 59:
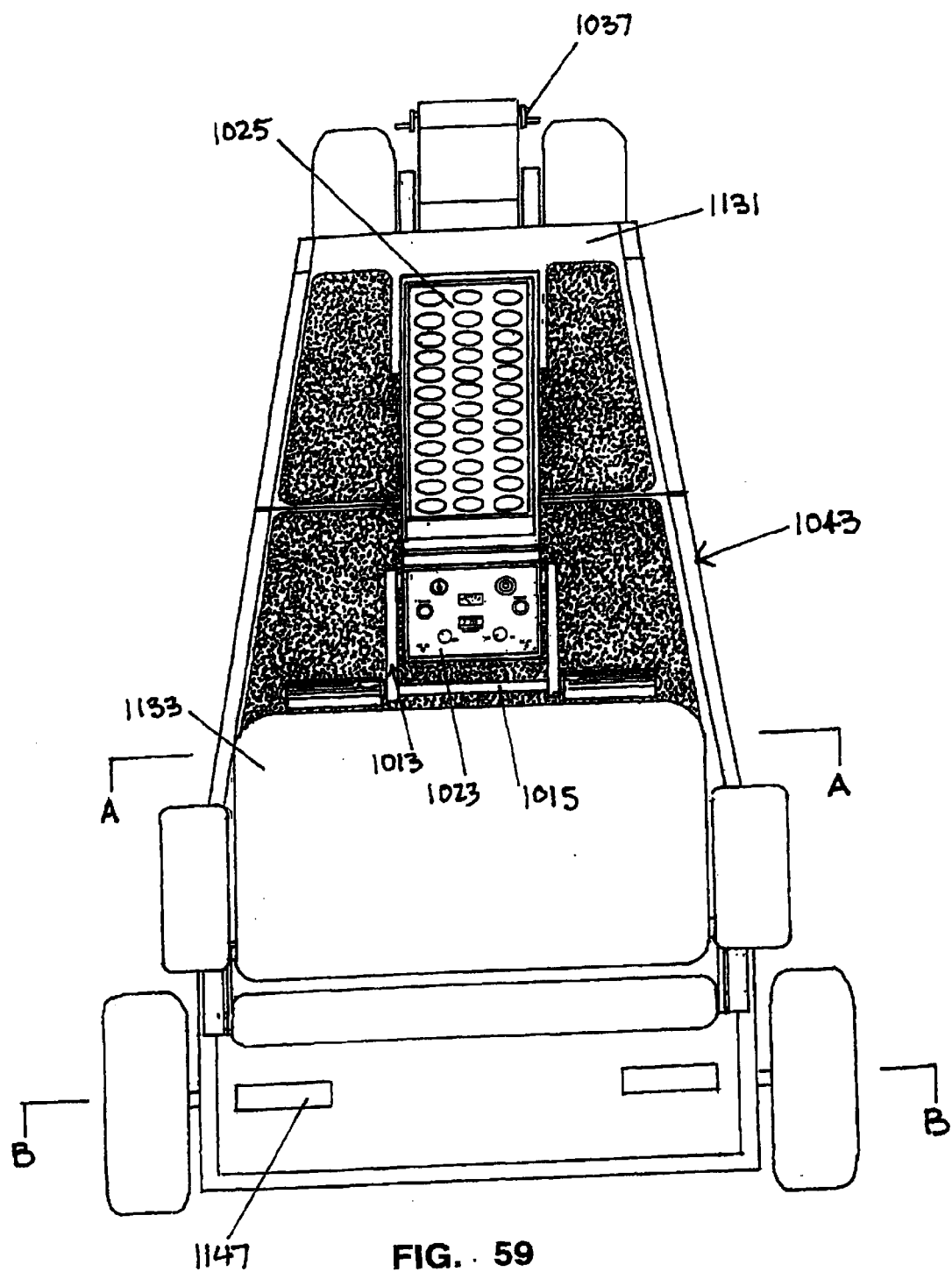
Figure 60:
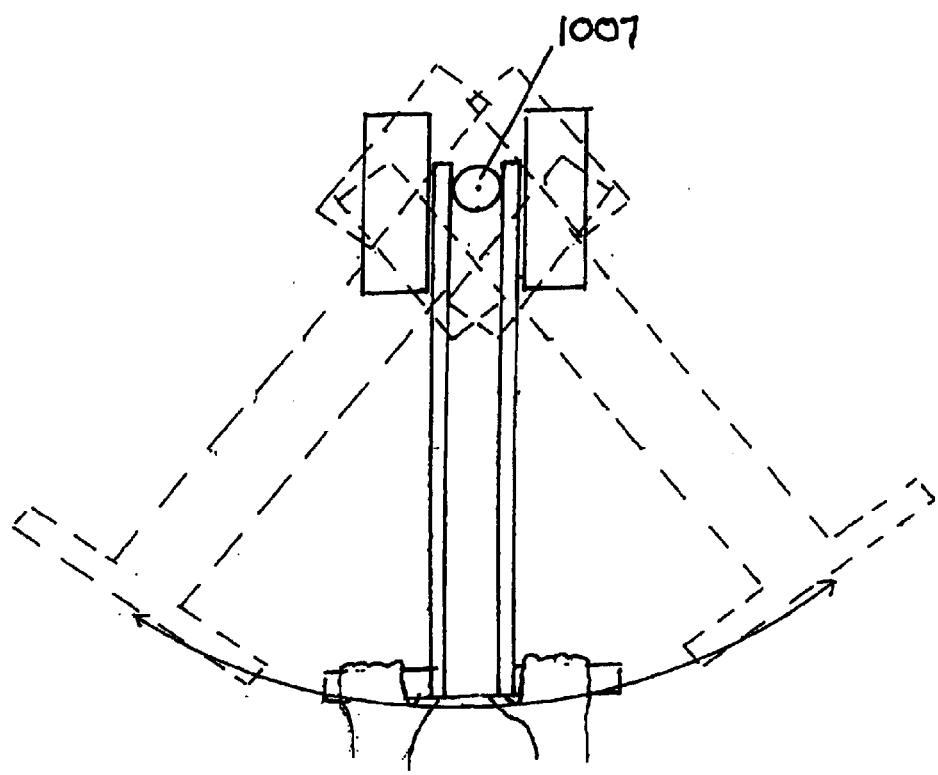
Figure 60:
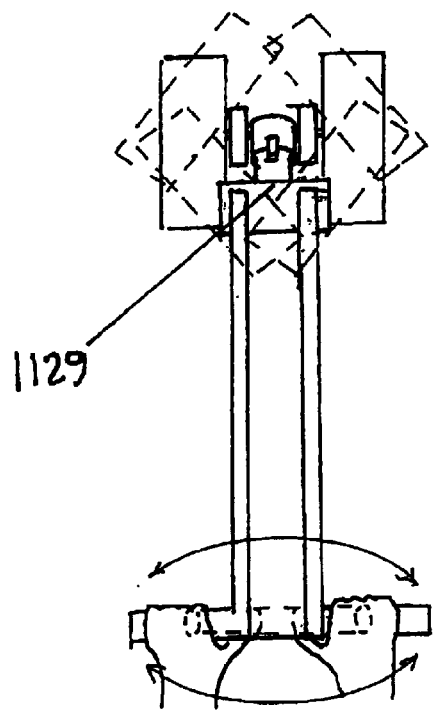
Figure 61:
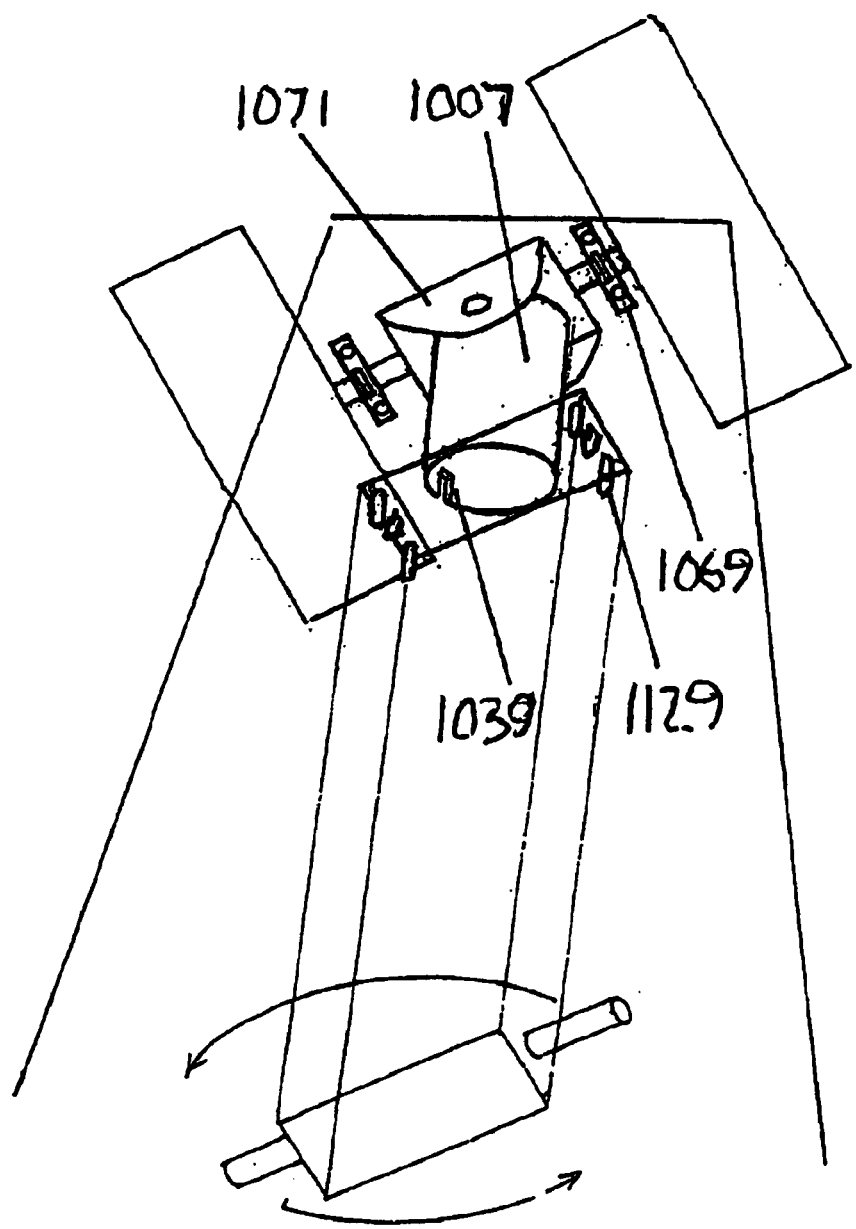
Figure 62:
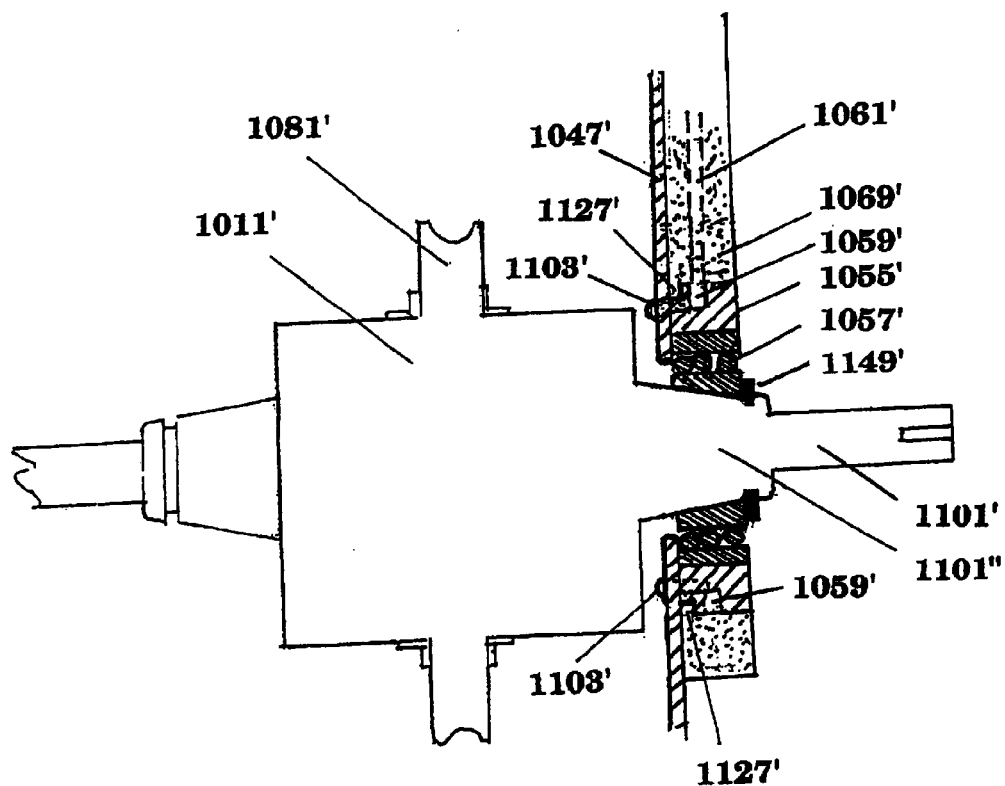

FIG. 59 is a top view of the scooter with my Tug connected;

FIG. 60A is a diagrammatic top view representing the alignment of the Tiller and the Post Socket when used for moving a trailer, and illustrating the horizontal range of movement necessary for the Tiller to steer the Scooter were the Post Socket to remain in its upright position when used as a Scooter Tug;

FIG. 60 is the same diagrammatic top view as FIG. 60A but showing the Post Socket tipped rearward as shown in FIGS. 54, 71 & 55 and the Scooter Steering Assembly 1129 inserted in the Post Socket allowing the Tiller to be rotated about its longitudinal axis to accomplish the same steering as shown in FIG. 60A;

FIG. 61 is a sketch (not to scale) revealing how the steering works on the Scooter;

FIG. 62 is a transverse sectional view of an alternative embodiment of the Tug shown in FIG. 48, partially in sections and incorporating the bearing on a journal of the differential rather than on the axle.

Figure 64:
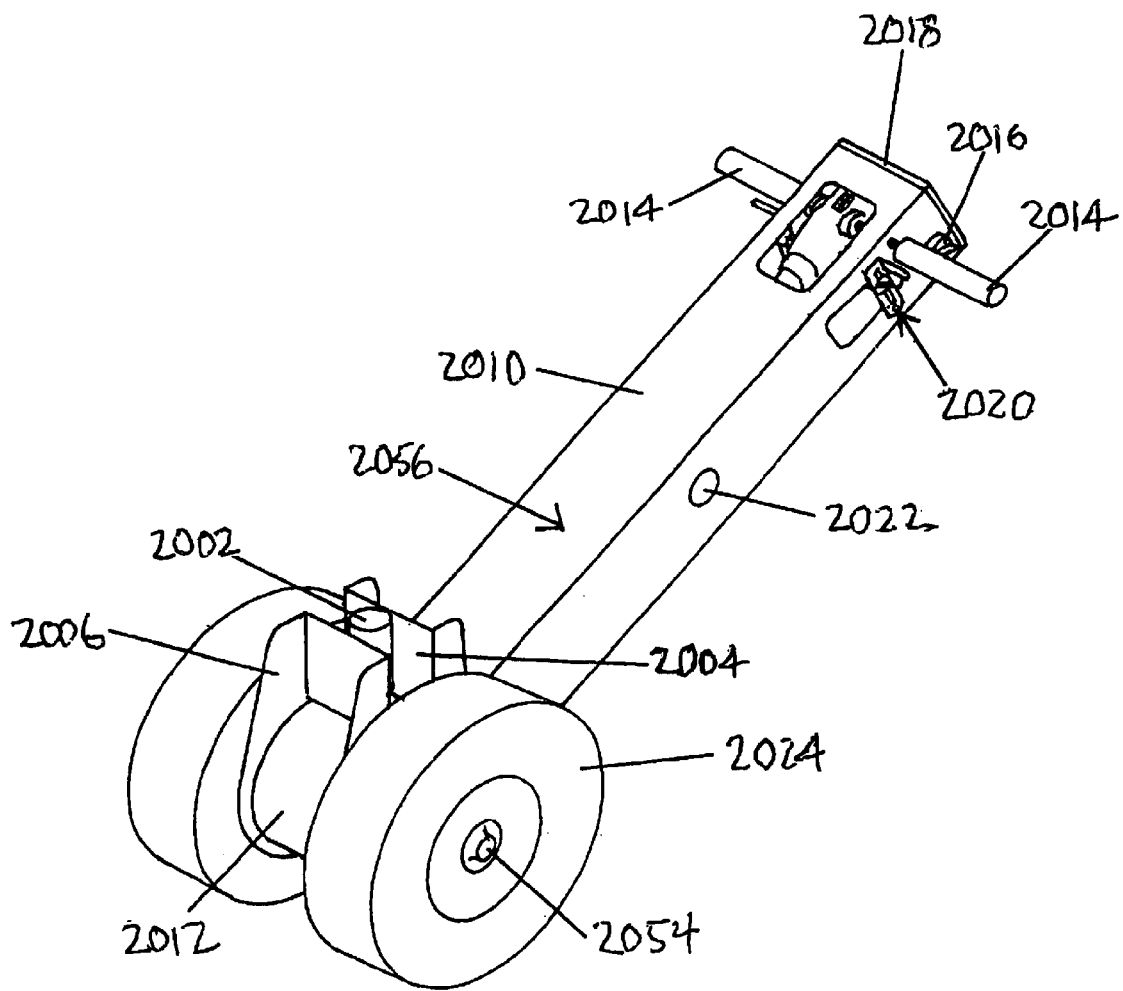
Figure 651:
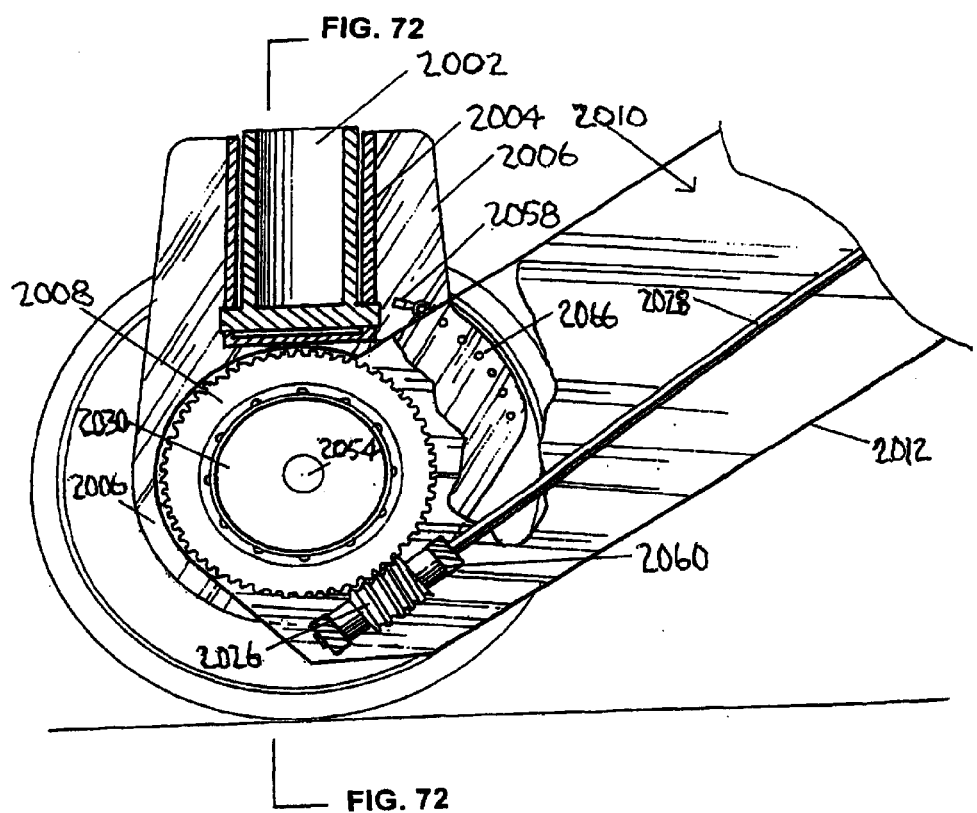
Figure 69:
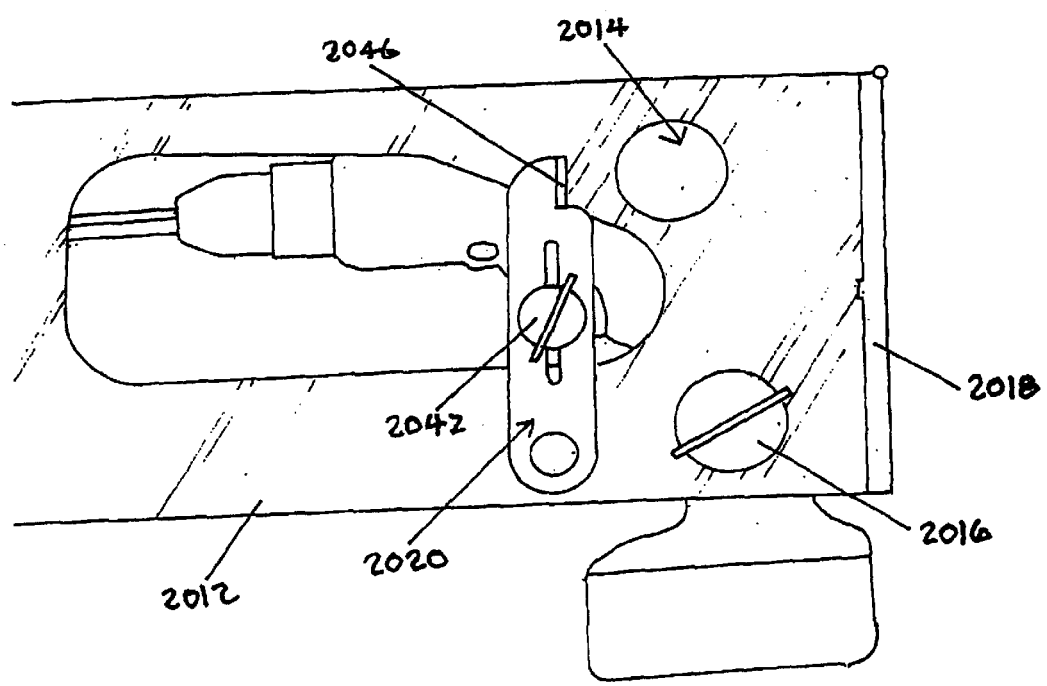
Figure 70:
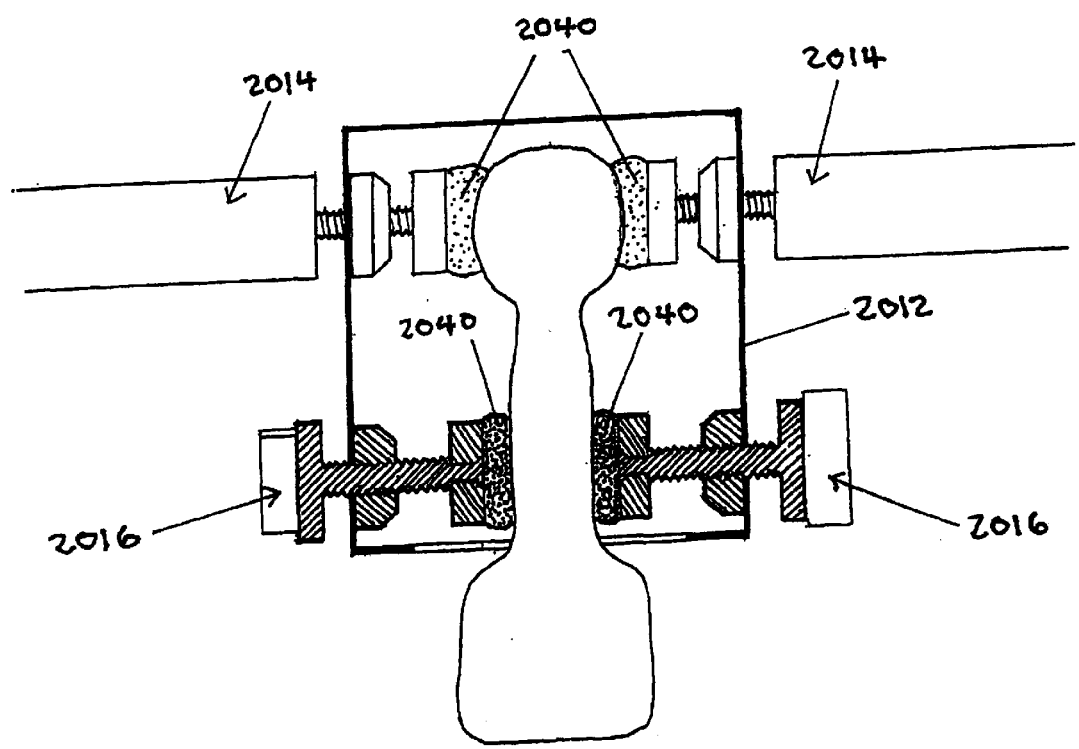
Figure 72:
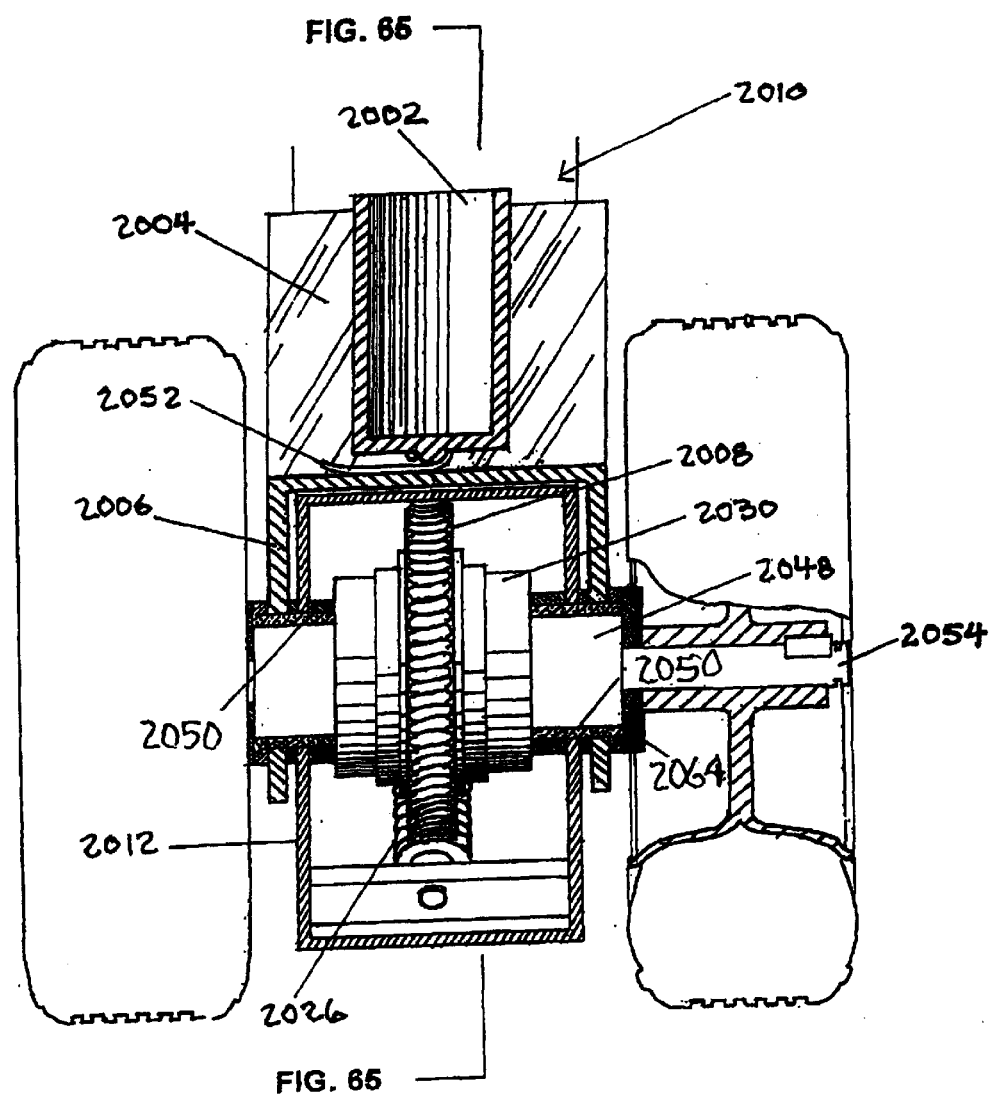
Figure 73:
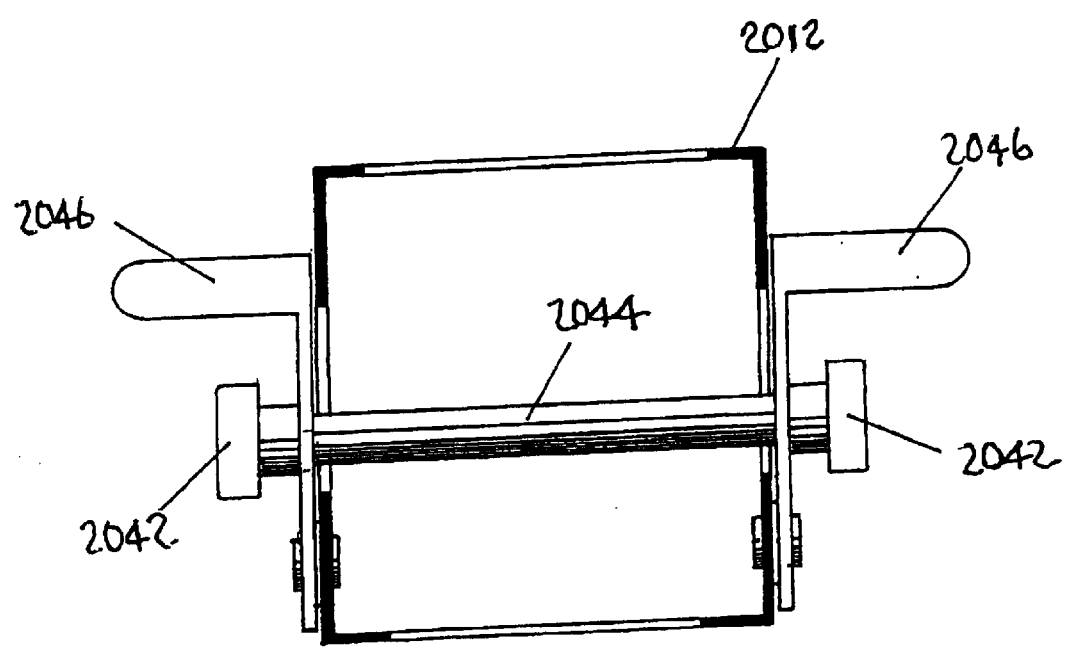
Figure 74:
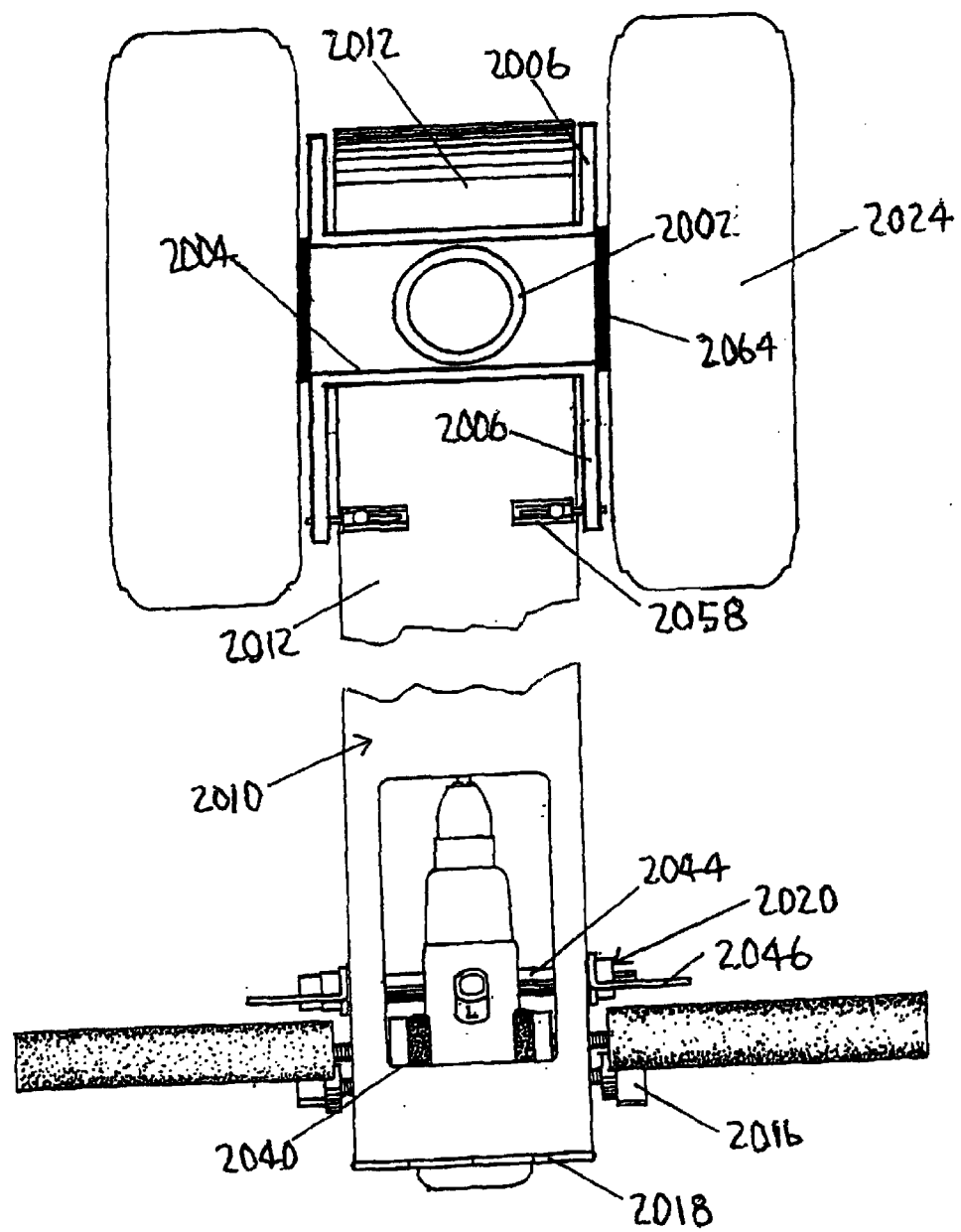

FIG. 63 is a side elevational view similar to FIG. 39 but depicting the Tiller being removed;

FIG. 64 is a perspective view of a third embodiment of my invention adapted to be driven by a cordless drill motor;

FIG. 65 is a broken, vertical sectional view in enlarged scale, of the Tug shown in FIG. 64;

FIG. 65, is a side view, in enlarged scale and partially in sections of the Tug shown in FIGS. 64 & 65;

FIG. $66_1$ is a partial vertical sectional view, in enlarged scale, of the Tug shown in FIG. 65;

FIG. 67 is a side view similar to FIG. 63 but showing the Tiller removed;

FIG. 68 is a partial sectional view of the Tug shown in FIG. 65;

FIG. 69 is a partial side view, in enlarged scale, of the Tug shown in FIGS. 64 and 65 powered by an electric drill motor;

FIG. 70 is a sectional view of the Tug shown in FIG. 68;

FIG. 71 is a side view similar to FIG. 67 but depicting the Tiller Tug being tilted;

FIG. 72 is a transverse sectional view, in enlarged scale, of the Tug shown in FIG. 64;

FIG. 73 is a diagrammatic transverse sectional view of the Tug shown in FIGS. 64–72 and particularly FIG. 69;

FIG. 74 is a broken top view, in enlarged scale, of the Tug shown in FIG. 64–72;

FIG. 75 is a broken side view, in partial section, of the $4^{th}$ embodiment of my Tug;

FIG. 76 is a side elevational view, in enlarged scale, of the Tug shown in FIG. 75;

FIG. 77 is a diagrammatic view of a section of the Tug shown in FIG. 76;

FIG. 78 is a vertical section, in enlarged scale, taken along the lines of 78—78 of FIG. 75 and FIG. 79 is a broken top view, in enlarged scale, of the Tug shown in FIG. 75.

As defining as the above and the following seems to be, the invention should not be limited to the particular forms shown or described.

DESCRIPTION OF THE PREFERRED EMBODIMENTS

FIG. 1 is a perspective view of a small person in the process of positioning the Tug 50 for use to move trailer 66.

Figure 3:
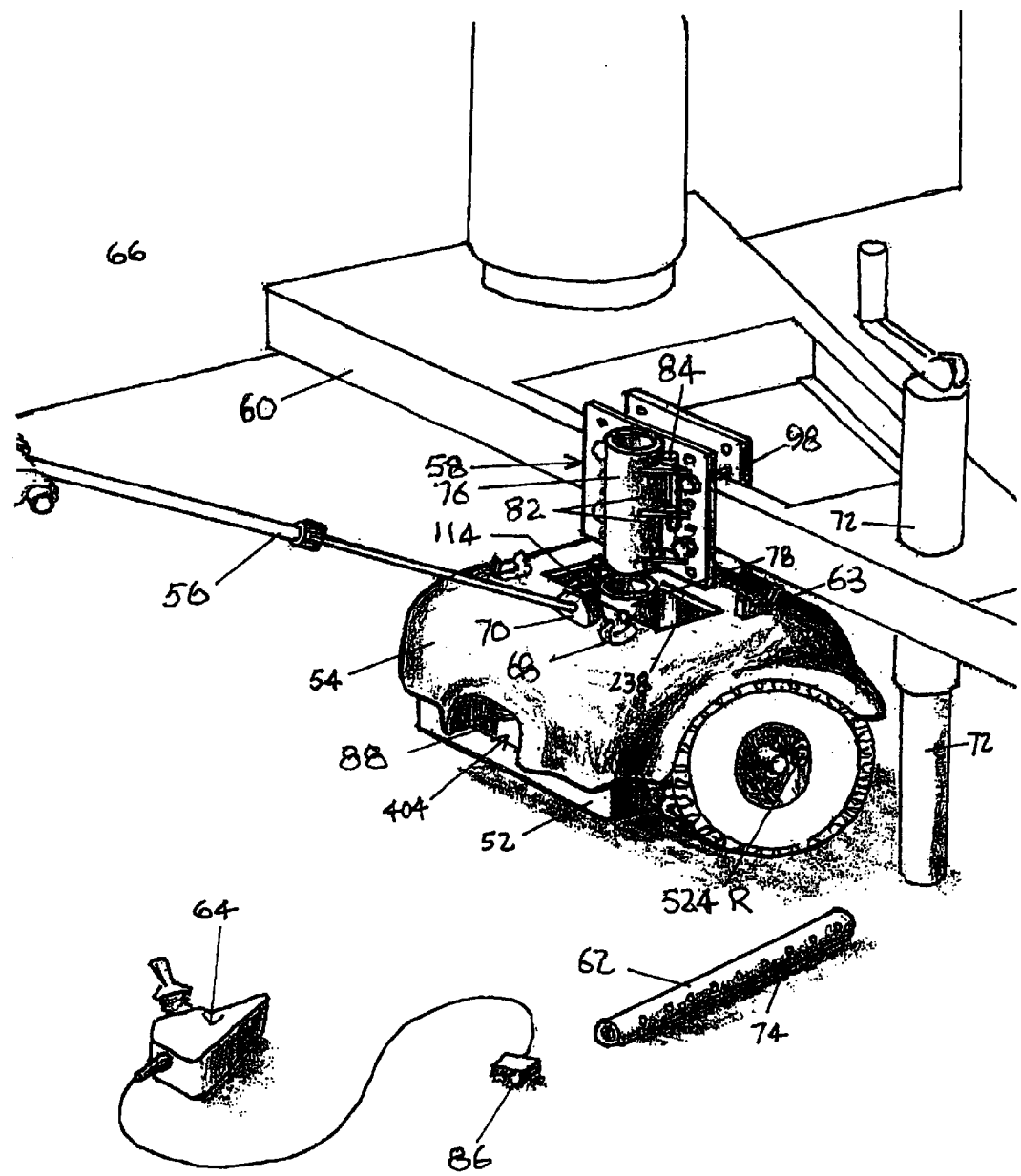
FIG. 3 is a perspective view similar to FIG. 1 but in enlarged scale.

FIG. 2 is a perspective view showing Tug 50 connected to trailer 66 by means of Coupling Assembly 58, (detailed in FIG. 7) and the person is activating Joystick Control 64 (detailed in FIG. 8) to move the Tug 50 under its own power. FIG. 3 is an enlargement of a portion of FIG. 1 for the purpose of identifying the components. Transport Handle 56 is inserted into its operational Transport Handle Socket 70 which is integrally molded into Housing 54. A wheeled Chassis 52 enclosed by Housing 54 is positioned by use of Transport Handle 56 under Coupling Assembly 58, a part of this invention which is attached to the trailer tongue 60 while Coupling Post 62 and Joystick Control 64 lie on the ground. Crank-operated trailer jack 72, not a part of this invention, is in its lowered position and supports tongue 60. There is, at this stage, no physical contact between Tug 50 and trailer 66.

Figure 7:
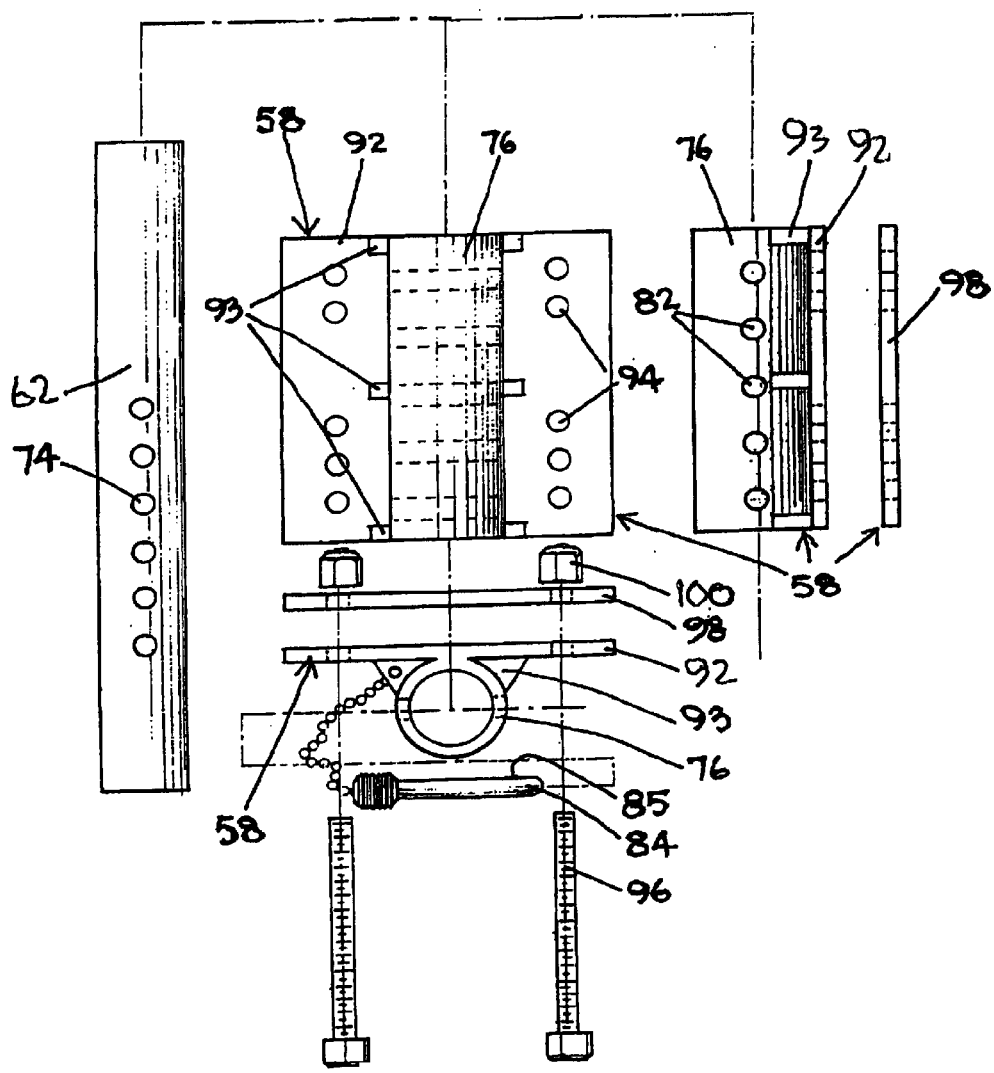
FIG. 7 is an exploded elevational view, in enlarged scale, showing trailer tongue hook up accessories used with the Tug depicted in FIGS. 1 and 2.

FIGS. 3, 4, & 7 Coupling Post 62, an open-ended tube with a longitudinal line of equally spaced holes 74, has been lowered through Coupling Assembly Sleeve 76 of Coupling Assembly 58 and down through Coupling Post Socket 78 (Detailed in FIGS. 12, 14, 24) and rests on Socket Base Bearing 80. (FIG. 12) Sleeve 76 has a longitudinal line of unequally spaced holes 82 spaced at different intervals than the line of holes 74 in Post 62, such that at any position, there is always at least one pair of holes in both tubes that line up or nearly line up, facilitating the insertion of Coupling Pin 84 which is attached to a chain and has a ball-detent in its shaft to keep it from falling out of engagement in Post 62 and Sleeve 76. Continuing with FIG. 4, the trailer's jack 72 on tongue 60 has been cranked up, leaving the weight of tongue 60 supported solely by the Tug 50.

The Transport Handle 56 has been stowed in Clips 68 and the Joystick Control Connector 86 has been inserted in Joystick Control Connector Receptacle 88. (Detailed FIG. 18$_1$.)

Figure 5:
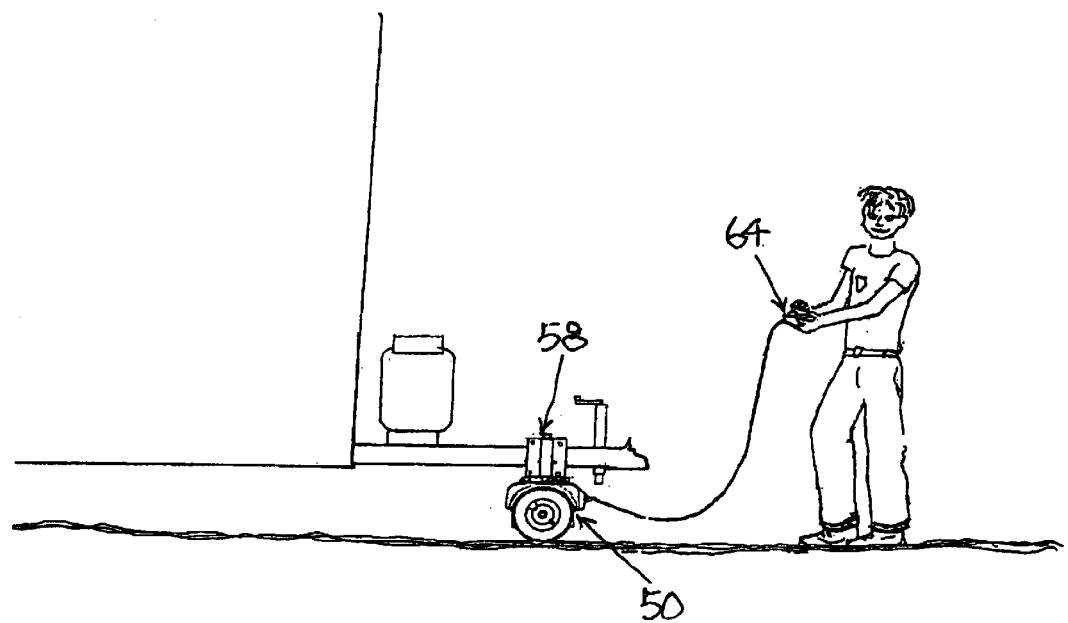
FIG. 5 is an elevational view, in reduced scale, showing the Tug of FIG. 2 being maneuvered about by a tethered electrical control.

FIG. 5 Shows Tug 50 being controlled with Joystick Controller 64, the hardwired version.

Figure 6:
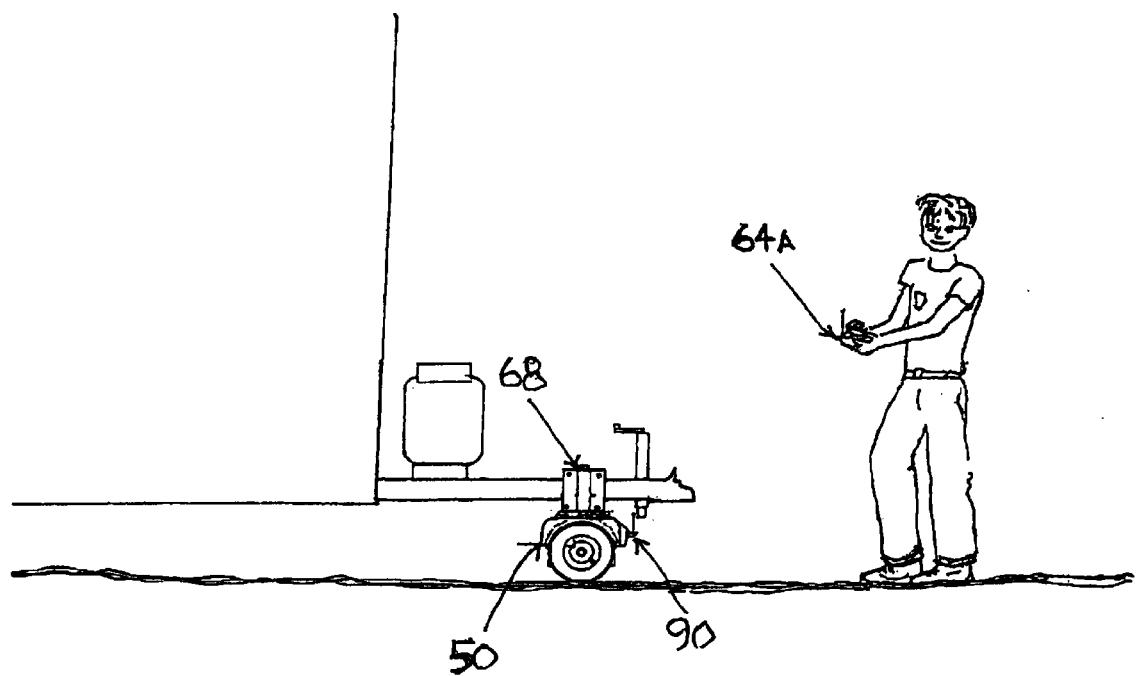
FIG. 6 is an elevational view similar to FIG. 5 but showing a wireless control.

FIG. 6 Shows Tug 50 being controlled with Joystick Controller 64A, the R/F operated version, with the R/F Joystick Control Receiver Module 90 connected in Receptacle 88.

FIG. 7 shows the Coupling Assembly 58 consisting of the Coupling Assembly Attachment Plate 92 with a vertical parallel series of Holes 94 to receive Bolts 96. The Holes 94 are spaced such that Bolts 96 may be arranged in them to secure the Plate by means of Backup Plate 98 to any size steel channel of a trailer tongue. Lock Nuts 100 are used on Bolts 96 to secure the assembly together. Once Assembly 58 has been attached, it remains in place. By means of selective spacing, including turning the assembly upside down (there is no "right side") any tongue channel size and configuration may be accommodated. Welded to Plate 92 and buttressed by angular Fillets 93, is Coupling Sleeve 76 with Holes 82 aligned parallel to Attachment Plate 92 and unequally spaced. When Post 62 is inserted and slid down into Post Socket 78 and allowed to contact Post Socket Bearing 80 and Holes 74 are aligned with holes 82 or Post 62 is moved slightly upward, if necessary, to align the Holes, Pin 84 may be inserted.

Figure 7A:
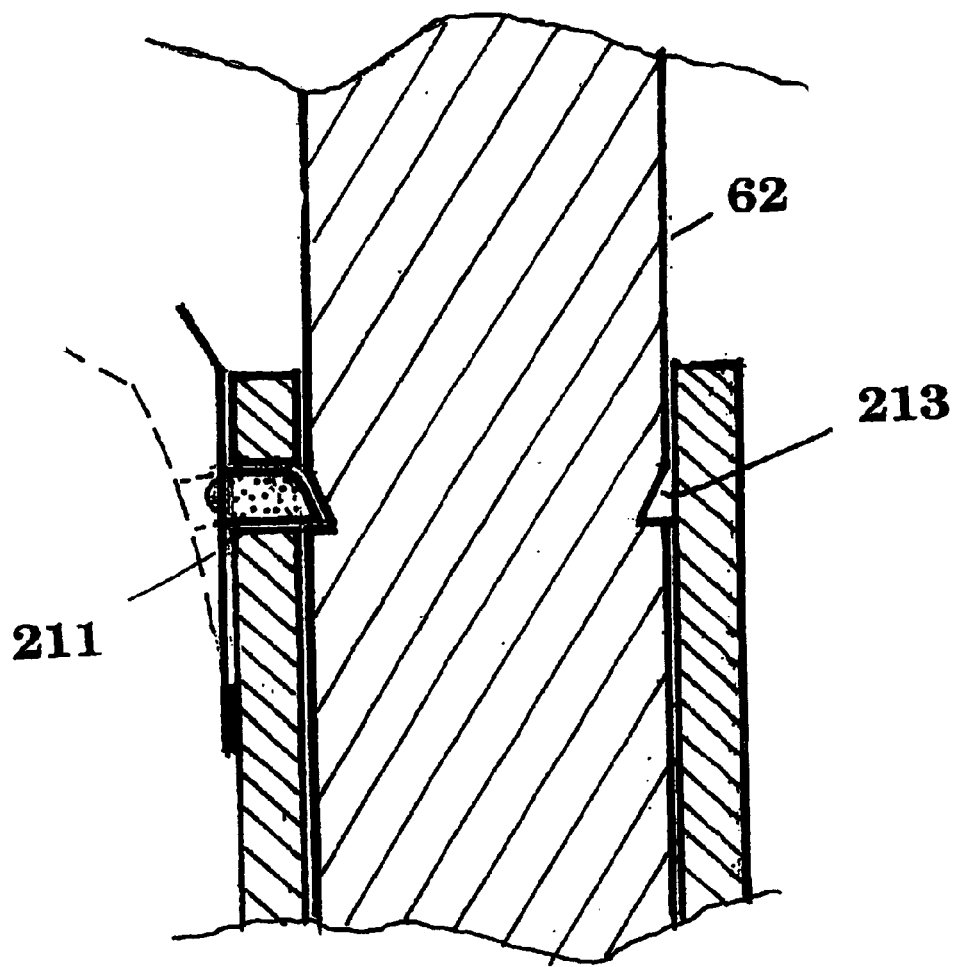
FIG. 7A is a vertical sectional view, in enlarged scale, of a modification of the post and socket shown in FIG. 7 and depicting the means of preventing the post from being accidentally lifted out of the socket.

Referring to FIG. 7A, in order to prevent the possibility of the trailer tongue lifting unexpectedly while the trailer is being moved by the Tug, thus pulling the Post from the Socket and possibly separating the Tug from the trailer, my Tug may include a safety device. In embodiments with the safety device, a pawl 211 projects into the side of the Socket from one direction and engages in a groove 213 cut in the Post. This is the Post that is a part of this invention. The pawl is shaped so as to withdraw enough to allow the Post to come out when the spring is pulled back. The safety device is designed and placed in such a way as to not interfere with the operation of the Tug T-2 when in the Scooter configuration discussed below.

FIG. 8 refers to a hand-held Joystick Control Housing 64 ergonomically designed for comfort and precise control. Joystick 102 allows for full control of Tug 50 (as will be described later) through Control Cable 104. A large Button 106 is provided to connect through the cable and a receptacle on Main Control Panel 404 to actuate the electric brakes on a trailer if said trailer has them.

The On/Off—Speed Range Selector 108 provides for selection of a range of speeds from low to high and Indicator 110 shows the charge status of the batteries on Tug 50.

FIG. 9 shows the Transport Handle 56, such handle consisting of two telescoping tubes whose relative positions are selectively fixed by means of Adjusting Ring 111 fitted on the outer tube at the other end from the Handle. The outer exposed end of the inside tube is fitted with a Threaded Casting 112, which fits the Socket 70 on Tug Housing 54. The inner tube may be instead, a rod cast of aluminum or suitable high strength plastic material and threaded itself rather than having a cast thread piece attached. The strength of the inner member is sufficient to allow its use as a jack handle on the embodiment of the invention with a built-in jack.

FIG. 10 shows Chassis 52 in an early stage of assembly. Identical wheel Spindles 200L&R are attached by means of welded reinforcing plates and triangular support angles to identical longitudinal steel T-plates 202L&R, each bearing Routing Holes 210 which are entirely above the upper edge of the lower portion of the plates. T-plates 202 are fillet welded along their inside and outside lower edges to Chassis Base Plate 206. All plates of the Chassis are steel. I have found thicknesses of ³⁄₁₆"–¼" to be sufficient, the thicker plates being 202 and 208.

FIG. 11 Identical slotted Transverse Frame Plates 208F&R are interfitted back-to-back to the assembly and welded along all edges. Plates 208 are each bored with four holes 210 for routing of lines or wires. A rectangular hole 212 is for the battery connectors and one hole 214 in the lower center is for receipt of Longitudinal Pivot Pin 216. By positioning the pivot pin 216 below the horizontal plane of the spindles 200, the weight, applied thereto tends to maintain the chassis balanced upright.

FIG. 12 is an isometric view of the "Post Socket" 78. The Post Socket is formed in its lower extremity with a longitudinally projecting journal 218 configured with a Bore 220 for receipt of Pivot Pin 216 to define a pivot axis oriented perpendicular to the Spindles 200 to provide for limited transverse gimbaling of such Socket 78. Centering Springs 222 of three to four pound torsion are mounted from the Journal 218 on opposite sides of the Socket 78 to slidingly engage the top surface of Chassis Base Plate 206 to bias the Socket 78 to its upright position when not engaged with the Coupling Post 62. These serve to keep the Socket 78 upright for insertion of the Post 62 when connecting to the Coupling Assembly 58.

Referring to FIG. 12 Section A—A, Post Socket Base Bearing 80 is supported by interior Bearing Support Sleeve 204 which in turn is held in place by the Journal 218 which passes through Sleeve 204 and Post Socket 78. The Bearing is merely a lubricated washer.

Referring to FIG. 13 Identical steel Motor Compartment Floor Plates 224F&R of the same length as Transverse Frame Plates 208F&R are fitted to lie atop the lower portions of Plates 202L&R, butting against Plates 208F&R and with their ends flush. They are welded with fillet welds along all possible edges. Routing holes 210 are near the ends that lie against 208 and placed so they lie between the end of the plate and the supporting edges of T-plates 202L&R. Battery Compartment Lock Strike Slots 260 are centered close to the outside edges so that the Locks 258 fit into them. The assembly at this stage leaves a rectangular volume at each lower corner of the Chassis. These volumes are used for various electronic components which are interconnected by means of the wiring routing holes 210.

FIG. 14 illustrates an alternative embodiment of the Post Socket 78 that was shown in FIG. 12, but with changes that incorporate a built-in hydraulic jack. In this figure, the Socket 236 is formed as a closed-end tube, machined on the exterior to act as the piston of the hydraulic jack as shown in totality in FIG. 15. The exterior surface of Socket 236 is configured to act as a hydraulic piston by the degree of smoothness and the machining of grooves to hold O-rings (neither grooves nor rings are shown) serving to keep the pressurized fluid within the Cylinder 226 which is similarly smoothed by honing its interior surface to facilitate its use as a hydraulic cylinder. The Hydraulic Fluid Passage 228 is bored in the Cylinder 226 at an angle with the internal end at a point on the internal base and the external end on the side of the Cylinder 226 as shown in FIG. 15. The passage is bored wider and threaded at its exterior end to receive a machined Nipple Fitting 230 to be connected with Hydraulic Line 232 which leaves the inner face of the Reservoir 240 and passes through a Routing Hole 210. The Line is flexible and passes across the "Post Socket Well" 238 to join Nipple Fitting 230.

FIG. 15 shows the Reservoir 240 with built in Pump Assembly 234 for the Hydraulic Jack as it is installed in the Chassis in the space formed by the Transverse Panels 208F&R and the Longitudinal T-plate 202L to which it is attached by screws or bolts, leaving minimum clearance on the exposed side for later addition of Motor Mount Plate 246L. The Assembly 234 consists of the Reservoir 240 and the Pump with the Pump Lever 242 ending in a threaded fitting, said threads matching those in the Transport Handle 56. Rising from the top of Reservoir 240 is a Pressure Relief Valve Actuator 244.

The journal and pin assembly and the springs shown are the same as the journal and pin assembly and springs shown in FIG. 12, except that the journal in FIG. 14 is shorter to allow clearance in the Post Socket Well 238 for the Jack Cylinder 226. There is no difference in the horizontal bending forces operating on the Post and Pivot in either version, as the length of the journal and the inner diameters of the Sockets are the same.

As shown in FIG. 16 identical Motor Mounting Plates 246L&R are mounted in a reverse relationship to each other on the chassis. These are welded with fillet welds to the plates they contact, in as many areas as can be reached by a welding torch or rod. Each Plate 246 contacts five other plates and all intersections present opportunities for fillet welding on one side of the intersection and in one case, both sides. The upper end of the two vertical intersections of 246 with both 208 plates (marked with a symbol "<<" or ">>") should be welded on both sides of the intersections. And where Plates 246 meet the edges of the empty volumes created at each corner of the chassis, welding the interior intersection is not possible, but a one inch tack can be made at the outer end of the intersections, marked by the symbol Å. Similarly, every place where it is not possible to weld the entire inner intersection of two plates, a weld should be made as far into the space as possible, most notably along the inner vertical corners of the Post Socket Well 238.

Drive Sprockets 248L&R are slipped over each Spindle 200 and Free-wheeling (FW) Spacer Sleeves 250 are fitted over the Spindles and snugged up to the Sprocket. The clearances on both sides of the Sprocket allow a loose fit and remains so for reasons that will be revealed. Each of the Drive Sprockets 248 has a circle of eight FW holes 252 spaced equally around at the same radius.

Battery Compartment Doors 254F&R are mounted by Hinges 256F&R to Chassis Base Plate 206. Battery Compartment Door Locks 258 are installed in the doors.

Referring to FIG. 17, the preferred embodiment includes identical 24 volt DC variable-speed reversing Motors 300L&R which are bolt-mounted to high-reduction gearheads 302L&R. The shaft of the Motor and the output shaft of the gearhead are parallel. The Motor-Gearhead assemblies face in opposite directions. The Motor-Gearhead assemblies are mounted to the Motor Mounting Plates 246 by bolts through gearhead mounting holes 312 which hold the Gearhead to the Mounting Plate 246. A Support Bracket 304 is mounted at the opposite end of the assembly, holding the Motor firmly at that end. The output shafts of the Gearheads project through Drive Shaft Holes 314 in Motor Mounting Plates 246 and a Sprocket Pinion 306 is keyed on the shaft at that end. The shafts are of such length and the pinions are mounted so they are clear of the Plate 246 by the amount of the hub on the Pinion, generally about ⅝". There is no mechanical contact between the Pinion 306 or its shaft and the Motor Mounting Plate 246.

Two identical Idler Sprockets 308 are mounted on pillow blocks through Idler Sprocket shaft holes 316 to the Motor Mounting Plate 246 in relationship such that they route the Drive Chain 310 around the Pinion 306 in such a way as to increase the number of teeth on Pinion 306 that come into full engagement with Chain 310. The effect of the two idlers is to increase the number of pinion teeth in full contact with the Drive Chain from three to five, which decreases the wear and strain on the pinion teeth.

Battery Charging Electronics Module 400 is attached to Motor Mounting Plate 246R on the right side of the Chassis as shown. This side is the same that in FIG. 18 has the Battery Charging Control Panel 402. This establishes the front and the rear of the invention. When looking at the invention with the Charging Module on the right, one is looking at the rear of the invention.

As will be appreciated by those skilled in the art, such reversible DC motors are convenient for achieving control for maneuvering in tight quarters and to render the Tug compact and adaptable for operation free of electrical cords and the like.

FIG. 18 Main Control Panel 404 is mounted on Motor Compartment Floor 224R on the rear of the Tug.

FIG. $18_1$ Shows Main Control Panel 404. Top center is the Joystick Connector Receptacle 88 to receive Joystick Connector 86 Immediately below Receptacle 88 is the Charger Inhibitor Receptacle 406. Top right is a Electric Brakes Jack 408 to receive a connector from the trailer brakes if the trailer being moved has such brakes. Trailer brakes from the trailer are connected here and the wiring of the Joystick Controller and its module carries the circuit to the "Brakes" button 106 on the Joystick Controller 102. Lower right is a Circuit Reset Button 410. Lower left is a Connector 412 to receive 120 V AC current.

FIG. $18_2$ Battery Charging Control Panel 402 mounts a Connector 416 to receive 120 V AC for battery charging. DC Input Connector 418 is a tubular cigarette lighter-type Socket. Battery Charging Rate Meter 420 is mounted at the bottom of the Panel 402.

FIG. $18_3$ Contains orthogonal views of the Battery Packs 422F&R. There are two Packs on the Tug. Packs 422 have a Handle 424 on the front for lifting and for sliding the Pack into the compartment. On the lower left of the rear view of the Pack 422 is a connector 426 to the battery circuit of the Tug. This connector acts through the rectangular hole 212 in Plate 208 of the Chassis. Both packs are identical as are the arrangements of the connectors in both of the battery compartments.

FIG. 18 shows the Battery Pack 422R in place in the Rear Battery Compartment 428R. Immediately to the left of the Rear Battery Compartment 428R is shown the Joystick Control Module 430. This is a slide-in slide-out module connected with a wire bundle to the Tug circuitry. All wiring in the Tug passes through the various routing holes 210.

FIG. 19. A top view of the Tug 50 in its Housing 54. Shown in the Post Socket Well 238 is a standard model Post Socket 78. The Post Socket Base Bearing annulus 80 is visible at the bottom of the Socket tube 78. The Transport Handle Socket 70 for receiving the Threaded End 112 of Transport Handle 56 is shown, as is Transport Handle 56 with Adjusting Ring 111 shown in its stowed position in Clips 68. Coupling Post 62 is shown in its stowed position in the Coupling Post Storage Cradle 63. The Coupling Post height Adjustment Holes 74 are shown facing upward. Joystick Control 64 is connected to the Control Panel 404.

FIG. 20 is a rear view of the Tug 50 in its Housing 54. Coupling Post 62 and Transport Handle 56 are shown exploded from their respective stowage devices, Post Cradles 63 and Handle Clips 68. Visible in the cutout space of Housing 54 is the Main Control Panel 404. Drive Sprockets 248L&R can be seen on the inner sides of Tug Tires 501L&R. Immediately beneath the Control Panel 404 is the Rear Battery Compartment Door 254R held closed by Door Lock 258.

FIG. 21 shows the same top view as in FIG. 19 but with the alternately embodied Post Socket 236 fitting inside Jack Cylinder 226. The flexible hydraulic line 232 passes from the Nipple Fitting 230A which projects from Hydraulic Reservoir 240 through routing hole 210 in the T-Plate 202L to the Hydraulic Nipple Fitting 230 at the bottom of the Jack Cylinder 226. Hydraulic Pump with Lever 242 appears on top of Reservoir 240 and Pressure Relief Valve Actuator 244 is seen next to it on the left.

FIG. 22 is the same rear view as in FIG. 20, but shows the Hydraulic Pump Lever and Pressure Pump Relief Valve Actuator as described in FIG. 21.

FIG. 23 is a side view of Tug 50 in its Housing 54, showing the Transport Handle 56, in its stowage Clips 68, Transport Handle Connecting Socket 70, Standard version Post Socket 78, and Coupling Post 62 in its Stowage Cradles 63. Shown connected to the Joystick Connector Receptacle 88, is the Joystick Connector 86, and the Charger Inhibitor 406 is connected to its receptacle below the Joystick Connector 86. Wheel Assembly 500R is complete with FW Clutch Pin Bracket 520R holding FW Clutch Pin 524R with D-Ring 532R in its rest position. Wheel Assembly 500R is held in place on Spindle 200R by wheel Retainer Clip 514R.

FIG. 24 is a cross-section of FIG. 23, showing, in addition to those parts described in FIG. 23, the Threaded Transport Handle Socket 70, the entire Standard version Post Socket 78 including the support flanges and the Journal Pin 216. The Post Socket Base Bearing annulus is not shown in this section but is shown in FIG. 12, Section A—A. Still referring to FIG. 24, we see the front and rear motors but owing to their opposing placement we see, in this sectional view, the Gearhead 302L of the left wheel Motor 300L but not the Gearhead of the right wheel Motor 300R. Battery Packs 422 are seen, but their connectors are not visible in this section. Battery Compartment Doors 254 are in their swung down open position, resting on the ground exposing the battery charging receptacle and stabilizing the Chassis 52 while it is not connected to either the trailer or the Transport Handle. Left wheel Drive Sprocket 248L is visible below the Chassis 52, and the Drive Chain 310L is in place. The chassis-mounted Main Control Panel 404 is seen as are the receptacles for the Joystick Control Connector 86 and the Charger Inhibitor Connector 406. Some of the electrical or electronic wiring is seen at the bottom of the Post Socket Well 238.

Referring to FIG. 24, in one modification, I incorporate Lifting Handles 114 for the purpose of lifting it up if necessary for any reason, including storage. One of these may be seen in FIG. $24_1$ While only a strong person could lift the entire Tug, it is possible with these handles, but the battery packs can be removed and also the housing. Removing the battery packs lightens it by about 37 pounds leaving it at about 55 pounds. Removing the Housing will not lighten it very much, but the user may want to, in case he or she was to drop the Tug which would possibly damage the Housing.

The handles are simple yet strong U-shaped handles with the part that is grasped having a diameter of at least ½ inch so as not to dig into the palms. They will be located at the left and right ends of the Post Socket Well 238, near the top, right under the lip of the Housing that comes down about ¾ inch over the top of the Well walls as seen in FIG. 24.

The handles swing from their holders and lie flat when at rest. They will not interfere with the operation of the Tug even when the Post Socket gimbal is in effect and leaning all the way to the side and touching the housing.

FIGS. 25–,29–31 show the Free-wheeling Wheel Assembly 500. In FIG. 25, a wheel 502 comprising two metal stampings joined together to form a Rim 504 a Web 506 and a Hub 508 is carried in a free-spinning relationship on roller or ball Bearings 510 on the wheel Spindle 200. The wheel Spindles 200 do not rotate. A flat washer 512 retains the wheel 502 on the distal end of the Spindle by means of a retainer clip 514.

Referring to FIG. 25, the axle is formed with the reduced in diameter spindle which receives a bearing assembly 510 which for illustrative purposes is shown as pair of bearings having inner races or rings mounting ball bearings and which is sandwiched between an inner spacer ring 250 and an outer washer 512 held in position by a lock ring 514. The main sprocket 248 is mounted into a groove inboard of the spacer ring 250 and is rotatable on the spindle 200 to rotate in unison with the Free-wheeling wheel assembly 500. The sprocket 248 is mounted in an annular groove formed between the axial intershoulder of the spacer ring 250 and the axially outwardly facing shoulder formed by the reduced in diameter lip of the axle. The groove is about 0.005" wider than the thickness of the sprocket 248 to maintain such sprocket rotationally supported to rotate as driven for affecting rotation of the assembly 500. As will be apparent to those skilled in the art, the sprocket, wheel assembly and bearing assembly may take many different forms and will be constructed to afford the desired clearance and freedom of rotation. Since the sprocket 248 rotates at relatively low RPMs and bears a maximum load of only 150 pounds and experiences no meaningful thrust forces and will operate only about 15 minutes per day, the design restrictions thereon are minimal.

Referring yet to FIG. 25, a Freewheeling Clutch Flange 518 (in the form of a flat circular pan with a hole in the middle or, put another way, a disk with a large concentric hole in it and a narrow flange at right angles to the disk) is welded to the inner surface of the wheel Rim 504 with multiple fillet welds 536 along the inner joint, leaving the outer edge of the wheel Rim 504 clean to permit mounting and removal of tires without damage. On the opposite rim, with the same positioning relating to the rim as the above Clutch Plate, a Clutch Pin Bracket 520 but comprising only a small portion of the circumference, is welded to rim 504 with a continuous fillet weld. A Hole 522, being the same diameter as Main Sprocket FW holes 252 is bored through and normal to the Flange 518 and the Bracket 520, and through the Web 506 of the wheel 502. The hole in the Web is enlarged slightly (about 1/16 inch) from the size of the holes in the Flange 518 and Bracket 520.

At this juncture, the Free-wheeling Assembly 500 is free to rotate about the Spindle 200 independently of the Drive Sprocket 248 which is prevented from rotating by the Sprocket Chain being engaged with the gearing and motor. Inserting Clutch Pin 524 through all three holes will lock the wheel and the Sprocket together to rotate as one about Spindle 200. Clutch Pin 524 is formed as a round shaft having a diameter such as to slide in close fit to the wheel holes 520 and the Sprocket holes 252, with negligible free play. The pin end of Pin 524 is rounded to facilitate entry in holes 252. The head end of Pin 524 is a flat disk having a diameter such as to allow hitting it with the palm of the hand to force it if necessary without injury to the palm of the hand. I have found a diameter of one and a quarter inch is satisfactory. There are two identical springloaded Detent Balls 526 and 526A recessed into the shaft of the pin 524. Outer Detent Ball 526 holds the head of the Pin snug against the Clutch Pin Bracket 520, while Inner Detent Ball 526A holds the Pin such that the end of the Pin is fully withdrawn from Sprocket Role 252, but still engaged in wheel Hole 520. In the withdrawn position (FW), Balls 526 and 526A are on opposite sides of Bracket 520.

Still on the shaft of Pin 524 but on the opposite side of the web 506 of wheel 502, is a Snap Ring 528 of the kind requiring a spreader tool to attach and remove, seated in a circumferential groove 530. The position of Snap Ring 528 is such that if the Clutch Pin 524 is pulled past both Ball Detents, the Snap Ring will bear against the wheel web 506 and stop the pin from moving any further out.

FIG. 29 is a plan view of the head of Pin 524, and a section taken at the halfway point between the top and bottom surface of the Pin Head. A spring wire ring or bale, "D-Ring" 532 is inserted by its inward turning ends into holes 534 in the Pin Head. Said holes enter the head at diametrically opposite points. They do not however, point to the center of the head but rather, to a point very slightly off-center of the head. The inward turning ends of the D-Ring 532, having the same alignment as the holes 534, are aligned such that they insert freely into these holes without placing any strain on the wire when the plane of the D-Ring is the same as the plane of the head of Pin 524. Thus the D-Ring lies flat against Clutch Pin Bracket 520, but when the D-Ring is lifted to use to pull the Pin from the Clutch Pin hole in the Main Sprocket, torque is applied to the legs of the D-Ring which, when the D-Ring is released, cause it to snap back into planar alignment with the head of the Pin 524.

FIG. 30 is a right side view of Tug 50 showing the FW Clutch Pin Bracket 520R with the Clutch Pin 524R in place and the D-Ring 532R in its resting position. For purposes of continuity and clarity of FIGS. 30, 31 and 32 it is assumed that the Pin 524R is in its fully inserted position and engaged with Drive Sprocket 248R as shown clearly in FIG. 25, and that the Left and Right wheels are in the same mirrored position of rotation, even though such a mirrored relationship will happen only once in a great while. Also in FIG. 30 can be seen the wheel Retainer Clip 514 which holds the wheel on the Spindle.

FIG. 25 is a view of the interior face of wheel Assembly 500L showing the FW Clutch Flange 518L and Clutch Pin hole 522L with the Pin 524L fully inserted.

FIG. 31 is a view of the same wheel Assembly 500L as in FIG. 25 but viewed from further toward the viewer to include of the interior face of left side Drive Sprocket 248L, showing the Pin 524L filling one of the FW holes 252. If all FW holes 252 are empty of the Pin 524, the Tug will be in free-wheeling mode, fully disconnected from the drive train. The reason for eight Free-wheeling Holes 252 is to simplify insertion of Pin 524 in one hole without the necessity of moving the wheel much to find a hole. As many more holes as desired can be made, the more there are, the easier it is to insert the pin.

It is a new and unexpected result of using batteries to power the Tug that the user is able to perform a variety of tasks with the Tug over and above simply moving large trailers. It is truly a Tug, not simply a dolly, and can do many things and can also be operated on boats, airplanes, or inside the home or workshop. One such new result is described below and illustrated in FIG. 26.

FIG. 26 shows three views of the Accessory Carrier 600 that is designed to be pulled by the Tug 50.

FIG. 28 shows the basic Carrier 600 which consists of a frame 602 having two wheels 604 on spindles or axles. The lower surface of the Tongue 606 is higher than the top of the standard Post Socket 78 or the hydraulic Jack Post 236, by only enough to clear the top of the Clips on the top of the Tug. A tubular Carrier Post Sleeve 608 is permanently attached to the front of the Tongue 606, its lower end flush with the Tongue and its upper end about six inches above the top of the Tongue. The Coupling Post 62 is merely dropped into Sleeve 608 and pinned with the Coupling Pin 84. Vertical open-top Control Bracket Sleeve 610 is affixed to the rear portion in the center of the tongue support. The Control Bracket 612 is free to rotate for convenience of use.

FIG. 27 shows Control Bracket 612 inserted in Control Bracket Sleeve 610 upon which is mounted the Joystick Control 64. A detachable Seat Column Flange 614 in the floor of the carrier accepts Seat Column 616 upon which can be attached Single Seat 618 or Tandem Seat 620 which then allows use of the carrier as a people-mover cart. FIG. 26C shows Stake Wagon Frame 622 installed.

Any number and variety of things can be moved with the carrier and only three possibilities of the possibilities are shown. No AC cord-operated dolly can do this, and thus the use of batteries and several other new features sets this invention apart for its new and unexpected uses.

OPERATION OF THE INVENTION

Basic Chassis

This Tug 50 has a molded plastic Housing 54 on a Chassis 52, rolling on two 12" knobby pneumatic tires 50IL&R. The housing 54 encloses two motors 300L&R, each of them turning one of the wheels that move the Tug.

Referring to FIG. 4, the Tug pushes and/or pulls on Coupling Post 62 to move the trailer.

The Tug's movements are controlled by means of a Joystick Control 64, or another version that is wireless, 64A. Moving the Tug by hand power is possible but only for moving it to and from its place of storage, or for moving the trailer in an emergency if batteries fail and no alternative 120V source is available.

Coupling Assembly

Referring now to FIGS. 1–7, my trailer Tug operates after mating with a vertical steel Coupling Post 62, FIG. 4 which is attached to the trailer tongue by means of Coupling Assembly 58, FIG. 7 which the user attaches rigidly to one of the trailer tongues side members before using the product for the first time. Once the Coupling Assembly 58 has been installed, there is no need to remove it. The Coupling Assembly 58 is attached after positioning its two main components, the Coupling Assembly Attachment Plate 92 and the Backup Plate 98 on one of the tongue's two A-frame members in a location that is the center of a circular area of 24 inches diameter in which there are no obstructions of more than two inches below the tongue frame, including a built-in trailer jack if the trailer has one. It can also be installed on a tongue that is a simple single square beam. Specifically, the Coupling Post Receiver Sleeve 76 of the Coupling Assembly must be at least a foot from any trailer jack post. The two parts, Attachment Plate 92 and Backing Plate 98 are connected with the Bolts 96 so that the tongue's A-frame member is sandwiched between them. The Bolt Holes 94 in both plates are spaced so that the plates can be secured to every size trailer tongue beam.

The Coupling Assembly 58 has the Coupling Post Receiver Sleeve 76 which is composed of two parts, Coupling Assembly Attachment Plate 92 and a tube, Coupling Post Receiver Sleeve 76 welded together. Sleeve 76 is a vertical open-ended tube welded along its length to the Plate 92 which is bolted against the outer side of the tongue frame member. Sleeve 76 has two diametrically opposite rows of Holes 82 running the vertical length of the tube. The Sleeve is further held against Plate 92 by welded triangular buttresses 93, one leg of the triangles being concave to fit the sleeve. One of these buttresses has a hole which holds a chain to which is attached Coupling Pin 84. The Pin has a Detent Ball 85 located such as to hold it in Sleeve 76.

The terms "front" and "rear" are used throughout this application. The easy way to distinguish the "front" from the "rear" is by where the Main Control Panel 404 is located. This end would be called the rear, since when under straight-ahead motion of the Tug, (the trailer going backward) it would be the end the driver sees when walking behind the Tug. It's easy to remember that the front of the Tug faces the front of the trailer.

Operation of the Tug

General Note: The letter designations L&R mean Left and Right. F&R means Front and Rear. The meaning of R is determined by the other letter with it.

To facilitate continuity of understanding, the basics of operation will be stated here again and then the details will be revealed throughout this document.

The basics are: The Tug pushes and/or pulls on Coupling Post 62 to move the trailer.

The Tug can neither stand up nor roll unless it is connected to either the Coupling Assembly 58 by Coupling Post 62 or 236, or the Transport Handle 56 is screwed into its threaded socket 70.

When moving the trailer, the Tug is removed from its storage place which may be a compartment inside the trailer or towing vehicle. Some motor homes have large storage compartments along their sides under the floor, called "basements"—The Tug can easily be rolled up a small ramp into one of those or into other elevated spaces such as the trunk of a car. To move it up or down such ramps, it is helpful to attach the Transport Handle and then power it slowly up the ramp in a straight line. It can easily roll up a 45 degree ramp if it is not moving a trailer. Removing it from such spaces can be done in the same way. (The Tug can also be moved by hand down the ramp at this stage by enabling the Free-wheeling function prior to removing from storage.)

Then, unless already done as above, the Free-wheeling device described above allows the tug to be rolled by hand to the trailer, using the Handle to push the tug and steer it.

Once at the side of the trailer tongue, Coupling Post 62 is removed from its storage cradles atop the Housing 54 and laid on the ground. Using the Handle to guide it the Tug is then carefully positioned directly under Coupling Assembly 58. Coupling Post 62 is then inserted down through Post Receiver Sleeve 76 into a vertical tube on the Tug called the Coupling Post Socket 78 until it comes to rest on the Post Socket Base Bearing 80 inside the Socket 78 at a point below the centerline of the wheel Spindles 200.

Continuing on now with the operation, once the Post is resting on top of the Post Socket Base bearing, the Tug is held upright by the Post. The Transport Handle 56 is removed from its socket and telescoped back to its shortest length and then returned to the storage clips on top of the Tug housing. The Coupling Pin 84 is inserted into one of the Post Sleeve Holes 82. As the Holes 82 on the Sleeve 76 are spaced differently than the Holes 74 on the Post 62, there will always be a pair of holes that either line up exactly or are very close to being lined up. If they are not lined up, the Post is simply lifted by hand a fraction of an inch and there will be an aligned pair. The Pin is inserted and pushed all the way in, past the stopping action of the Detent Ball 85 and the process is complete. The Tug and the trailer are now locked together, and at this point the trailer crank jack (a part of the trailer) is used to lift the tongue clear of any jack stands or the like which are then removed.

The bothersome process of cranking and inserting and removing jack stands and the like has been eliminated with an embodiment of the Coupling Post Socket 78. The embodiment is the Post Socket 236, hydraulic version seen in FIGS. 14–15. This is a small hydraulic jack designed in such a way that what would otherwise be called the lifting post of the jack is, instead, a lifting tube otherwise known in this invention as the Post Socket 236, a part functioning in concert with of the Reservoir and Hydraulic Pump Assembly 234. The Post socket 236 moves up and down in Jack Cylinder 226. The jack is operated by inserting the Transport Handle 56 into the threaded hole in the Jack Pump Lever 242.

With this invention, the user simply engages the Tug as described above but instead of grappling with extraneous stands trailer jacks, etc., he simply pumps the post up, removes any supports, and rolls trailer and Tug away with a flick of the joystick. It should be noted that with this hydraulic jack/socket it is not necessary to first detach the trailer from the towing vehicle and there is no need for a wheeled trailer jack post, an advantage for the following reason.

It should be pointed out that if, for some reason the user is not able to properly attach the Coupling Assembly 58 to the trailer tongue, then the trailer's crank jack, a part of the trailer, may be used as the connecting post. The Socket 78 or Socket 236 can receive any size trailer jack post. Sockets 78 or 236 are relatively deep and the greater depth results in a diminished level of the tendency inherent in shorter sockets to bend or break the post. However, if there is a substantial diametric difference between the trailer jack post that is being used from necessity, then a sleeve must be inserted to eliminate the large diametric discrepancy. Such sleeves are contemplated as an accessory to this invention.

Naturally, using the trailer's jack post in the Tug's gimbaled Sockets enhances the mating of the differing parts and lessens the strains on such posts.

Joystick Controller

The Tug housing 54 has a receptacle 88 on the rear to receive a bundled cable 104 which is connected to a hand-held control housing 64 upon which is mounted a small finger operated joystick 102. (Or in lieu of the bundled cable, the RF Operated Joystick Control 64A transmits to an RF receiver Module 90 which plugs into receptacle 88.) The joystick alone controls the speed and steering of the Tug.

For ease of understanding, the motions of the Joystick will be related to a compass with forward, (away from the user) called north, then right called east, reverse being called south and left called west. Moving it north makes the Tug move straight ahead. The farther north it is moved, the faster forward the Tug moves. Moving it to the west, south or the east causes the Tug to move accordingly. Whenever the joystick is moved north or south, the Tug moves forward or in reverse. This is true even when the operator and the joystick control are pointing in any direction at all differing from the direction of the Tug. Simply put, forward on the controller equals forward on the Tug. This can be confusing however if the operator is facing the front of the Tug and has turned the controller around with him so north is still pointing away from him and toward the Tug, but wants it to move forward. (to him) One's natural instinct might be to move the joystick south, (erroneously thinking "move joystick to me to move Tug to me") but they will soon learn to overcome such instincts. It must be said that there is an important learning process in this, as it can be quite confusing the first time one tries it. However it does not take long for the user to assimilate the new kind of visualization required, and adjust their movements accordingly.

To return to the mechanics of the joystick, it is of interest to note that when the joystick is moved north and the Tug moves forward, in reality the two motors 300L&R are each rotating in opposite rotations. This is because they are installed with one facing the right side of the Tug and one facing the left side. Accordingly if the Tug is to move forward, the left motor 300L must rotate counterclockwise as seen when looking at its Gearhead 302L from the left side of the Tug, and the right motor 300R clockwise when facing its Gearhead 302R from the right side of the Tug.

It becomes evident then that if, for example, both motors are rotating the same as viewed end-on to their gearheads, (example—the left motor counterclockwise and the right motor counterclockwise), the Tug will simply spin clockwise. This will happen when the joystick is moved to the right. (dead east) So if one wants the Tug to move in an arc forward and to the right, as opposed to merely rotating clockwise, one moves the joystick to the northeast—halfway between straight north and east. The Tug will make a circle to the right. The more the joystick points north than east, the larger the circle and conversely, the more the joystick points east than north, the smaller the circle will be until it is moved straight east when it will, again, spin clockwise. In backing the Tug, it too requires the learning curve. Backing up and to the left (this would be to the operator's left and the Tug's left when facing the rear of the Tug) requires that the joystick be moved to the southeast position. This is counterintuitive as one instinctively wants to move the joystick in the direction the Tug is desired to move. So it becomes evident that the left/right concept is reversed when the Tug moves backward (exactly the opposite than with a car) but that does not apply when moving forward. While it may sound terribly complicated, it is not very difficult at all and a person can master the tricks in an hour or two. However, it is recommended that one practice with the "training wheels" that are available as an accessory, or else with a very small trailer such as a 4'×8' utility trailer, before using the Tug to move a large trailer.

The joystick housing has an on/off Speed Range Control Selector 108 (not speed control, but range control—similar in function to a transmission with various gear ranges.) The joystick determines the minimum and maximum speeds in any one particular range setting.

Trailer Brake Button 106 controls the electric brakes if the trailer being moved has such brakes. The wiring from Button 106 runs to the Control Panel 404 where there is a jack 408 to receive the wiring from the trailer brakes on the trailer. Naturally if the trailer does not have electric brakes these functions are not used.

A similar joystick and its Joystick Control Module are made by Penny and Giles, Drive Technology Inc. Christchurch Dorset, England. Their model which functions similarly to the one described here is called the Pilot Type D49637/5.

Chassis Assembly—Post Socket Well

Referring now to FIGS. 1–17 will reveal the construction and function of part of the chassis including the Standard Post Socket 78 and its alternate embodiment, Hydraulic Jack Post Socket 236.

Longitudinal T-plates 202L&R (FIG. 11) are designed to be one-third of the main supporting structure of the Tug. That structure is composed of Longitudinal T-plates 202L&R welded along their lower edges to Chassis Base Plate 206, This structure becomes an inflexible assembly along the axis of the Wheel Spindles 200L&R and defines the sides of the Post Socket Well 238.

The addition of Transverse Frame Plates 208F&R welded along all possible intersections between it and Longitudinal T-plates 202L&R and Chassis Base Plate 206 establishes the front and rear walls and the floor of Post Socket Well 238 and creates the inflexibility of the Chassis 52 along a longitudinal axis and eliminates flexion from the structure along any axis.

It can be seen that the Routing Holes 210 and the Journal Hole 214 and the Battery Connector Hole 212F&R are now a part of Chassis 52.

Although the descriptions L–R have been given and are noted in the Figures, it is not until the installation of the hydraulics in FIG. 14 or the electronics in FIG. 17 that the actual front and rear of the Tug are established—for all of the frame members and the spindle assemblies are identical parts, left and right.

Coupling Post Socket

FIG. 12 reveals the construction of Coupling Post Socket 78. (Standard version) It is this Socket that will be used in the connection of the Tug to the coupling post 62 on the trailer to be moved. It should be noted that the Coupling Post Socket 78 can move in an arc from side to side around the Longitudinal Pivot Pin 216, The limits of this arc are defined by the side walls of Post Socket Well 238 and are about 15 degrees in each direction. This side-to-side movement is referred to in this RPA Application as being "gimbaled" This gimbaled connection is a new feature and is not found in any prior art. Its purpose is to allow both wheels of the Tug to remain on the ground in uneven terrain. The reason this is important is because it eliminates any severe bending strain on the Tug 50 and the Coupling Post 62 and allows both wheels to remain in firm contact with the ground and therefore, since they are independently powered, both providing equal traction. See FIG. 33.

In operation, when connected to the trailer by means of the Coupling Post 62, the Tug is fixed in its angular relationship to the trailer tongue. Its Base Plate and Spindles are normal to the tongue and cannot move in any other way than to pivot around the Coupling Post 62. The wheels absorb any change of the ground plane around their own axis. However, any irregularities in the ground about the Pivot Pin axis that would exert a twisting between trailer and Tug are absorbed by the longitudinal Pivot Pin 216 which allows the Post Sockets 78 or 236 to absorb the twist. In effect it is a "sideways axle" cooperating to provide for a gimbal action.

With prior art that attaches to trailers by means of the trailer's own crank jack post of unknown or questionable strength, it is possible that a left to right planar difference of fifteen degrees magnitude could exert dangerous bending forces on the post. With this Tug, even connecting by means of a weaker trailer jack post, that danger is removed.

Therefore, this Tug can work on any slope upon which it will be needed, with any twisting between trailer and Tug, and prior art cannot make that claim.

FIG. 33 reveals the benefits of this feature and one possible result of the lack of this feature on prior art.

While this ability to respond to changes in the ground elevation about the longitudinal axis may not seem important, it is of major importance in many situations. In FIG. 33 for example, such a situation exists when the trailer is proceeding up and is past a driveway's inclined apron and the Tug is turned sharply while it is still on the incline. With any other two-wheeled Tug, such a situation would result in one wheel coming off the pavement or the jack post possibly bending, but in my Tug, the Post Socket allows the movement.

Referring to FIG. 12 again, the Centering Springs 222 serve to keep Coupling Post Socket 78 in the upright position when not locked upright by the Coupling Post 62. This is important when the Tug is being positioned to couple with the trailer and the Coupling Post 62. The Coupling Post Socket 78 lying at an angle at that time would make it difficult to drop the vertical post into it.

FIGS. 14 and 15 show the same features as 12–13 but with the alternative embodiment of the Post Socket 236 which incorporates a hydraulic jack that greatly simplifies the coupling of the Tug and a trailer, as has been explained.

Motors

FIG. 13 shows the addition of Motor Compartment Floor Plates and horizontal stiffeners 224F&R which form the floor of the upper deck compartments for the Motors 300L&R and the Main Control Panel 404.

In FIG. 17, there are two variable speed-reversible 24 volt DC electric motors 300L&R each with a Gearhead 302L&R containing a series of gears which greatly reduce the motor output speed and proportionately increase the torque. The motors are mounted transversely across the Tug, one in the front, 300R, with the Gearhead 302R on the right side and one in the rear, 300L with the Gearhead 302L on the left side.

Note: Although the motors and gearheads are in the Front and Rear, they operate the wheels on the Left and Right sides and therefore are designated L&R.

Drive Train

I will describe one drive train without L or R designations. Both are the same. See FIG. 17.

Through its Gearhead, the Motor 300 turns a shaft, which projects through Pinion Sprocket Shaft Hole 314 in Motor Mounting Plate 246. A small Pinion Sprocket 306 having eight or ten teeth is mounted at the end of the shaft.

Drive Chain 310 leads around Pinion 306 with either eight teeth or 10 teeth to Drive Sprocket 248 which has 84 teeth. Thus, there is a ratio of 10.5:1 (eight tooth) or 8.4:1 (10 tooth) between the two sprockets. The reduction of the gearheads will depend upon the choice of motors. The desired range of operation of the Tug for trailer moving is from as low as 0.6 MPH in tight situations (1.6 rpm) to perhaps 100 feet per minute depending on conditions, while for accessory cart use in the people-mover mode it is 264 feet per minute or 3 mph (84 rpm with 12" tires). The maximum torque needed at the wheels when moving trailers up to 16 ft. in length weighing 1500 lbs. up a grade of 10% is 1300 inch pounds.

These dynamic characteristics are easily within the range of economically priced 24 volt motor/Gearhead combinations. Motor/Gearhead combinations are available with the required horsepower that have motor speeds from, 2700 rpm to 20,000 rpm.

For example: With a motor speed of 10,000 RPM, turning the drive wheel at 84 rpm (3 mph) requires a total gear reduction of 119:1 and with the sprockets reducing by 10.5:1 the Gearhead reduction needs to be 11.3:1. Reducing the motor rpm to 475 results in the drive wheels turning at 4 rpm, (one mph) a desirable speed for critical maneuvering in tight places. While these reductions may seem extreme, a popular cordless drill has a rotational speed range of from 8 rpm to 3660 (a ratio of 458:1) and delivers 360 in-lbs of torque. The inventor has powered an early prototype of this invention with such a cordless drill and moved a 16-ft trailer up a 5% incline with it. In one embodiment my invention may be powered by a cordless drill chucked up to a drive shaft.

Referring again to FIG. 17, on the outside of Motor Mounting Plate 246, two Idler Sprockets 308 are engaged in Drive Chain 310 immediately before and after Sprocket Pinion 306 in the line of movement of chain 310, Their function is to cause more teeth of sprocket pinion 306 to engage with the chain. This is because the close proximity of the pinion to the drive sprocket results in very few teeth of the eight tooth pinion fully engaging the chain. Wrapping the chain slightly around the pinion, as the idler sprockets do, engages more teeth and thus reduces the wear on all of the teeth.

The wheels 502L&R supporting 12 inch pneumatic tires 501L&R with knobby treads for best traction on grass and the like, are made from metal stampings and incorporates ball bearing races which fit onto the Spindles 200L&R. The bearings are a snug fit over the spindle shaft and the wheels are free to rotate when the Free-wheeling mechanism is enabled by disconnecting the wheel from the sprocket.

Motors, Charging Etc.

The motors are powered by the two 12V battery packs 422L&R which are wired in the Tug in a series providing 24 V to the motors. The packs are constructed as carry cases and each has a handle 424 to use in removing them from the battery compartments 428F&R, and for carrying the packs when removed. The rear of each pack is made with a connector 426, flush with the outside surface of the pack which, when the pack is inserted in the compartment, engages with a connector installed in holes 212F&R in Transverse Frame Plates 208F&R, the back walls of the compartments which are also the front and back walls of the Post Socket Well 238.

There is a battery compartment door 254F&R in the front and the rear of the Chassis 52. Installing the batteries simply requires opening the doors and swinging them down until they rest on the ground where they will then hold the Tug in an upright position and expose the Battery Charging Control Panel 402 in the right rear corner of the lower deck 320 of the Tug.

Opening either battery compartment door opens a switch that breaks the Tug's power and operation circuits preventing use of the Tug while the door is open. The switches simultaneously disable the circuits connected to the Main Control Panel 404 and enable the charging circuit connected to the Battery Charging Control Panel 402. This is a safety feature. Additionally the rear door cannot be closed if the Charger is in operation because the 120V AC power cord will be in the AC Input Connector 416 which is on the Battery Charging Control Panel 402 accessible only when the door is open. The same safeguard is present if the DC input on the Charging Control Panel is being used for charging.

When charging the batteries, the Battery Charging Rate Meter 420 shows the rate of charge. The charging current is controlled by the Battery Charging Module 400 mounted in the chassis cavity above the right wheel spindle. This module regulates the flow of the charging current and automatically shuts the charging off when the batteries are fully charged. Such controlling devices are common in things like the 3-wheeled scooters used by disabled persons.

The Charging Module 400 has an additional feature not found on such devices as wheelchairs and scooters for the disabled. It has the 120V AC to 12V DC converter used for the battery charging but that converter is also able to function when a 120V AC line is connected to the 120V AC Input on the Main Control Panel 404. That connection both disconnects the charger and activates circuitry that converts the 120V AC to 24V DC rather than the 12V DC used for charging. This enables the Tug to operate with AC power supplied by an extension cord in the event it is not possible to power it with the batteries. There could be various reasons for this need, such as not having charged the batteries, or a malfunction, or simply as a conservation measure if the operator knows he will need a full charge on the batteries at another location and is presently in a location where he can use the 120V alternate operation. Of course, using an AC cord drastically limits the things the Tug can do. It makes it like prior art but yet with some notable improvements.

The batteries can also be charged by use of the DC Input Connector 418 on Panel 402. This is a cigarette lighter type socket into which can be put a connector designed for this type of receptacle.

Two sources of DC current can be used to charge the batteries. One is from a panel or series of panels that convert solar energy to 12V DC. It will be appreciated that under favorable conditions, the owner and user of one of the Tugs that comprise this invention can keep the Tug running and fully charged by solar energy while at a campsite over a few days, and be totally independent of the need for 120V AC. If, in such a situation, the user was also using the Tug in its novel function as a utility Tug with the accessory carrier 600 described in these documents, it may not be possible to fully maintain the battery levels on solar panels alone, but then the user can employ one of the options described below.

The other sources of charging current can be either from the output of a towing vehicle's generator or alternator, but only if the towing vehicle's engine is running, or a source of DC can be a larger battery, such as the "house" battery of a trailer or an RV. However, if this is done, certain safeguards must be exercised. A warning decal will be placed near the Charging Control Panel advising of this caution.

Reiterating, the Tug's safeguards prevent the simultaneous activation of the charging circuit (whether AC or DC input) and the power to the motors. So although there are two AC inputs, they are prevented from simultaneous functioning.

To the left of the rear battery Pack 422R, in the left rear cavity in the Lower Deck 320 of the frame, is the Joystick Control Module 430. This is a box of electronics with a handle for insertion and removal from the cavity. The inner end of the box has a connector that couples with a connector mounted inside the space.

All wiring between the batteries, the motors, and the charging devices is routed through the various Routing Holes 210.

The Housing

FIGS. 19–24 show the Housing 54 installed on the Chassis 52. The housing is made of molded PVC plastic and is configured to both protect the internal mechanisms and protect the user from accidentally touching the Chain 310 or any other parts, while giving the Tug an appealing appearance. It is designed to rest atop the Chassis fitting snugly around the top edges of the walls of Post Socket Well 238, and it rests on the top edges of Transverse Frame Plates 208 and Motor Mounting Plates 246, and is held securely in place by two screws into the inner top edge of the end walls of the Post Socket Well 238 which are the top edges of Longitudinal T-Plates 202. This makes it easy to remove the housing when necessary.

Free-wheeling

The description of the drive train continues, referring to FIG. 25. Again—one side will be described since both are the same. The letter combination FW represents "Free-wheeling".

Referring to FIGS. 25, 29–31, the drive chain turns Drive Sprocket 248 mounted with a small bore clearance, on Spindle 200. The small clearance is sufficient to allow it to rotate freely on the spindle. The sprocket is held in place on the spindle axis by the increased diameter of the Spindle on the inner side and on the outer side by FW Spacer Sleeve 250. When the Tug is in FW mode, with the power and Joystick off, the Wheel 500 can turn, but the sprocket does not turn because it is connected by the drive chain to the motor which remains stationary with the power off. But with the insertion of FW Clutch Pin 524, the sprocket and the wheel are rotationally locked to rotate together and the Tug then cannot be moved except under power.

Pin 524 is incorporated into Free-wheeling Assembly 500 and slides into and out of engagement with Sprocket 248 by means of manual operation. FW Assembly 500 consists of Wheel 502 upon which FW Clutch Flange 518 is tacked with fillet welds 536. On the other side of Wheel 502 from the Flange 518 is FW Clutch Pin Bracket 520, a "pie-slice" shaped section of a flange similar in cross section to the disk part of Flange 518 and welded to the wheel in the same relative position, but with a continuous fillet weld. FW Clutch Pin Hole 522 is for Pin 524 which goes through the hole 522 in the Bracket 520, and then through a slightly larger hole in the Web 506 of Wheel 502 and then on through a hole 522 in FW Clutch Flange 518. Naturally, all three holes line up perfectly. Pin 524 is made of hardened steel with a high shear strength and has two Detent Balls 526 and 526A in it, positioned in such a way that 526 holds the pin in and 526A keeps it from coming any further out than is necessary. Additionally Pin 524 has a Clutch Pin Snap Ring 528 engaging the shaft on the inboard side of the wheel which prevents the pin from being totally pulled out in the event Detent Ball 526A is overpowered. When Pin 524 is pushed in all the way, it engages with one of 8 FW Holes 252. Holes 252 could be 7 mm in diameter. There are eight such holes but there could be more if desired. There are many because when the Tug is being changed from FW mode to powered mode it is necessary to push Pin 524 into a hole in the sprocket. Because the FW must be changed to power mode when the Tug has been positioned accurately under the trailer tongue, it would be inconvenient if the operator had to roll the Tug back and forth trying to find a hole for the pin. Therefore, the more holes there are, the easier it is to engage the pin. In actuality, there could be 26 such holes spaced 7 mm apart using 117 mm as the diameter of the centerline of the holes. These holes would not weaken the Sprocket 248 in its use on the Tug.

Depending on the alignment, it could be necessary sometimes to require force to get Pin 524 into the hole. For that reason pin 524 has a head measuring 1½" so the heel of the hand can be used to slam it in and not sustain an injury. To facilitate moving the pin out of engagement there is a D-ring 532 on the head of the pin. This is formed of spring wire. The ends of the wire are bent to where they point toward each other, but not exactly. Their centerlines intersect at a point which is in the same plane as that of the curved end of the ring, but about 3 mm off from where they would meet if they intersected straight on. And the holes in the head of pin 524 into which these ends are inserted enter the head of the pin at diametrically opposite sides of the head and are at the same angles as the angles of the ring ends, so they do not intersect at the center of the head, but about 3 mm off. This configuration causes the D-ring to be at rest when it is in the same plane as the head of pin 524. And when the D-ring is pulled up from the head, the angular arrangement of the ring ends causes the portions of the Ring between the curved part and the bends at the end to be twisted as the ring rises above the head. So when the ring is released, it snaps back down into its retracted position in a parallel plane with the head.

Free-wheeling and the Transport Handle

The Free-wheeling mode is a distinct advantage in the invention. Although Prior Art has a pair of small diameter wheels upon which the device can be rocked back and then rolled around, such small wheels may be difficult to keep rolling on loose soil, rocky soil, gravel, and such. Further, it appears that in order to do this, the device must be tipped back so far that the operator must stoop to use it. This could be painful for many people.

The free-wheeling mode utilizes a disconnect pin on each wheel which disconnects the drive sprocket from the Free-wheeling Clutch which is a part of each wheel. It is an extremely simple device which is not prone to mechanical failure considering the low rotational speeds and loading. Using this method, the Tug is moved about on its large wide wheels which are far more suitable for various surfaces and conditions than the small auxiliary wheels of the prior art. Further, one must not stoop to use it.

When rolling the prior art on its rear auxiliary wheels when it is not under power, a small person may be able to use the handle without bending over to keep the small wheels on the ground. But the taller the user is, the closer to the ground the dolly's drive wheels will get until they touch the ground. And a tall person may possibly need to stoop. With the Transport Handle of my invention, a person of any height can hold the handle easily at the usual level one does when operating a power mower. This is possible because the handle is not pivoted but rigidly connected to the Tug and the entire Tug may be tipped as far as necessary forward or back, and still roll the same. So any height person can use it with equal ease and comfort. It should be noted that the Transport Handle is used for but a brief time, only to move the Tug from storage to the front of the trailer.

The Transport Handle 56 is simply lifted from its stowage clips on the top of the housing 54, extended to the desired length, the Adjusting Ring 111 is tightened, and the end of the handle is screwed into Transport Handle Socket 70, the FW pins are pulled and the Tug may be rolled away easily without bending over.

FIGS. 19–24 show the Transport Handle Socket which is molded into the housing. It is an internally threaded projection and the threads are the same as on Transport Handle 56. In addition to moving the Tug when in the free-wheeling mode, the Transport Handle also doubles as the jack handle for the Hydraulic Jack Pump 242.

The foregoing will be apparent to those skilled in the art that various embodiments of my invention offer several advantages. In one embodiment, the Post Sockets are relatively long, thus providing substantial telescopical reach. The jackpost is configured for a relatively close fit relationship within the coupling sleeve to thus maintain the longitudinal axes of these components in substantial alignment to minimize any twisting forces which might otherwise result from misalignment and minimize point loading which could result in point forces on the post and possible bending.

Preferably, the clearance between such posts and socket is less than $3/32^{nds}$ inch. The post itself is preferably constructed of a heavy gauge steel.

This close fit relationship between a post and socket appears to cooperate in maintaining the Tug upright and avoiding forward or rear tipping even while the Tug is rotating about the post. The embodiment incorporating this feature thus offers significant advantages over the prior art.

In one embodiment, by placing the brackets supporting the post low, relative to the axis of the support wheels, and coincident with the transverse plane thereof, it will be impossible for any side forces applied to such Tug, such as by torque applied to one or the other of both wheels or the to offset the upright orientation of the Tug.

In one embodiment my jackpost is inserted to the receiver 76 which may only be a fraction of an inch above the dolly Post Socket 78 to receive the post. The bottom edge of the coupling post receiving sleeve can ride on the top of the Post Socket if there happens to be any misalignment of the holes 74 & 82.

In the embodiment employing independently rotating wheels on separate axles, the Tug can be operated by a hardwired or cordless joystick. In this embodiment, the Tug can be rotated through a full 360-degree revolution about its own axis in a circle of about 22 inches outside diameter.

In practice, my invention may be powered by lightweight battery packs similar to those used in cordless tools to drive lightweight high-speed, low voltage DC motors operating at 6,000–20,000 rpm, with a high gear reduction or high torque to guarantee a wheel rotation speed to move the tug at about 1.6–10 feet per minute. This allows the operator to operate the Tug at distances from electrical outlets, as for instance, to tow a trailer out a driveway and across the street, down the street, or even in wilderness areas where power outlets are not readily available. The Tug may be readily employed as a compact and powerful prime mover for a cart or the like for hauling water, groceries, firewood, passengers or the like. By utilizing twin reversible motors in one embodiment, my Tug can maneuver in exceptionally intricate and tight paths of travel, even turning about its own vertical axis.

One advantage of the accessory to my invention that allows the top edge of the Post Socket to be disposed at an elevation only a fraction of an inch below the horizontal plane of the bottom edge of the tongue receiver sleeve 76 thus allowing ready and quick vertical alignment of the two so the post may be dropped vertically thereto without the necessity of any tedious or strenuous cranking of mechanical jacks or the like.

By utilizing the preferred embodiment of my invention with a wireless or hardwired joystick, unlike all prior art, the Tug can be maneuvered about without the necessity of a steering handle which must be grasped by the operator in close proximity to the Tug itself. This, then, provides the advantage that, not only can the Tug be maneuvered from some distance away, as even with the operator sitting on top of the trailer or even inside of the trailer itself, but further, by eliminating the requirement of a handle, the Tug can maneuver the tongue of a trailer into close quarters even up against a wall or fence or the like, there being no requirement that clearance space be left for maneuvering of a handle, or for an operator.

Referring to FIGS. 33–35, for those versions of my invention utilizing a gimbal for mounting of the Post Socket, it will be appreciated that the socket may be pivoted through, for instance, a 30-degree arc to accommodate maneuvering over vertical irregularities, such as sloping driveways and the like.

The embodiment of my Tug apparatus in an accessory cart affords great flexibility for the Tug owner. He or she is no longer burdened with the prospect of pulling into a trailer parking area faced with the exertion required for maneuvering the trailer into place and then, selecting between expending the effort and energy to unhook or miss out on the opportunity to explore the surrounding area with a transportation vehicle free of a trailer.

From the foregoing, it will be appreciated that in its various embodiments, the Tug can be operated without cumbersome restricted electrical cords and can operate without long lever handles or the like. It allows for convenient and intricate maneuvering of the trailer into position and into tight quarters. In practice, the Tug only weighs about 54 lbs. and, with batteries, only about 90 lbs, it being understood that much lighter batteries may also be used with minimal sacrifice of performance. The Tug apparatus provides a convenient and inexpensive means for moving travel trailers and the like about, as well as acting as a prime mover for auxiliary vehicles such as scooters and the like.

SECOND EMBODIMENT OF THE INVENTION

With reference to FIGS. 40–42, while the first embodiment T-1 of my invention has numerous superior features and the power of two motors, it is recognized that it may be more than needed for small trailers up to 16 feet. Further, with two motors and the sophistication of joystick control and wireless control, it can exceed some budgets. To accommodate these lesser needs, it was deemed useful to incorporate the novelty and the new and unexpected results obtained from the use of lightweight quick recharge battery power into my second embodiment that still fills the needs better than any prior art but more affordable and smaller and lighter than the first embodiment.

Hence this second embodiment has been designed, using as a starting point the work and features of my first concept utilized in my early tests. My first concept employed the use of a cordless drill as the motive power. Tests have shown that it is possible to move a 16-foot travel trailer around on city surfaces with a 14.4V DC cordless drill. It was felt that using such a drill made a lot of sense since the prudent traveler and many other trailer users such as craftsmen and contractors will have such a drill with them any time they venture forth in the various uses of trailers.

This second embodiment described here uses a single 24 volt tool motor such as a drill motor which may or may not have a two-range reduction Gearhead attached to it. The decision on whether to use the Gearhead or not depends fully on the purchaser's intended use. The user with a larger trailer and who expects a lot of use and possible heavy loads and many inclines, (such as a contractor), would wisely choose a Gearhead version. The chief visible difference between a version with a Gearhead and one without would be a slightly longer motor and a resultant increase in the height of the chassis of about three inches. The design shown here incorporates a motor with one speed range without a Gearhead.

Above, I have discussed the superiority of this invention over prior art. And I have pointed out deficiencies and problems related to prior art, i.e., dollies using handles. However in this second embodiment, even though "handles" are used and are referred to herein as "Tillers", many of those problems have been solved and the deficiencies largely reduced or even eliminated.

The differences between prior art and this second embodiment are several. First and foremost, it is totally portable because it uses batteries. Then it has a gimbaled Post Socket to accommodate irregular terrain. Its handle is not fixed as in prior art but can be raised or lowered over a wide angular range and locked in any desired position. It can be locked in a horizontal position which makes it possible to swing it under the trailer tongue and moved to the other side if conditions make it necessary. It can be operated while under the trailer tongue when needed in close quarters such as moving a trailer tongue-first into a garage and right up to the garage wall. And of course it can be raised high to accommodate the taller user, and with its articulated Tiller/Control Assembly, even higher. The handlebar grips and triggers can be individually rotated to accommodate any ergonomic needs of the user, such as an arthritic person who may have wrist problems.

The large flat area on the front of the Tiller is ideally suited for the incorporation of a solar panel that is of sufficient size to recharge the batteries on a full sunny day.

Additionally, the Tiller can be removed for storage and is also removed for its most spectacular difference over prior art, the scooter.

The scooter of T-2 is very much like the often seen three-wheeled scooters used by the disabled, including the inventor. However it has several significant differences which make it far superior. It has four wheels rather than three, giving it much greater stability. Further, the wheels are larger, all four being ten inches. It can also be made with twelve inch wheels. And the wheels are true tires, with tread and width for traversing virtually any terrain. It has roomy storage space below the deck. It could, in fact, be called the SUV or the Humvee of scooters. Its wheels are retractable in that they fold up to the underside of the rear deck and make storage easier. Even with the scooter disassembled, it is easy to move about by rolling it on either of the rear wheels.

The seat and its base can be used as a free standing chair either outside or in a motor home or trailer. It may be operated on the small batteries in the tiller body, or auxiliary batteries carried in compartments aft of the large storage compartments. A change in the length could accommodate a second seat behind the driver, making it truly versatile in town or country.

Detailed Description of Second Embodiment

Referring now to FIGS. 40–42, wherein is shown Tug T2 1001, the second embodiment of my invention, I incorporate generally a Chassis 1003 upon which is mounted a gimbaled Post Socket 1007 and carrying a Motor 1009 (FIG. 45–47) and a Differential 1011 (FIGS. 45,48, 49) carried on a pair of wheels and steered by an adjustable Tiller 1005. At the free end of the Tiller 1005 a Control Assembly 1013 is pivotally mounted to the Tiller 1005 and carries a Steering Handle 1015 comprised of a pair of Grips 1017 which support Forward Lever 1019 and Reverse Lever 1021. The angle of Control Assembly 1013 relative to the Tiller 1005 is adjusted by means of Control Assembly Angle Adjustment Buttons 1027 mounted at the lower ends of each arm of Control Assembly 1013.

The angles of the Grips 1017 and their incorporated Forward Lever 1019 and Reverse Lever 1021 is set by means of the Steering Handle Rotation Button 1029 mounted at each end of the Steering Handle 1015.

The top end of Tiller 1005 is a Control Panel 1023 (FIG. 59). On the front face of Tiller 1005 is mounted a Solar Recharging Panel 1025.

All wiring between Tiller 1005 and Chassis 1003 is carried in Control Cable 1041 which exits the lower end of Tiller 1005 and enters the Chassis 1003 through a Receptacle 1031 on the rear face of the Chassis. (FIG. 51)

Tiller 1005 may be set at any desired angle relative to the Chassis 1003 or the ground by means of Tiller Angle Locks 1033 on the outside face of each side of the Tiller. The Tiller may be disconnected from the Chassis by means of a Tiller Disconnect Lever 1035 on each side face of the Tiller. Located at the front of the Chassis on each side near the bottom are Free-wheeling Control Arms 1037, both attached to a rod and cams inside the Chassis.

Post Socket 1007 has a pair of Scooter Steering Assembly Keyways 1039 cut at opposite outside faces of Post Socket 1007 at the top. These are used when the Chassis 1003 is used as a power unit for Scooter 1043 and facilitate steering. (FIGS. 55–59)

Turning now to FIG. 42, It can be seen that Tiller 1005 is comprised of two main parts, Tiller 1005 and Tiller Base 1069. The Tiller 1005 may be conveniently separated from the Tiller Bases 1069 by means of the Tiller Disconnect Levers 1035 located on each side of the Tiller 1005. And the Tiller 1005 may be adjusted in its angular relationship to Tug T2 1001 or to the ground plane by means of the Tiller Angle Locks 1033 which provide a simple "On-Off" choice of settings labeled "FREE" and "LOCK" Also clearly visible in this figure is the Wheel Retainer Clip 1149, a simple snap ring set in a groove in the end of the Axle 1101. It may be noted that while in the first embodiment of this invention described earlier, the wheels are mounted on spindles which do not rotate, and rotate around said spindles. In this embodiment the Axle 1101 itself rotates through differential action, and each wheel is securely fixed to the Axle 1101 and held in place by the Wheel Keys 1151.

FIGS. 42, 45, and 49 clearly show how the Chassis Cover 1045 fits on the Chassis Frame Plates 1047 by "wrapping" around their edges and hooking over the top lateral walls of the Post Socket Saddle 1071 seen in FIG. 45. Chassis Cover 1045 is made with all edges having a bend to hold them in place on the frame. See FIG. 49.

FIGS. 43, 44, and 48 show the details of construction of the Tiller Base 1069. The base is made of cast material, either aluminum or polymer, and is in two main parts—the Tiller Base 1069 and the Tiller Hub 1055. FIG. 48 shows how the Tiller Hub 1055 is configured with a circumferential Retainer Flange and Locking Groove 1127. The Tiller Hub 1055 has the groove part and the Tiller Base 1069 casting has the flange part. In assembly the Tiller Hub 1055 is slipped into the Tiller Base 1069 from its outside face and then secured to the Chassis Frarne Plate 1047 by Hub-to-Frame Connectors 1103. This secures the Tiller Base 1069 in a rotating relationship to Chassis Frame Plate 1047 about Tiller Hub 1055 which does not rotate. At the same time, Tiller Bearing 1057 holds the Tiller Base 1069 assembly in place while allowing Axle 1101 to rotate through it and Chassis 1003. FIG. 43 shows best how the selection of the angular relationship of the Tiller 1005 is set. Tiller Hub 1055 has a series of Tiller Angle Selection Holes 1059 bored radially in its circumference face. These holes allow the insertion of Tiller Angle Locking Pin 1061 in any one of them. Tiller Angle Locking Pin 1061 is inserted or removed from the selected Tiller Angle Selection Hole 1059 by turning Tiller Angle Lock 1033 to the "LOCK" or "FREE" position. The Hole 1059 selected determines the angular relationship between the Chassis 1003 and the Tiller 1005.

FIGS. 44 & 44A shows the way the Tiller Angle Lock 1033 works. Tiller Angle Locking Pin 1061 slides up and down in its guide hole which has been bored from the bottom (curved) end of Tiller Base 1069 during manufacture. Its upper end is bent at a right angle and inserted into Cam Follower 1153. Tiller Angle Lock 1033 is made up of three parts, Tiller Angle Locking Cam 1063, Locking Cam Retainer Ring 1065, and Cam Follower 1153. Tiller Angle Locking Cam 1063 is inserted in Tiller Locking Cam Cavity 1067 so as to capture the bent part of Tiller Angle Locking Pin 1061 and Cam Follower 1153 in its cam grooves. It is then secured by Locking Cam Retainer Ring 1065 which is then bonded to Tiller Base 1069.

FIG. 44A shows how the cam grooves work. Cam Follower 1153 slides in the grooves as Tiller angle Locking Cam 1063 is rotated and Tiller Angle Locking Pin 1061 then moves up and down accordingly. Note the relative spacing of the pairs of horizontal lines to the left of each of the four positions of the Cam to see this movement. This design holds the Cam Follower 1153 in any position selected since the Retainer Ring 1065 exerts a slight pressure preventing the Cam from rotating. However, even without said pressure the Cam cannot be rotated by any of the forces acting on the rod.

The top edges of each Tiller Base 1069 are made with two Positioning Lugs 1049 and one Locking Point 1051. It can be seen that the lower portions of Tiller 1005 have holes to receive the Positioning Lugs 1049. Fig.53 shows the function of the Locking Point 1051. When Tiller 1005 is pressed over the Positioning Lugs 1049, the Tiller Locking Claws 1117 are forced open and as the Tiller 1005 is pushed down, the Tiller Locking Claws 1117 snap in place under the barbs of the Locking Point 1051. Lifting the Tiller Disconnect Lever 1035 forces the Tiller Disconnect Rod 1115 down between the Tiller Locking Claws 1117 allowing the Tiller 1005 to be lifted apart from the Tiller Base 1069.

FIGS. 45 & 48 show how the Post Socket 1007 is mated with the Post Socket Saddle 1071 by—Post Socket Pivot 1053. It functions the same as in the first embodiment except that there are no outer side walls to the Post Socket Saddle 1071. This allows the Post Socket 1007 to swing to one side or the other more than it can in the first embodiment. It will later be seen why this is desirable in the scooter configuration.

Motor 1009 is mounted in Motor Frame 1075 which is mounted to the Chassis Frame Plates 1047 by means of Motor Frame Pivot Pin 1087. A Thrust Bearing 1157 is mounted on the shaft of Motor 1009, one at each end of Worm 1077. Motor Frame 1075 allows moving Worm 1077 into and out of engagement with Worm Gear 1081 and that engagement is controlled by the two Engagement Cams 1089 which bear on the main side members of Motor Frame 1075. The Cams hold Worm 1077 against Worm Gear 1081 and when rotated, allow the Motor to swing away under the force of gravity causing disengagement of the drive train. Worm Gear 1081 is mounted to the outer case of Differential 1011 by means of a Worm Gear Flange 1155.

Referring to FIG. 37, Tiller 1005 has a series of compartments, two Battery Compartments 1125, and one Controls and Electronics Access 1123. Above the compartments, just below the Control Panel, there is a DC Input Receptacle 1121 and an AC Input Receptacle 1119.

FIGS. 54, 55, 38, 39, 63, 67 and 71 show the Scooter 1043. It consists of a Scooter Base 1131 upon which can be mounted Scooter Seat 1133, Scooter Seat Frame (Folding) 1135 and Scooter Basket 1137. These are all constructed to fold in such a way as to facilitate their storage. Scooter Basket 1137 and Scooter Seat Frame (Folding) 1135 will fit in Scooter Storage Compartment 1143, and Scooter Seat 1133 can be stored elsewhere. On its folding frame, it may be used as an auxiliary chair in the motor home, the travel trailer, on the job site, or at campfires. Alternatively, the folding elements, Scooter Seat Frame (Folding) 1135 and Scooter Basket 1137 may be designed to fold flat on the Scooter Base 1131 and the Scooter Seat 1133 may be designed to fit in the Scooter Storage Compartments 1143. This is a matter of choice.

FIG. 57 is a side view of the scooter accessory base unit. This figure depicts the forward section as being articulated to be arched up in usage to slope the Post Socket upwardly and rearwardly but then swung downwardly to a more horizontal position for convenient storage (angling the post). And the Retractable Scooter Wheels 1139 fold up close allowing storage as seen in FIG. 58B—B. It is possible to roll the Scooter on one retracted wheel when in its storage configuration.

The Scooter Steering Assembly 1129 is designed to mount securely on the Scooter Base 1131. It may however be detached if desired.

The Scooter Auxiliary Battery compartment 1141 is designed to hold an auxiliary battery, one larger and with a longer duration of power than the batteries used to move a trailer which does not need a long period of power since the moving of a trailer is something that is done generally only once or twice a day and takes up no more than 15 minutes. A scooter on the other hand may need batteries to work for several hours, hence a place to store the larger batteries.

FIGS. 60 and 61 illustrate the geometry of the steering of the Scooter 1043 and will be explained in the following OPERATION section.

Operation of The Second Embodiment

The operation of Tug T-2 is much that same as T-1. It uses the same means of attaching to the trailer tongue, the Coupling Assembly 58, and the steps taken in connecting are much the same. The Tug T-2 is removed from its place of storage and rolled to the trailer. It may be rolled there under power or in the Free-wheeling mode by rotating the two Free-wheeling Control Arms 1037 at the front lower corners of the Chassis 1003. Connection is made by lowering the Coupling Post 62 into the Post Socket 1007 and pinning it. The steps in removing supports from under the trailer preparatory to moving are the same as with T-1. (Note: there is no version of Tug T-2 that incorporates a jack into the Post Socket 1007, but one will be designed as an addition to the application.) However, since Tug T-2 is designed primarily for smaller trailers, it would be possible in most cases with some users that they can simply lift the tongue off the stands themselves.

With the power switch turned to "ON" one gets underway by pressing either Forward Lever 1019 or Reverse Lever 1021. Steering is done by simply swinging the Steering Handle 1015 to the left or the right.

As with T-1, the user may also use either 120V AC or 12V DC as an alternative power source in emergencies. The input receptacles, AC 1119 and DC 1121 are located directly below the edge of the Control Panel on the rear face of the Tiller 1005. A battery charger is built into the Tug in the upper of the three compartments in the Tiller 1005.

The Tiller 1005 may be locked in any angle relative to the Chassis 1003 or to the ground by means of Tiller Angle Locking Cam 1063 (FIG. 44). Turning it to "LOCK" drops the Tiller Angle Locking Pin 1061 into one of several holes in the Tiller Hub 1055 which is rigidly connected to the side of the Chassis 1003. First, the Tiller Angle Locking Cam 1063 is rotated toward the "LOCK" position until a resistance is felt. Then the wheel on that side is grasped and rocked forward or back slightly while keeping pressure on the Locking Cam until the Tiller Angle Locking Pin 1061 drops in and the Tiller Angle Locking Cam 1063 rotates all the way to the bottom. Then the other wheel is done the same way. Since there is a differential, both wheels may be rotated independently while on the ground when the tug is in FW mode.

Tiller disconnect is accomplished by simply unplugging the Control Cable 1041 and then lifting both Tiller Disconnect Levers 1035 and with them the upper part of the Tiller will rise and separate from the Positioning Lugs 1049 and the Locking Points 1051.

Removing the Chassis Cover 1045 is done by lifting the edge of the Cover from where it has been engaged with the top of the forward wall of the Post Socket Saddle 1071. Then the front part of the Cover 1045 is swung forward and then down, rotating at the Chassis Cover Hinge 1085 and it will drop to the ground and the rear part of Chassis Cover 1045 will droop. Then the cover is lifted free of its engagement with the rear wall of the Post Socket Saddle 1071 in the same manner and then pulled away and out from under the Chassis 1003. There are no screws or fastening devices needed.

Tug T-2 is very simple in construction. The Chassis 1003 is made of two Chassis Frame Plates 1047, each identical but for the countersunk holes for the Motor Frame Pivot Pin 1087. (The holes could be countersunk on both sides.) The plates are held together by two steel Chassis Frame Connectors 1083U and 1083L at the front upper and lower edges, and by the Post Socket Saddle 1071. All of these are welded connections.

Referring to FIG. 46, the Motor, a 24-Volt DC reversible variable speed motor drives the Tug. Its shaft drives Worm 1077 which drives Worm Gear 1081 which is mounted on the Differential 1011 at its center point between the shaft ends. The Differential 1011 is a "pinned" version and is similar to those used to drive go-carts. While some differentials incorporate a hypoid gear inside a housing to rotate the spider assembly, this version simply rotates the differential housing itself and the spider with it.

The motor 1009 is mounted in Motor Frame 1075. The Frame is pivoted at its top and swings from it. The clearance between the Motor Frame and the Chassis side Frame Plates is minimal. A lubricating grease should be applied to facilitate the movement of swinging the Frame. Referring to FIG. 45, the Worm 1077 has Thrust Bearings 1157 above and below, held in place by the cross members of the Motor Frame. The Worm is held against the Worm Gear by the Engagement Cams 1089 at each side which bear on the Motor Frame. The Engagement Cams are designed to bring the Worm completely against the Worm Gear with no clearance and then as they rotate past that point they allow the Worm to back out the very small distance required as clearance. This way, the Cams are prevented from slipping out of place. When the Engagement Cam Control Shaft is turned up and over the top and forward, the Cams rotate and allow the Motor Frame to swing down and clear the Worm from the Worm Gear. Gravity and the slight friction between the Motor Frame and the Chassis Frame holds it in the disengaged position.

FIGS. 54, 55, 38, 39, 63, 67 and 71 shows the transformation from trailer tug to scooter. Starting at the top left figure, the Control Assembly 1013 has been rotated to line up the arms with the Tiller. Then the Tiller Angle Lock 1033 has been released to allow the Tiller to assume a vertical position. It will be necessary to provide some form of wheel blocking to keep the Tug upright during this procedure. Next, the Control Cable 1041 is unplugged and the Tiller Disconnect Levers 1035 are lifted and the Tiller is lifted free of the Tug. This leaves the Tug with the Tiller Bases 1069 pointing straight up.

Next the Tiller Angle Locking Cam 1063 is activated to allow the Chassis to be rotated back to an angle that will be marked on the side of the chassis and the locking cam is then turned to lock the angle in. Future testing will show whether the Tug can simply be tilted back, while leaving the Tiller Bases as is. Without building a model, it appears that this may be possible.

Next the Scooter Base 1131 is brought to the Tug and the Scooter Steering Assembly is positioned so that its post is able to slide down into the Post Socket 1007. The user will soon become adept at making sure the Keys on each side of the Assembly post are pointing in the right direction to mate with the key ways in the Post Socket.

Once the post of the Steering Assembly is firmly in place, the blocking under the Chassis may be removed. Then the Tiller is brought into contact with the Positioning Lugs on the Steering assembly. These Lugs and the Locking Point on the Steering Assembly are identical with those on the Tiller Bases. Next the Tiller Disconnect Levers 1035 are snapped down, locking the Tiller to the Scooter. At this point the steering function of the Tiller has transformed so that rather than the Tiller being swung from left to right as shown in FIG. 60A by the Steering Handles to turn the wheels, the Steering Handles are moved as if they are spokes of an imaginary steering wheel as shown in FIGS. 60 and 61 rotating about the centerline of the Tiller. They and the Tiller are rotated about the vertical axis of the Socket and Post. This turning of the Tiller acts through the gimbal of the Post socket 1007 much as a steering assembly on many devices with steering wheels.

It can be seen that when the Tug is in use as a trailer moving device, the Coupling Post 62 is free to rotate inside the Post Socket, but when the tug is used as a scooter, the coupling post that comprises part of the Scooter Steering Assembly does not rotate in the Socket but rotates the socket itself by the holding action of the Steering Assembly Keys and the Key Ways in the Socket.

At this point, the Tiller no longer may be moved upward or downward. However, now the Control Assembly Angle Adjustment Buttons come into play to set the Steering Handle at any desired angle suitable to the user. This last adjustment is shown in the final figure at the lower left.

FIGS. 60 and 61 illustrate the geometry of the Scooter steering. FIG. 60A shows the way the Tiller works on the Tug when moving trailers. FIG. 60 shows how it works on the scooter. It becomes obvious now that by tipping the Tug Chassis rearward when converting, it empowers it to work as a universal joint for steering. Were there no such universal joint action, the Tiller would have to be in the vertical position in order to steer the Scooter. In that position it would be too high and too far forward to practically function.

Without going into the details, the inventor has taken great care to design this within the parameters dictated by the spacing of the Tug wheels, their diameter, and the geometry of the human body. In a normal three-wheeled scooter as used by the disabled, steering is simple because the front wheel is small and the tiller may be configured for its sole purpose. With only one wheel, the user can place his feet astride the wheel at a level below the axle, but with two larger wheels the user must have his feet much farther apart or else above the wheels. Manipulating the components has resulted in a workable compromise that allows both comfort and functionality.

FIG. 61 illustrates how the steering works. However, the diagram is not to scale and makes it appear that the spacing between the Tiller Bases 1069 and the version of them on the Scooter Steering Assembly is different. But the spacing is the same on the actual equipment. The width between the Tiller bases is approximately five inches, thus allowing the user's feet to straddle the Tiller even when it is turning.

It will be appreciated that the Solar Panel 1025 mounted on the front of the Tiller provides for a cost-free way to recharge the batteries. Bearing in mind that the use of the Tug to move a trailer is of short duration, it is entirely possible that under favorable circumstances of sunny days, a person could use the Tug every day at various camp sites or other places and never need to use a source of AC or DC current to recharge the batteries.

The Control Panel 1023 is mounted at the end of the Tiller and mounts a charge rate indicator and a battery condition meter. Additionally, there are an overload reset button and two large trailer Brakes buttons for use if the trailer being moved has electric brakes. And there are an on/off switch and a speed range selector. A jack is provided on the underside of the Tiller where the Control Cable exits, for connection to the brakes wiring from the trailer. There are two Trailer Brakes buttons, one on each side so that whichever hand the operator is using to control the speed and direction there will be a quickly reached button for the other hand. There is also an ignition type key lock for security.

The modification shown in FIG. 62 is similar to the Tug construction shown in FIG. 48 except that it incorporates a differential with journals projecting about 1½ inches at each axle. As an example, the worm gear 1081' may drive through a differential, 1011' to act through axle journal 1101" configured with a retainer groove for receipt of a retainer clip 1149" to hold a roller bearing assembly 1057' in position. The tiller hub 1055' is received on the bearing assembly and is connected with the chassis frame plate 1047' by respective connectors 1103'. Tiller selector bores 1059' are provided for selective receipt of a tiller locking pin 1061'. This arrangement can be beneficial because differentials without journals are more expensive and exhibit less strength. Also, with this construction, the differential is exposed to lower internal vertical loads. The structure of the tiller above the tiller bases will be in the form of a simple box formed of bent steel.

THIRD EMBODIMENT OF THE INVENTION
Description and Operation

This third embodiment, while similar to the first embodiment, has gained in functionality as a result of the prior work done in perfecting the entire concept, that of a dolly powered by batteries.

It may not have been as well integrated had it been set as the final design in the first months, while this version (Tug T-3) incorporates those refinements put into Tugs 1 and 2 and is therefore a better Tug.

Referring now to FIG. 64, it can be seen that Tug T-3 2056 comprises a Post Socket 2002, gimbaled, as in embodiments 1 & 2, carried in a Saddle 2004 supported by Saddle Support 2006, all carried on an Axle 2054.

Also supported by Axle 2054, a Tiller 2010, comprising Tiller Housing 2012, an extended box structure which also envelopes the axle and attached components. At the distal end of Tiller 2010 is an arrangement of components to receive and hold steady in connection to Motor Shaft 2038, (FIG. 67) a cordless drill of contemporary design, serving as the motor power for the Tug T-3 2056.

Interior to Tiller Housing 2012, is a Differential 2030, upon which is axially mounted Worm Gear 2008, held to Differential 2030 in the same manner as in Tug T-2. Worm 2026 is held against Worm Gear 2008 by Bracket 2060 incorporating thrust bearings.

Worm Shaft 2028, a round shaft, extends at an angle upward interior to Tiller 2010 to a point about mid way (FIGS. 65 & 66) where is mounted a Bearing 2062 and a Flex Joint 2032. Connected to Flex Joint 2032 and continuing upward, is Motor Shaft Receiver Sleeve 2034, a square shaft with a square internal bore, and holding Motor Shaft Lock Screw 2036 which secures Motor Shaft 2038, a square shaft, in any desired longitudinal position within the bore of Motor Shaft Receiver Sleeve 2034. Tiller Housing 2012 has, on each side, a Shaft Lock Access Hole 2022 at the point where the Motor Shaft Lock Screw 2036 may be accessed by wrench or screwdriver. It may be seen that this arrangement permits variations in size and shape of drills used as the motor for the Tug.

Motor Shaft 2038 extends upward to the area where the cordless drill is mounted. While Motor Shaft 2038 is a square shaft, its distal end is shaped to a hexagon to fit in a drill chuck. (FIG. 68)

FIG. 70 is an end-on view of Tiller 2010. It may be seen here how a cordless drill is mounted in the Tiller 2010. Two sets of clamps hold the drill body after the drill chuck is secured to Motor Shaft 2038. Each clamp incorporates a Clamp Pad 2040. The upper set, (Grip/Clamp 2014) holds the drill body in place by the action of tightening the Grip part of the Grip/Clamp.

The lower set, Clamp 2016, similarly holds the handle portion of the drill.

It can be seen that the Pads 2040 are slightly compressible in order to conform to the contours of the drill.

As can be seen, the Clamps 2016, holding the drill handle, are screwed tight by means of a knob with a fin. (FIG. 69) while the upper Grip/Clamps 2014 are screwed tight against the drill by turning the Grip part of the Grip/Clamp 2014. The grips, it should be evident, serve as the "handle bar" of the Tiller 2010.

A simple locking device could be incorporated into this set of Grip/Clamps 2014 to prevent the user from loosening the hold on the drill by inadvertently twisting the grip while in use. Such a locking device could be a simple round nut with an extended handle to snug it against the Tiller Housing 2012.

FIGS. 65, 69, 73 & 74 show how the Trigger Assembly 2020 works to tighten or release the trigger on the drill and therefore increase or decrease the speed of the Tug while in use. It can be seen that both Trigger Assemblies 2020 are vertical bars which pivot about a point low on the side of the Tiller Housing 2012. These vertical bars are bent at the top to form Trigger 2046. (Not to be confused with the trigger of the drill.) They are so named because they perform as an extension to the drill trigger. Each Trigger 2046 occupies the area immediately in front of the grip part of the Grip/Clamp 2014, for easy access by the index finger of the user. Each Trigger 2046, the left or the right, performs the same function. That is to move the Trigger Bar 2044 back into the drill to start it or increase its speed. (FIGS. 65, 74) This design effects smoother small movements of the drill trigger than are possible by squeezing the drill trigger by the finger, thereby allowing greater control of the Tug in tight situations. It can be seen in FIGS. 65 & 69 that the Trigger Bar 2044 is moved up and down in the slots in the arms of Trigger Assembly 2020 so that it may be fit to the trigger of the particular drill being used and is then held in place by the Trigger Bar Lock Screw 2042.

In its very first use, the Tiller Housing 2012 is placed in a stable position and the Access Door 2018 is opened. The drill is moved into the Tiller Housing 2012 and eased forward to contact against the Trigger Bar. The Bar is moved up or down as needed. Making sure the Motor Shaft Lock Screw 2036 is loose, the chuck is positioned on Motor Shaft 2038 and the chuck is tightened. Before the Shaft Lock Screw 2036 is tightened, and the Trigger Bar Lock Screw is tightened, the drill (now chucked on the shaft) is moved so that it is in satisfactory contact with the Pads 2040 in the areas needed, i.e., the body of the drill on the pads of Grip/Clamp 2014 and the handle of the drill on the pads of Clamp 2016. Then the Grip/Clamps 2014 and the Clamps 2016 are tightened, so that the drill is preferably centered in the Tiller Housing 2012. Then the Motor Shaft Lock Screw 2036 is tightened, the Trigger Bar Lock Screws are tightened and the Access Door 2018 is snapped closed. If, while making all the adjustments, the user has left the drill in the unlocked mode so that squeezing the trigger turns it on, then the positioning of the Trigger Bar will have been set properly. If the drill was locked when making the adjustments then it should be unlocked so that it can be tested before connecting the Tug to a trailer.

The first time the Tug is mated with the drill that will serve as its motor will take a few minutes to properly position all the parts. But once that is done, every other use is made simple if, when removing the drill for another purpose the Clamp 2016 and the Grip/Clamp 2014 are loosened on one side only and Pads on the other side are left in place. Locking devices on the Clamps would serve to assure that the setting is maintained even when a drill is not there. Once the length of the Motor Shaft 2038 has been adjusted, and the Trigger Assembly 2020 has been adjusted, it does not have to be done again as long as the same drill is used.

Therefore, once the drill is out, all the user has to do to reinstall it is to place it back on the Motor Shaft 2039, tighten the chuck, and then position it on the pads which were left tight and tighten down the pads on the other side which were loosened. Then the Access Door 2019 is closed and the device is ready to use. This will take no more than ten or fifteen seconds.

It will be appreciated that a hole in the top of the Tiller Housing 2012 allows the user to change the speed range of the drill. The inventor has found in his tests that it will never be necessary to use the high speed range of the drill.

Most drills have the forward/reverse selector on the side as shown in FIG. 65. The user simply reaches in and pushes the selector to change the direction of rotation.

In practice, the Tug will include an extension for operation of the forward/reverse selector from outside of the Tiller Housing 2012.

Looking at FIGS. 65, 69, & 74 it can be seen that there is a small projection on the Access Door 2018 that engages a punched and shaped catch on the sides of the Tiller Housing 2012. These serve to lock the Access Door 2018 closed, and also strengthen the Tiller Housing 2012 to prevent sideways deflection created by the force of the clamps against the drill. The more the clamps are tightened, the more the Door 2018 is secured. Firmly pressing the sides together at the point of the projection will allow the door to open.

FIGS. 65 & 72 reveal the design of the drive train and the Tiller 2010 attachment, and also the operation of the Post Socket Saddle 2004.

FIG. 72 reveals how the sides of the Tiller Housing 2012 are mounted on the Journals 2048 of the Differential 2030. In the description of Tug T-2 it was stated in the addendum that using a differential with lateral journals would make it possible for these journals to act as the pivot points for the tiller bases and the chassis. That has been done in this embodiment. The journals are made so their sides are parallel to the Axle 2054 or the Sleeves 2050 may be manufactured to fit a tapered journal. Journal Exterior Bearing Sleeve 2050 is made of casehardened steel and is sweated onto the journal, or fitted with very small clearance and held in place by a Spacer 2064 which also positions the wheel on the axle relative to the chassis. The sides of the Tiller Housing 2012 are fitted to the Journal Exterior Bearing Sleeve 2050 and held in place by Journal Spacers 2064. Similarly, the Saddle Supports 2006 are fitted and held in place by spacers. While such a bearing arrangement may not be suitable for devices requiring high revolutions and speeds, this is not a requirement for the purpose of a Tug.

FIGS. 65, 66 & 74 show an Angle Locking Device 2058 attached to the top of the Tiller Housing 2012. Said device consists of a sliding rod which fits into any one of several Angle Locking Holes 2066 in the Saddle Support 2006 to hold the Saddle Support 2006 and the Tiller 2010 in a fixed relationship at any desired angle. FIG. 72 reveals one of the two Socket Stabilizing Springs 2052 which function the same as those in Tugs T-1 and T-2.

It should be noted that the Worm 2026 is a 2-lead worm and therefore prevents any back drive, or unwanted movement of the Tug. It therefore acts as a brake. In practice, this embodiment will also incorporate the Free-wheeling feature described above. It will be appreciated that the weight of the Tug itself is light to be easily lifted and carried.

FOURTH EMBODIMENT OF THE INVENTION
Description and Operation

FIGS. 75–79 reveal Embodiment 4 (Tug T-4) of this invention, reflecting the original concept but with a few improvements.

Clearly, this embodiment is designed for the smaller trailer. Because it has but one wheel and few moving parts, it is inexpensive, light weight, and very easy to store. It uses as its motor a cordless drill.

Embodiment 4 differs from Embodiment 3, (Tug T-3) in that it has but one wheel and therefore does not need a differential, incorporates a smaller radius tire, a saddle which has no sides, nor any gimbal action to the Socket.

The advancement over prior art is the use of batteries, a tiller which is free to be set at any desired angle, and a worm gear rather than chain and sprocket. And of course, a lighter weight by far.

This embodiment uses a smaller worm gear than that used in Tug T-3, and has a smaller reduction ratio. The worm gear in embodiment 2 and 3 was six inches in diameter and had 60 teeth where this version has a worm gear of five inches diameter and has 40 teeth.

However the means of mounting the cordless drill is the same as those means in Tug T-3 as are the shaft arrangements with the exception that in this version there are two flexible joints rather than only one.

The shafts 3016, 3022, and 3032 are all secured in the Tiller Housing 3036. Worm Shaft 3016 is held in place by Bracket 3014 and Worm Shaft Bearing/Bracket 3018, intermediate Shaft 3022 is fixed in place by Worm Shaft Bearing/Bracket 3018 and intermediate Shaft Bearing/Bracket 3024, and Motor Shaft 3032 is free to move in an are about Upper Flex Joint 3026 unless it is chucked up in the drill.

Referring to FIGS. 76, 78, & 79, the Worm Gear 3038 and the Wheel 3008 are firmly connected to Axle 3006 by means of a keyed shaft. Both the Saddle Support 3040 and the Tiller Housing 3036 rotate about the shaft. To fix the angle of the Tiller Housing 3036 relative to the Saddle Support 3040, a series of Tiller Angle Lockpin Holes 3046 are located on both sides of the Tiller Housing 3036. Tiller Angle Lockpin 3044 is mounted in the Saddle Supports 3040 and is a spring loaded pin which is pulled out to set the angle and then released. It is not possible to make the Tiller Housing 3036 be free of the Saddle Supports 3040. It must be locked in one of the possible positions. It is not necessary to roll the Tug T-4. It is light enough to be carried, even by a child.

It should be noted that FIGS. 75 and 79 show the Tiller Housing 3036 to be considerably longer than it actually is. This was done for purposes of clarity and ease of understanding. The length of Tiller Housing 3036 shown in FIGS. 75 and 79 is approximately 135% of actual length. Operation is substantially the same as that for the previous embodiment.

From the foregoing, it will be appreciated that the present invention is compact, lightweight, maneuverable and highly adaptable. The Tug is low-profile for fitting under a relatively low elevation tongue, affords a high degree of strength and power, but can be controlled by numerous different styles of control mechanisms and is highly reliable in operation.

Attached hereto and incorporated herein as part of this application is the Drawing Reference Numeral List set forth on Pages 80–85 for ease of reference.

DRAWING REFERENCE NUMERAL LIST

50 Tug
52 Chassis
54 Housing
56 Transport Handle
58 Coupling Assembly
60 Trailer Tongue
62 Coupling Post
63 Coupling Post Storage Cradle
64 Joystick Control
64A Joystick Control R/F Operated
66 trailer
68 Transport Handle Clips
70 Transport Handle Socket
72 trailer jack
74 Post Holes
76 Coupling Post Receiver Sleeve
78 Coupling Post Socket (Standard)
80 Post Socket Base Bearing
82 Post Sleeve Holes
84 Coupling Pin
85 Detent Ball
86 Joystick Control Connector
88 Joystick Control Connector Receptacle
90 R/F Joystick Control Receiver Module
92 Coupling Assembly Attachment Plate
93 Buttress
94 Coupling Assembly Bolt Holes
96 Coupling Assembly Mounting Bolts
98 Backup Plate
100 Lock Nuts
102 Joystick
104 Control Cable
106 Trailer Brake Button
108 On/off and Speed Range Selector
110 Battery Charge Status Indicator
111 Transport Handle Adjusting Ring
112 Threaded Casting on Transport Handle
1114L&R Tug Lifting Handles
115–199 Unused
200L&R Wheel Spindles
202L&R Longitudinal T-plates
204 Interior Bearing Support Sleeve 206 Chassis Base Plate
210 Routing Holes
212 F&R Battery Connector Hole
214 Socket Journal Hole
216 Longitudinal Pivot Pin
218 Longitudinal Journal
220 Journal Bore
222 Centering Springs
224 F&R Motor Compartment Floor Plates
226 Jack Cylinder
228 Hydraulic Fluid Passage
230 Hydraulic Nipple Fitting (Jack Cylinder)
232 Hydraulic Line
234 Reservoir and Hydraulic Pump Assembly
236 Post Socket, Hydraulic Jack Version
238 Post Socket Well
240 Reservoir
242 Pump with Lever
244 Pressure Relief Valve Actuator
246 L&R Motor Mounting Plates
248 L&R Drive Sprockets
250 Free-wheeling (FW) Spacer Sleeves
252/8 FW Holes (8)
254 F&R Battery Compartment Doors
256 F&R Battery Compartment Door Hinges
258 F&R Battery Compartment Door Locks
260 Battery Door Lock Strike Slots
261–299 Unused
300 L&R Motor
302 L&R Gearhead
304 L&R Motor Support Bracket
306 L&R Sprocket Pinion
308 L&R Idler Sprockets
310 L&R Drive Chain
312 L&R Gearhead Mounting Holes
314 L&R Drive Shaft Holes
316 L&R Idler Sprocket Shaft Holes
318 Upper Deck
320 Lower Deck
400 Battery Charging Module & Voltage Converter
402 Battery Charging Control Panel
404 Main Control Panel
406 Charger Inhibitor Receptacle
408 Electric Brakes Jack
410 Circuit Reset Button
412 A/C Input Connector
414 Unused
416 A/C Input Connector for Charging
418 D/C Input Connector
420 Battery Charging Rate Meter
422 F&R Battery Pack
424 Battery Pack Handle
426 Battery Pack Connector
428 L&R Battery Compartment
430 Joystick Control Module
431–499 Unused
500 L&R Free-wheeling Assembly
501 L&R Tires
502 L&R Wheels
504 L&R Rim, Wheel
506 L&R Web, Wheel
508 L&R Hub, Wheel
510 L&R Bearings, Wheel
512 L&R Washer, Wheel
514 L&R Retainer Clip, Wheel
516 L&R Bushing, Sprocket
518 L&R FW Clutch Flange
520 L&R FW Clutch Pin Bracket
522 L&R FW Clutch Pin Hole
524 L&R FW Clutch Pin
526 L&R Outer Detent Ball
526A L&R Inner Detent Ball
528 L&R Clutch Pin Snap Ring
530 L&R Clutch Pin Snap Ring Groove
532 L&R Clutch Pin D-ring
534 L&R Clutch D-ring Holes
536 Multiple Weld Fillets on Clutch Flange
537–599 Unused
600 Accessory Carrier
602 Carrier Frame
604 Carrier Wheels
606 Carrier Tongue
608 Carrier Post Sleeve
610 Control Bracket Sleeve
612 Control Bracket
614 Seat Column Flange
616 Seat Column
618 Single Seat
620 Tandem Seat
622 Stake Wagon Frame
623–1000 Unused
1001 Tug
1003 Chassis
1005 Tiller
1007 Post Socket
1009 Motor
1011 Differential
1011' Differential—Modification
1013 Control Assembly
1015 Steering Handle
1017 Grips
1019 Forward Lever
1021 Reverse Lever
1023 Control Panel
1025 Solar Recharging Panel
1027 Control Assembly Angle Adjustment Button
1029 Steering Handle Rotation Button
1031 Receptacle
1033 Tiller Angle Lock
1035 Tiller Disconnect Lever
1037 Free-wheeling (FW) Control Arm
1039 Scooter Steering Assembly Keyway
1041 Control Cable
1043 Scooter
1045 Chassis Cover
1047 Chassis Frame Plate
1047' Chassis Frame Plate—Modification
1049 Positioning Lug
1051 Locking Point
1053 Post Socket Pivot
1055 Tiller Hub
1055' Tiller Hub—Modification
1057 Tiller Bearing
1057' Tiller Bearing—Modification
1059 Tiller Angle Selection Holes
1059' Tiller Angle Selection Holes—Modification
1061 Tiller Angle Locking Pin
1061' Tiller Angle Locking Pin—Modification
1063 Tiller Angle Locking Cam
1065 Locking Cam Retainer Ring
1067 Tiller Locking Cam Cavity
1069 Tiller Base
1069' Tiller Base—Modification
1071 Post Socket Saddle 1073 Free-wheeling Control Shaft
1075 Motor Frame
1077 Worm
1079 Thrust Bearings
1081 Worm Gear
1081' Worm Gear—Modification
1083U Chassis Frame Connector, Upper
1083L Chassis Frame Connector, Lower
1085 Chassis Cover Hinge
1087 Motor Frame Pivot Pin
1089 Engagement Cam
1091 Engagement Cam Control Shaft
1093 Motor Mount Holes
1095 Drive Shaft Holes
1097 Pivot Holes
1101 Axle
1101' Axle—Modification
1101" Differential Axle Journal—Modification
1103 Hub-to-frame Connectors
1103' Hub-to-frame Connectors—Modification
1105 Post Socket Spring
1107 Worm Gear-to-differential Flange
1109 Hub-to-frame Connector Holes
1111 Free-wheeling Selector Assembly
1113 Unused
1115 Tiller Disconnect Rod
1117 Tiller Locking Claws
1119 AC Input Receptacle
1121 DC Input Receptacle
1123 Controls and Electronics Access
1125 Battery Compartment
1127 Retainer Flange and Locking Groove
1127' Retainer Flange and Locking Groove—Modification
1129 Scooter Steering Assembly
1131 Scooter Base
1133 Scooter Seat (Folding)
1135 Scooter Seat Frame (Folding)
1137 Scooter Basket
1139 Retractable Scooter Wheels
1141 Scooter Auxiliary Battery Compartment
1143 Scooter Storage Compartment
1145 Scooter Steering Assembly Key
1147 Retractable Wheel Strut Well
1149 Wheel Retainer Clip
1149' Wheel Retainer Clip—Modification
1151 Wheel-axle Key
1152–2000 Unused
2002 Post Socket
2004 Saddle
2006 Saddle Support
2008 Worm Gear
2010 Tiller
2012 Tiller Housing
2014 Grip/Clamp
2016 Clamp
2018 Access Door
2020 Trigger Assembly
2022 Shaft Lock Access Hole
2024 Wheel
2026 Worm
2028 Worm Shaft
2030 Differential
2032 Flex Joint
2034 Motor Shaft Receiver Sleeve
2036 Motor Shaft Lock Screw
2038 Motor Shaft
2040 Clamp Pads
2042 Trigger Bar Lock Screw
2044 Trigger Bar
2046 Trigger
2048 Differential Journal
2050 Journal Exterior Bearing Sleeve
2052 Socket Stabilizing Spring
2054 Axle
2056 Tug T-3
2058 Angle Locking Device
2060 Worm Brackets
2062 Worm Shaft Bearing
2064 Journal Spacer
2066 Angle Locking Holes
2067–3001 Unused
3002 Socket
3004 Saddle
3006 Axle
3008 Wheel
3010 Worm
3012 Thrust Bearing
3014 Bracket
3016 Worm Shaft
3018 Worm Shaft Bearing/Bracket
3020 Lower Flex Joint
3022 Intermediate Shaft
3024 Intermediate Shaft Bearing/Bracket
3026 Upper Flex Joint
3028 Motor Shaft Adjustment Sleeve
3030 Adjustment Lock Screw
3032 Motor Shaft
3034 Tiller Housing
3036 Worm Gear
3038 Saddle Support
3040 Unused
3042 Tiller Angle Lockpin
3046 Tiller Angle Lockpin Holes
304

What is claimed is:

1. A light weight battery powered steerable tug apparatus for carrying a cantilevered tongue of a towable vehicle and comprising:
   a wheel assembly having a transverse axis and a pair of laterally spaced apart wheels;
   a chassis suspended from said wheel assembly;
   a coupling post socket mounted centrally in the vertical plane of said axis on said chassis for supporting said tongue;
   at least one battery on said chassis;
   a charger mounted on said chassis for charging said battery;
   at least one direct current motor device on said chassis;
   a drive train coupling said motor device to said wheel assembly; and
   a control device coupled with said drive train for selectively controlling rotation of said wheels whereby said tug may be positioned under said tongue, the weight of said tongue transferred to said post socket, and said control device actuated to drive said motor and selectively drive one or both of said wheels to steer said tongue about.

2. The lightweight battery powered steerable tug apparatus set forth in claim 1 that includes:
   a post for selective receipt in said post socket.

3. The lightweight battery powered steerable tug apparatus as set forth in claim 1 that includes:
   clutches interposed between said drive train and said wheels; and selectively disengageable for free-wheeling of said wheels.

4. The lightweight battery powered steerable tug apparatus set forth in claim 1 that includes:
a charger mounted on said chassis for charging said battery.

5. The lightweight battery powered steerable tug apparatus set forth in claim 1 wherein:
said control device includes a joystick for controlling rotation of said wheels.

6. The lightweight battery powered steerable tug apparatus set forth in claim 1 that includes:
a pivot pin mounted on said chassis and projecting perpendicular to the axis of said wheels; and
said post socket mounted for rotation on said pivot pin.

7. A lightweight battery powered steerable tug apparatus set forth in claim 1 wherein:
said motor device includes at least one electric motor operable at between 2,700–20,000 RPM; and
said drive train includes a speed reduction device to reduce the speed of rotation of said wheels to substantially no more than 0.6 miles per hour for said wheels.

8. The lightweight battery powered steerable tug apparatus set forth in claim 1 wherein:
said wheel assembly includes a pair of spindles mounted on said wheels and that includes;
a pair of clutch sprockets mounted in free-wheeling relationship on the respective said spindles adjacent to respective said wheels; and
clutch devices for selectively engaging said sprockets with said wheels.

9. The lightweight battery powered steerable tug apparatus set forth in claim 1 that includes:
a coupling assembly for mounting on said tongue and including a sleeve; and
a post for selective receipt through said sleeve and into said post socket.

10. The lightweight battery powered steerable tug apparatus set forth in claim 1 that includes:
a post for connection with said tongue and adapted to be received in said socket to cooperate in maintaining said tug erect.

11. A lightweight battery powered steerable tug apparatus set forth in claim 1 for use with a trailer having said tongue disposed at a predetermined height and wherein:
said chassis is configured to be received under said tongue; and
said control device includes electronic controls for selectively rotating said wheels in the same or opposite directions independent of a handle.

12. The lightweight battery powered steerable tug apparatus set forth in claim 1 that includes:
lifting handles on said chassis.

13. The lightweight battery powered steerable tug apparatus set forth in claim 1 wherein:
said control device is operative to selectively rotate said wheels in the same or opposite directions.

14. The lightweight battery powered steerable tug as set forth in claim 1 wherein:
said control device includes a radio transmitter and receiver.

15. A lightweight battery powerable steerable tug apparatus as set forth in claim 1 for use with a vehicle having said tongue at a predetermined height and including:

a coupling for mounting on said tongue and including a through sleeve having a bottom end disposed, when said tongue at said predetermined height, at an elevation to clear the top end of said tongue post socket; and
a coupling post slidably received through said sleeve into said socket.

16. A lightweight battery powerable steerable tug apparatus as set forth in claim 1 wherein:
said wheel assembly includes no more than two wheels; and
said chassis is configured to normally ride in an upright position from said wheel assembly.

17. A lightweight battery powered steerable tug apparatus set forth in claim 1 wherein:
said controlled device is operative to control the direction of rotation of said wheel for manuvering of said tug.

18. A lightweight battery powered steerable tug apparatus as set forth in claim 1 wherein:
said drive train includes a decoupling device for decoupling said wheel assembly to free said wheels for free wheeling thereof; and
an elongated handle device having a rigid stem coupled on one end with the chassis and formed on the other end with a hand grasp.

19. A lightweight battery powerable steerable tug apparatus as set forth in claim 1 that includes:
a jack post in the socket for selective extension thereof to selectively raise the said tongue; and
a hydraulic pump interposed between the jack post and socket.

20. The tug apparatus of claim 1 that includes:
a carrier cantileverly mounted on a pair of wheels and formed at the forward extremity with said tongue projecting forwardly and mounting a vertically oriented mounting sleeve;
a post for fitting through said mounting sleeve to engage said socket on the lower extremities to carry said tongue from said socket.

21. The tug apparatus of claim 20 wherein:
said carrier includes a seat mounted thereon for seating of a passenger; and
said control means includes a control panel for manipulation by an operating on sitting on said seat.

22. The tug apparatus of claim 20 wherein:
said carrier includes a wagon rack mounted thereon.

23. The tug apparatus of claim 20 wherein:
said drive chain is operative in response to selective electrical signals to drive the wheels in forward, reverse or opposite directions; and
the control further includes a control panel having manually actuable control elements operable to communicate said electrical signals and said control.

24. A compact trailer tug for carrying the cantilevered tongue of a trailer and comprising:
a wheel assembly including laterally spaced wheels;
a chassis mounted on said wheels;
a post socket mounted on said chassis and arranged to, when weight is applied thereto, maintain said chassis in an upright position carried on said wheels;
a gimbal interposed between said chassis and said post socket;
a drive chain coupled on one end with said wheels and including on the opposite end a coupling for connection with a motor;

a support post for mounting in said socket means; and control means coupled with said drive train for selectively controlling rotation of said wheels.

25. A light weight battery powered steerable tug for carrying a cantilevered tongue of a towable vehicle and comprising:

a wheel assembly having a transverse axis and a pair of laterally spaced apart wheels;

a chassis suspended from said wheel assembly;

a pivot pin mounted on said chassis and projecting perpendicular to the axis of said wheels;

a coupling post socket mounted centrally in the vertical plane of said axis on said pivot pin for supporting said tongue;

at least one battery on said chassis;

at least one direct current motor device on said chassis;

a drive train coupling said motor device to said wheel assembly; and a control device coupled with said drive train for selectively controlling rotation of said wheels whereby said tug may be positioned under said tongue, the weight of said tongue transferred to said post socket, and said control device actuated to drive said motor to selectively drive one or both of said wheels to steer said tongue about.

26. The lightweight battery powered steerable tug apparatus set forth in claim 25 wherein:

said sprockets and wheels are formed with alignable bores; and such clutch devices include pins for selective receipt in the respective said bores.

27. The lightweight battery powered steerable tug apparatus set forth in claim 26 wherein:

said pins are formed with respective heads and include D-rings constructed of spring steel; and mounted to the respective said heads and constructed such that release thereof tends to shift said D-rings to their respective retracted positions.

28. A light weight battery powered steerable tug for carrying a cantilevered tongue of a towable vehicle and comprising:

a wheel assembly having a transverse axis;

a pair of laterally spaced apart wheels;

a chassis suspended from said wheel assembly;

a tongue post socket mounted centrally in the vertical plane of said axis on said chassis for supporting said tongue;

at least one battery on said chassis;

at least one direct current motor device on said chassis;

a drive train coupling said motor device to said wheel assembly; and a control device coupled with said drive train for selectively controlling rotation of said wheels whereby said tug may be positioned under said tongue, the weight of said tongue transferred to said post socket, and said control device actuated to drive said motor and selectively drive one or both of said wheels to steer said tongue about;

said wheel assembly includes a pair of spindles mounted on said wheels and that includes;

a pair of clutch sprockets mounted in free-wheeling relationship on the respective said spindles adjacent to respective said wheels; and clutch devices for selectively engaging said sprockets with said wheels.

29. A light weight battery powered steerable tug for carrying a cantilevered tongue of a towable vehicle and comprising:

a wheel assembly having a transverse axis and a pair of laterally spaced apart wheels;

a chassis suspended from said wheel assembly;

a tongue post socket mounted centrally in the vertical plane of said axis on said chassis for supporting said tongue;

at least one battery on said chassis;

at least one direct current motor device on said chassis and connected with said battery;

a drive train coupling said motor device to said wheel assembly; and a control device including a radio receiver and coupled with said drive train for selectively controlling rotation of said wheels whereby said tug may be positioned under said tongue, the weight of said tongue transferred to said post socket, and said control device actuated to drive said motor and selectively drive one or both of said wheels to steer said tongue about.

30. A light weight battery powered steerable tug for carrying a cantilevered tongue of a towable vehicle and comprising:

a wheel assembly having a transverse axis and a pair of laterally spaced apart wheels;

a chassis suspended from said wheel assembly;

a tongue post socket mounted centrally in the vertical plane of said axis on said chassis for supporting said tongue;

a gimbal interposed between said chassis and said post socket;

at least one battery on said chassis;

at least one direct current motor device on said chassis connected with said battery;

a drive train coupling said motor device to said wheel assembly; and a control device coupled with said drive train for selectively controlling rotation of said wheels whereby said tug may be positioned under said tongue, the weight of said tongue transferred to said post socket, and said control device actuated to drive said motor and selectively drive one or both of said wheels to steer said tongue about.

31. A light weight steerable tug apparatus for selectively carrying a cantilevered tongue of a towable vehicle supported at a selected height by an adjustable tongue jack, said tug apparatus comprising:

a coupling device for mounting on said tongue and including an upright sleeve having an open bottom end disposed, when mounted on said tongue and said tongue is at said selected height, at a predetermined height above the ground;

a tug device including a wheel assembly having a transverse axis and a pair of laterally spaced apart wheels, said tug device including:

a chassis suspended from said wheel assembly;

an upwardly opening post socket mounted on said chassis for supporting said tongue and having a top end disposed at a height less than said predetermined height and configured to be selectively aligned under said sleeve;

a post slidably received in said sleeve and socket;

a lock for locking said post in position relative to said sleeve;

at least one battery on said chassis;

at least one direct current motor device on said chassis and connected to said motor;

a drive train coupling said motor device to said wheel assembly; and a control device coupled with said drive train for selectively controlling rotation of said wheels whereby said tug device may be positioned with said socket and said post inserted in said sleeve and nested on its bottom end in said socket, said lock activated to lock said post relative to said sleeve and said jack activated to said tongue and transfer the weight of said tongue to said post socket, and said control device actuated to drive said motor and selectively drive one or both of said wheels to steer said tongue about.

32. The light weight steerable tug apparatus of claim 31 wherein:

said sleeve is formed with a through passage for receipt of said post; and said sleeve and post include bores alignable for selective receipt of a pin to lock said post relative to said sleeve.

* * * * *